(12) United States Patent
Lee et al.

(10) Patent No.: US 12,462,443 B2
(45) Date of Patent: Nov. 4, 2025

(54) ELECTRONIC DEVICE FOR PLACING OBJECT ACCORDING TO SPACE IN AUGMENTED REALITY AND OPERATION METHOD OF ELECTRONIC DEVICE

(71) Applicant: SAMSUNG ELECTRONICS CO., LTD., Suwon-si (KR)

(72) Inventors: Hyunjun Lee, Suwon-si (KR); Minseoung Woo, Suwon-si (KR); Kyunghwa Kim, Suwon-si (KR); Sunho Kim, Suwon-si (KR); Sanghyun Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/383,963

(22) Filed: Oct. 26, 2023

(65) Prior Publication Data

US 2024/0054694 A1    Feb. 15, 2024

Related U.S. Application Data

(63) Continuation of application No. PCT/KR2023/010507, filed on Jul. 20, 2023.

(30) Foreign Application Priority Data

Aug. 4, 2022   (KR) .................. 10-2022-0097497
Nov. 16, 2022  (KR) .................. 10-2022-0153207

(51) Int. Cl.
  *G09G 5/00*   (2006.01)
  *G06T 3/40*   (2006.01)
  *G06T 11/00*  (2006.01)

(52) U.S. Cl.
  CPC ............ *G06T 11/00* (2013.01); *G06T 3/40* (2013.01)

(58) Field of Classification Search
  CPC .... G06F 3/04815; G06F 3/011; G06F 3/0481; G06F 3/04886; G06F 3/04817;
  (Continued)

(56) References Cited

U.S. PATENT DOCUMENTS 10,725,729 B2   7/2020   Huang
11,789,524 B2  10/2023   Brodsky et al.
(Continued)

FOREIGN PATENT DOCUMENTS

JP    2011128220 A    6/2011
JP       7001138 B2   1/2022
(Continued)

OTHER PUBLICATIONS

International Search Report issued in International Application No. PCT/KR2023/010507; International Filing Date Jul. 20, 2023; Date of Mailing Oct. 19, 2023 (10 pages).
(Continued)

*Primary Examiner* — Jennifer T Nguyen
(74) *Attorney, Agent, or Firm* — CANTOR COLBURN LLP

(57) ABSTRACT

An electronic device according to various embodiments may include a display, a sensor configured to detect a distance from an actual item in a space, a camera configured to capture an image of a foreground, a memory configured to store a plurality of instructions, and a processor, wherein the plurality of instructions, when executed by the processor, cause the electronic device to analyze a first space using the camera and the sensor, store information of the first space and information related to a configuration of an object placed by a user in the first space, analyze a second space using the camera and the sensor, relocate the configuration of the object, based on information of the analyzed second
(Continued)

space, and display the object having been relocated. Various other embodiments are possible.

20 Claims, 44 Drawing Sheets

(58) Field of Classification Search
CPC .. G06F 3/04883; G06F 3/1454; G06F 3/0486; G06F 3/1462; G06F 3/0482; G06F 3/04842; G06T 15/40; G06T 19/006; G06T 7/70; G06T 11/00; G06T 3/40; G09G 5/026; G09G 5/14
USPC .......................................................... 345/8
See application file for complete search history.

(56) References Cited

U.S. PATENT DOCUMENTS

| | | |
|---|---|---|
| 11,808,944 B2 | 11/2023 | Hoover et al. |
| 2011/0140994 A1 | 6/2011 | Noma |
| 2014/0313228 A1 | 10/2014 | Kasahara |
| 2014/0362084 A1 | 12/2014 | Ooi et al. |
| 2015/0187108 A1 | 7/2015 | Mullins |
| 2016/0147408 A1* | 5/2016 | Bevis ................... G02B 27/017 715/850 |
| 2019/0272138 A1* | 9/2019 | Krauss ................. G06T 19/006 |
| 2020/0184653 A1* | 6/2020 | Faulkner ................... G06T 7/40 |
| 2020/0258481 A1 | 8/2020 | Woo et al. |
| 2021/0110614 A1 | 4/2021 | Shahrokni et al. |
| 2021/0286480 A1 | 9/2021 | Tyler et al. |
| 2021/0335052 A1 | 10/2021 | Jeong |
| 2022/0207199 A1 | 6/2022 | Ha |

FOREIGN PATENT DOCUMENTS

| | | |
|---|---|---|
| KR | 20140130675 A | 11/2014 |
| KR | 20170125618 A | 11/2017 |
| KR | 20200061281 A | 6/2020 |
| KR | 20200098034 A | 8/2020 |
| KR | 20210081904 A | 7/2021 |
| KR | 102308937 B1 | 10/2021 |

OTHER PUBLICATIONS

Extended European Search Report Issued In EP Application No. 23850310.6-1018; Mail Date Jun. 26, 2025; 7 Pages.

* cited by examiner

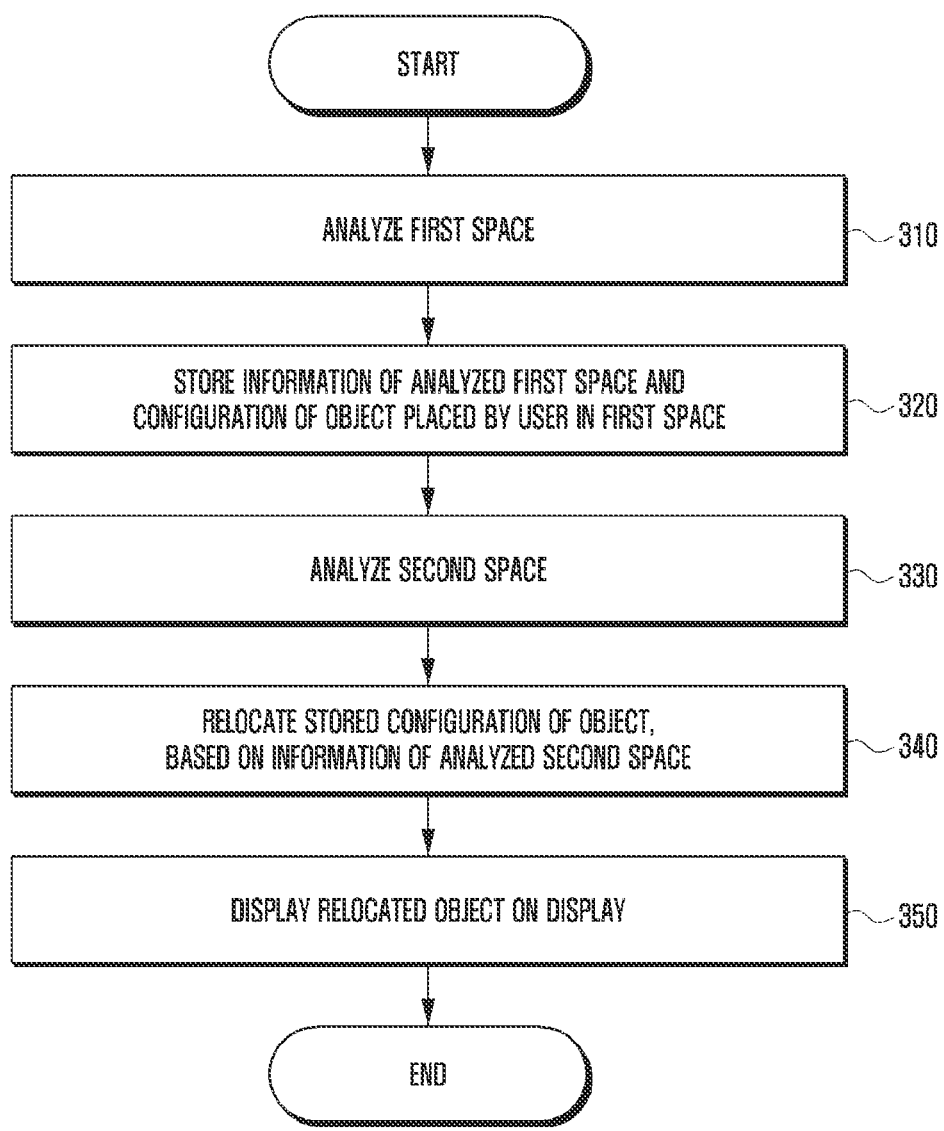

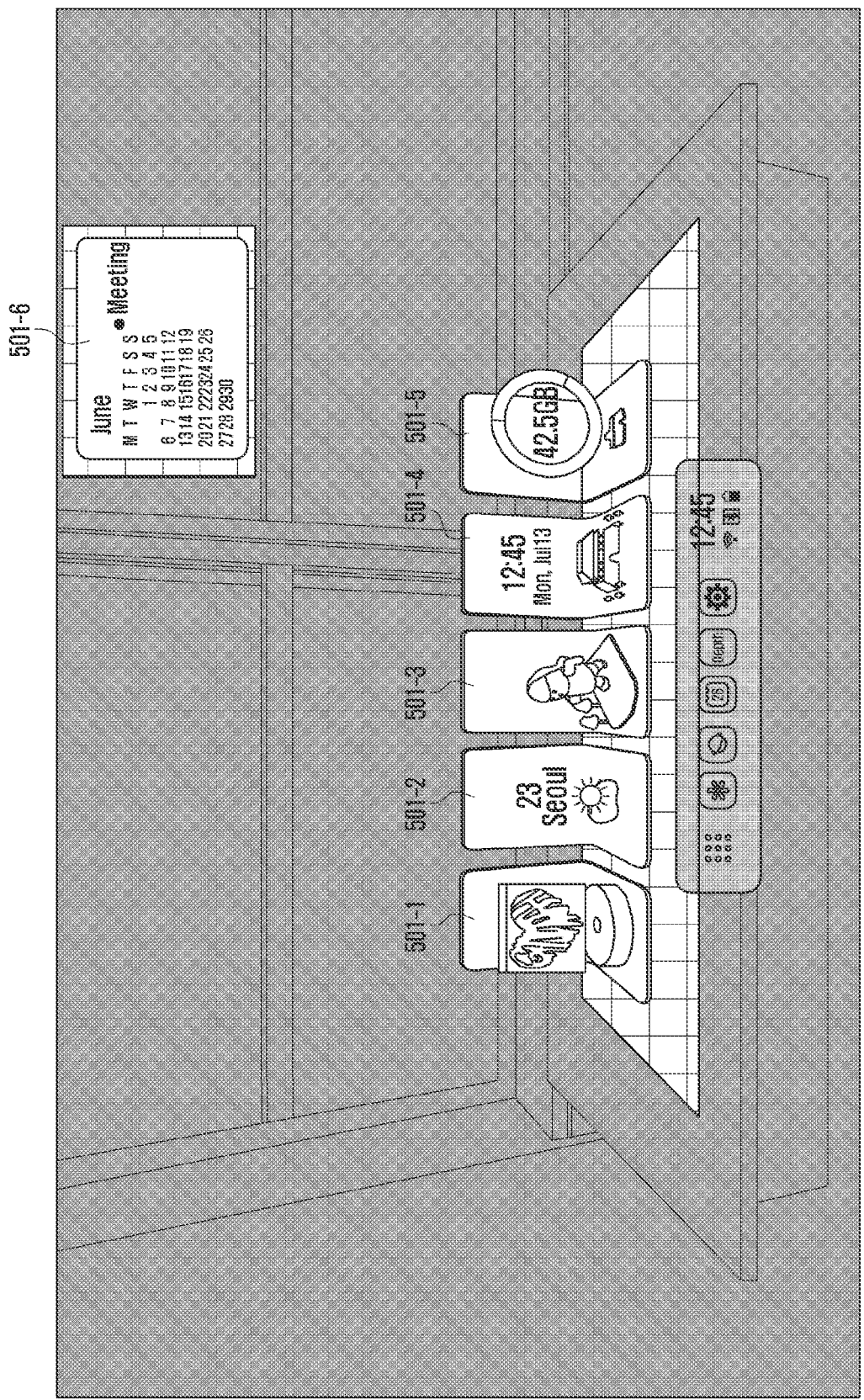

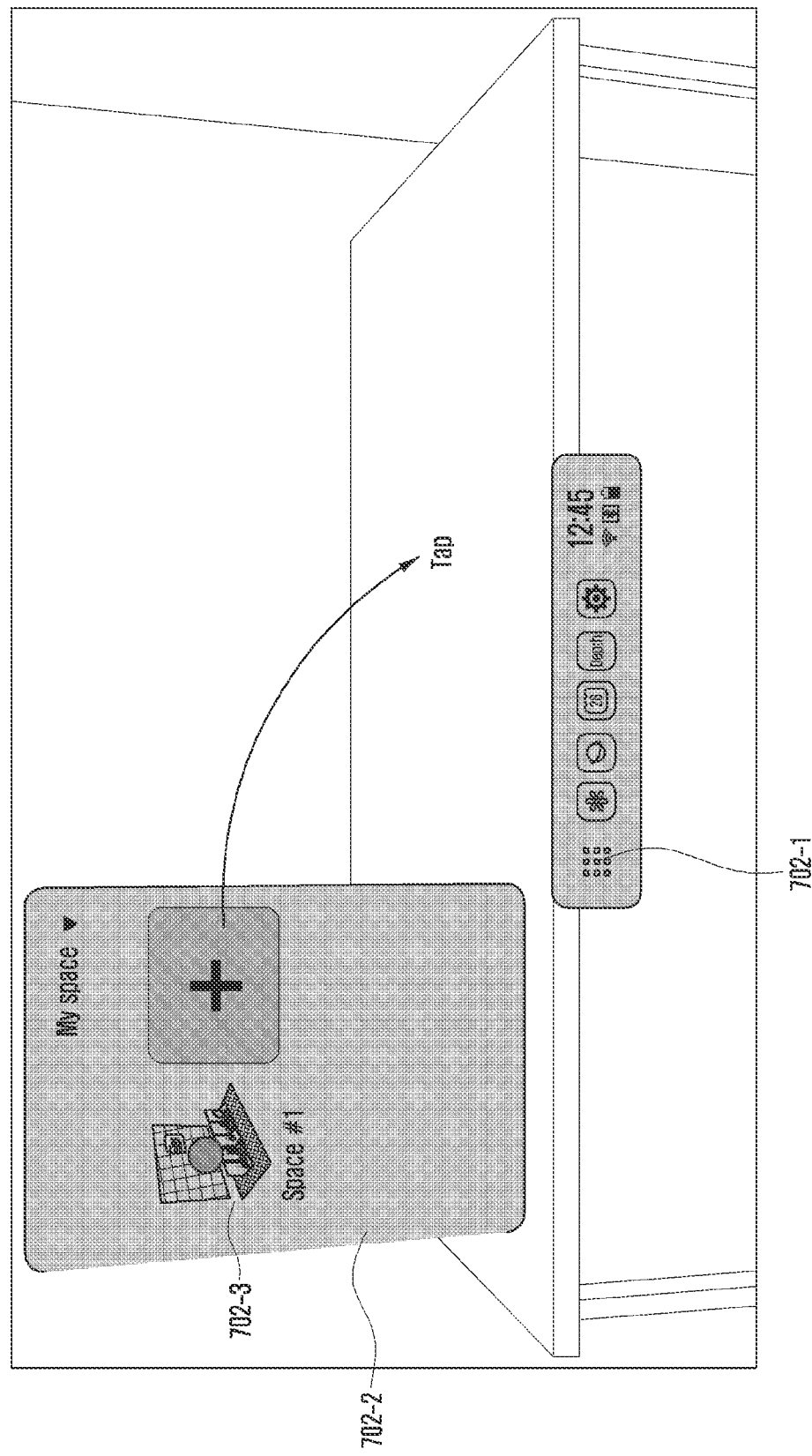

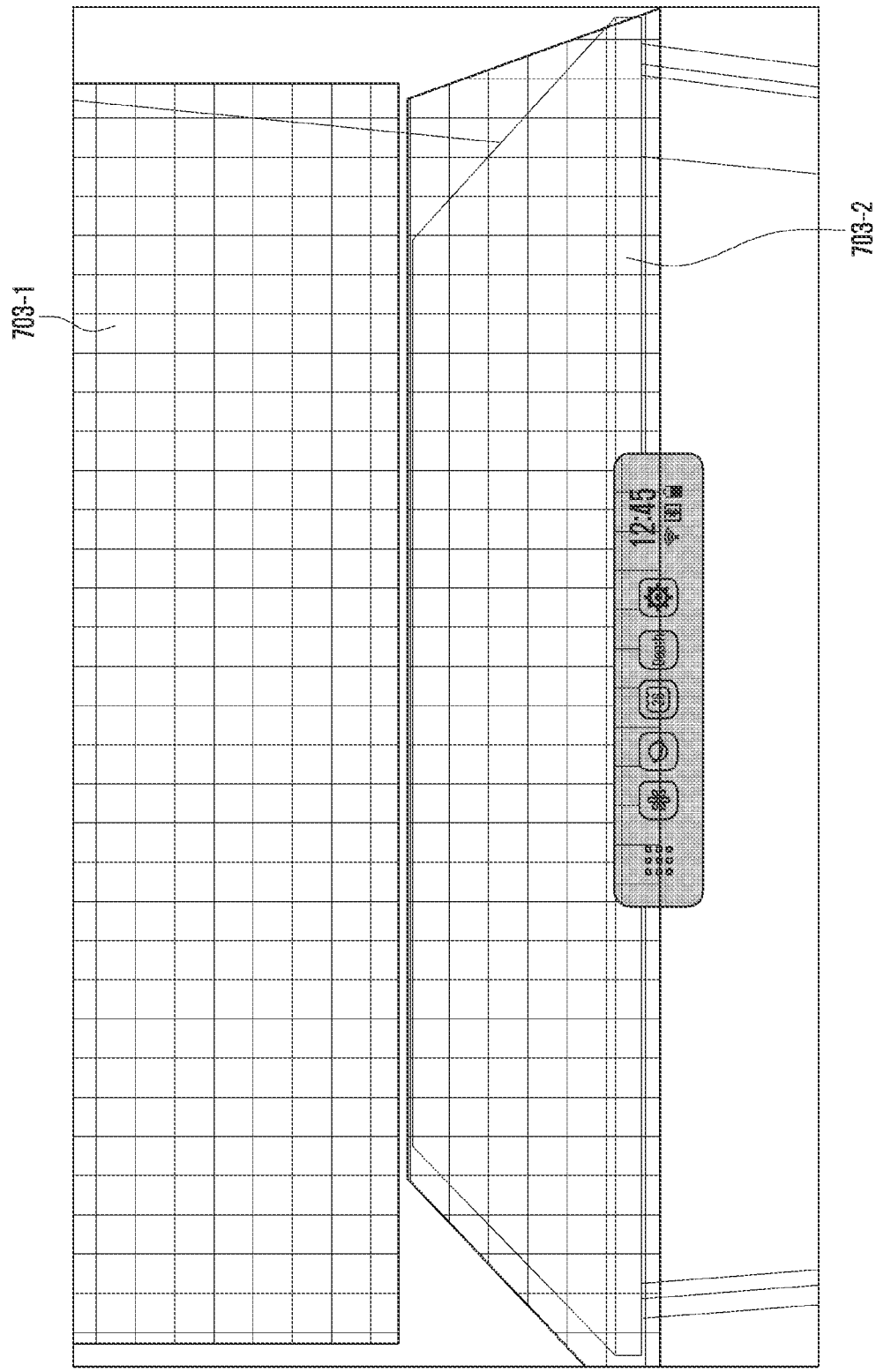

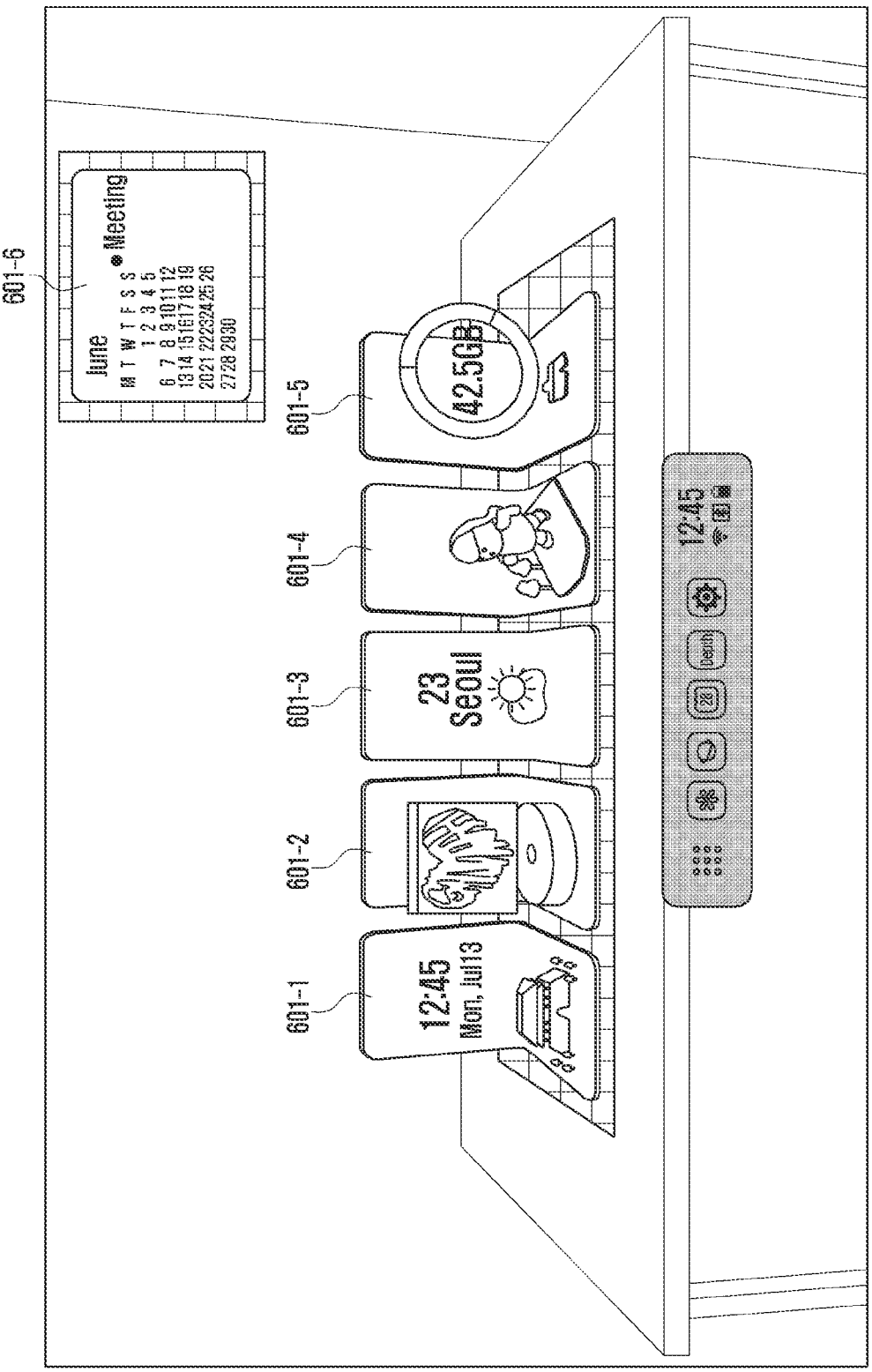

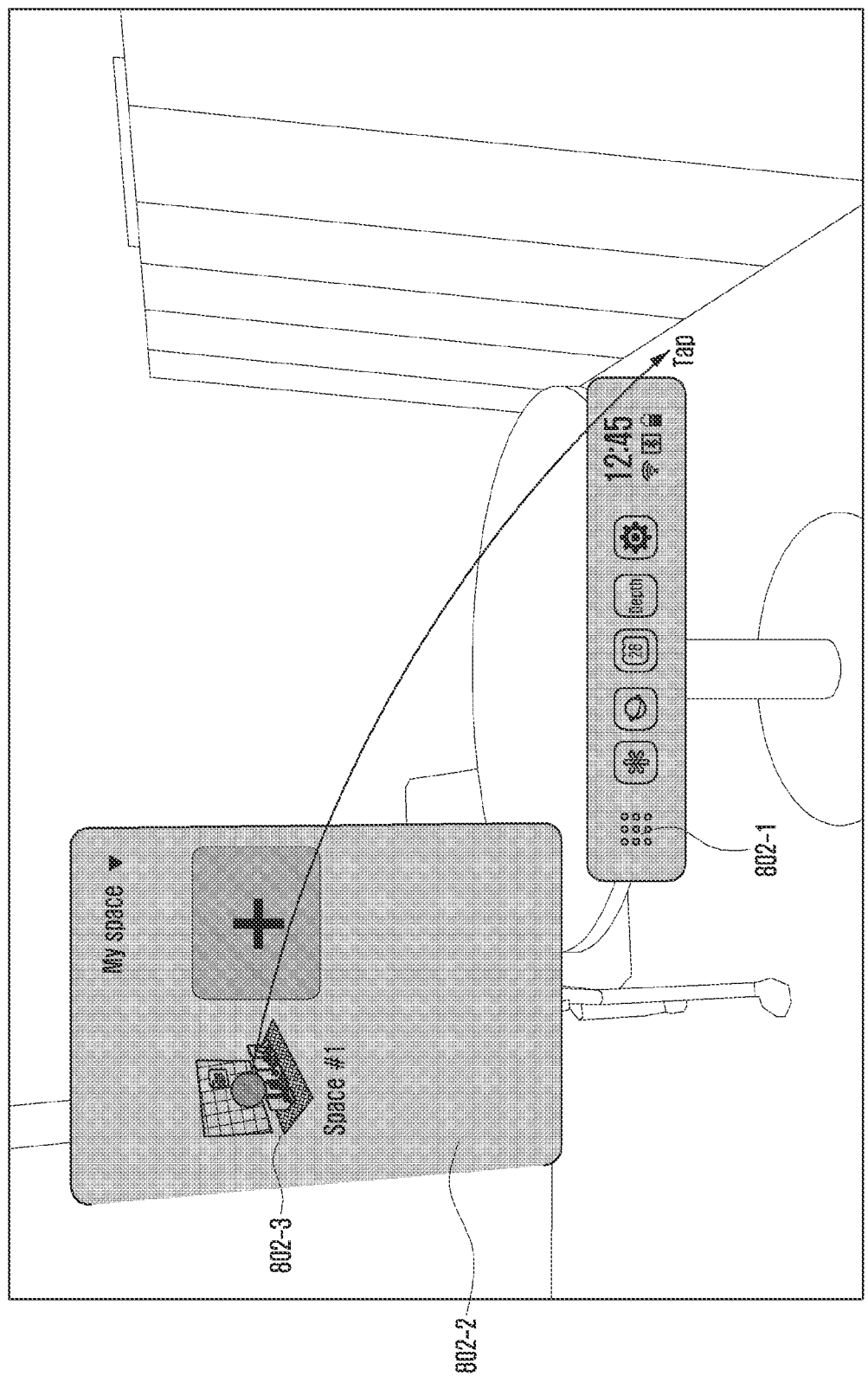

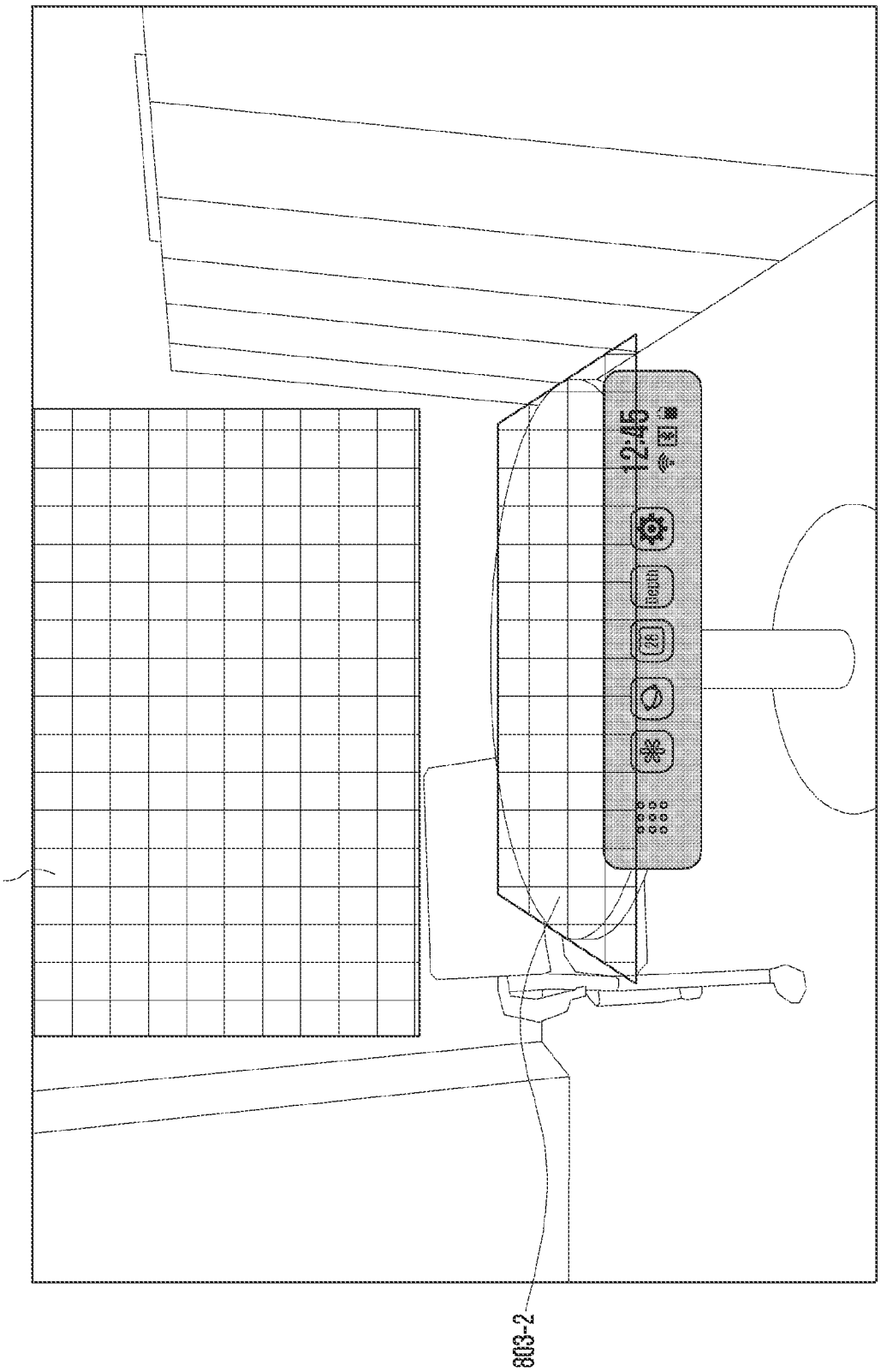

ELECTRONIC DEVICE FOR PLACING OBJECT ACCORDING TO SPACE IN AUGMENTED REALITY AND OPERATION METHOD OF ELECTRONIC DEVICE

CROSS-REFERENCE TO RELATED APPLICATIONS

This application is a continuation of International Application No. PCT/KR2023/010507 designating the United States, filed on Jul. 20, 2023, and claiming priority to Korean Patent Application No. 10-2022-0097497, filed on Aug. 4, 2022, and Korean Patent Application No.: 10-2022-0153207, filed on Nov. 16, 2022, in the Korean Intellectual Property Office, the disclosures of each of which are incorporated by reference herein in their entireties.

TECHNICAL FIELD

Various embodiments disclosed herein relate to an electronic device for placing an object in augmented reality according to space and an operation method of an electronic device.

BACKGROUND ART

According to recent technological developments, an electronic device has been gradually transformed from a uniform rectangular shape into various shapes. For example, certain electronic devices have evolved to become wearable electronic devices that are capable of being worn on a part of the human body in order to increase a user's convenience.

The wearable electronic device may include a head mounted display (HMD, glasses-type wearable device) which is wearable on the head like glasses. For example, the wearable electronic device may include glasses-type augmented reality (AR) glasses and/or smart glasses in which various contents are implemented in transparent glass (e.g., lens). As another example, the wearable electronic device may include a video see-through (VST) device that is an HMD device, captures an image of a real environment by means of a camera, and displays the captured image to overlap with a virtual image. The wearable electronic device, the HMD device, and/or the VST device may use a camera to provide a user with a virtual reality service and/or an augmented reality service (e.g., an augmented reality world and an augmented reality function). For example, while an MID device is worn on a user's head, the HMD device may implement a virtual reality and/or augmented reality in response to execution of an augmented reality-related application in an electronic device connected via communication and provide a virtual reality service and/or an augmented reality service to the user.

The above information may be provided as a background for helping understanding of the disclosure. No assertion or determination is made as to whether any of the contents described above could be applied as prior art in relation to the disclosure.

DISCLOSURE OF INVENTION

Technical Problem

According to an embodiment, an electronic device may use a VST device to provide a user with an augmented reality service (e.g., a virtual reality service) based on augmented reality (e.g., virtual reality (VR), augmented reality (AR), mixed reality (MR), or extended reality (XR)) technology. The electronic device may relocate and display objects having a designated configuration and placement in an augmented reality region according to characteristics of a space.

The technical task to be achieved in this document is not limited to that mentioned above, and other technical tasks that are not mentioned above may be clearly understood to a person having common knowledge in the technical field to which the disclosure belongs based on the description provided below.

Solution to Problem

An electronic device according to various embodiments disclosed herein may include a display, a sensor configured to detect a distance from an actual item in a space, a camera configured to capture an image of a foreground, a memory configured to store instructions, and a processor. Wherein the instructions, when executed by the processor, cause the electronic device is to analyze a first space using the camera and the sensor, store information of the first space and information related to a configuration of an object placed by a user in the first space, analyze a second space using the camera and the sensor, relocate the configuration of the object based on information of the analyzed second space, and display the object having been relocated. Various other embodiments are possible.

A method of operating an electronic device according to various embodiments disclosed herein may include analyzing a first space using a camera and a sensor, storing information of the first space and information related to a configuration of an object placed by a user in the first space, analyzing a second space using the camera and the sensor, relocating the configuration of the object based on information of the analyzed second space, and displaying the object having been relocated on a display.

Advantageous Effects of Invention

According to various embodiments, an electronic device may analyze spaces and automatically place objects to match the characteristics of each space.

Effects which can be acquired by the disclosure are not limited to the effects described above, and other effects that have not been mentioned may be clearly understood by a person who has common knowledge in the technical field to which the disclosure belongs, from the following description.

BRIEF DESCRIPTION OF DRAWINGS

In relation to the description of drawings, the same or similar elements may be indicated by the same or similar reference signs.

FIG. 3 is a flowchart illustrating a method in which a processor according to various embodiments analyzes a space and places an object;

FIG. 5B to FIG. 5F are diagrams illustrating illustrative screens of respective operations shown in FIG. 5A;

FIG. 7B to FIG. 7F are diagrams illustrating examples of respective operations shown in FIG. 7A;

FIG. 8B to FIG. 8F are diagrams illustrating examples of respective operations shown in FIG. 8A;

MODE FOR THE INVENTION

Figure 1:
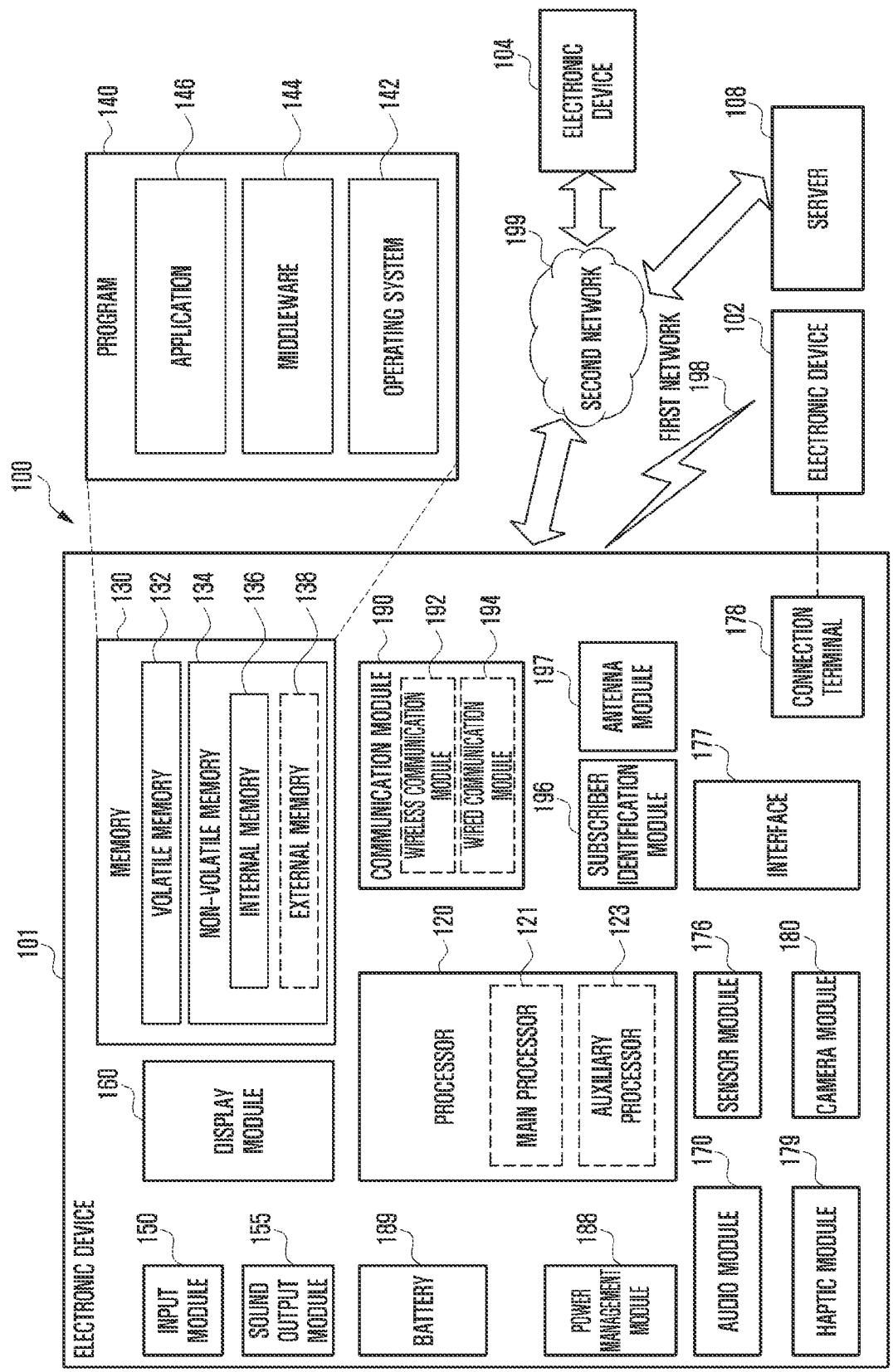
FIG. 1 is a block diagram of an electronic device in a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 play control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information o the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of fins or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
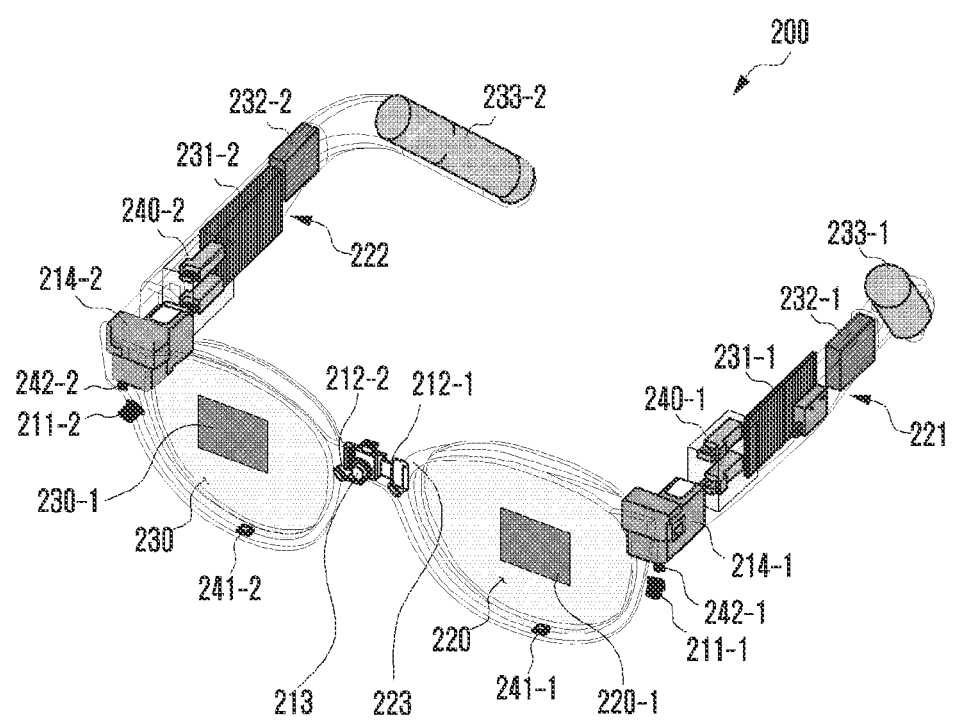
FIG. 2A illustrates a perspective view of a configuration diagram of an electronic device according to various embodiments.

FIG. 2A is a perspective view that illustrates a configuration diagram of an electronic device 200 (e.g., the electronic device 101 in FIG. 1) according to various embodiments.

In various embodiments, the electronic device 200 may be worn on a user's head. For example, the electronic device 200 may be configured as glasses, goggles, a helmet, or a hat, but is not limited thereto. According to an embodiment, the electronic device 200 may include multiple transparent members (e.g., a first transparent member 220 and/or a second transparent member 230) corresponding to the user's eyes (e.g., the left eye and/or the right eye), respectively.

The electronic device 200 may provide an image related to an augmented reality (AR) service to the user. According to an embodiment, the electronic device 200 may project or display a virtual item (e.g., object) on the first transparent member 220 and/or the second transparent member 230, thereby enabling the user to see at least one virtual item (e.g., object) overlapping with reality recognized through the first transparent member 220 and/or the second transparent member 230 of the electronic device.

Referring to FIG. 2A, the electronic device 200 according to an embodiment may include a body part 223, support parts (e.g., a first support part 221 and a second support part 222), and hinge parts (e.g., a first hinge part 240-1 and a second hinge part 240-2).

According to various embodiments, the body part 223 and the support parts 221 and 222 may be operatively connected to each other through the first and second hinge parts 240-1 and 240-2. The body part 223 may be provided to be at least partially placed on the user's nose.

According to various embodiments, the support parts 221 and 222 may include support members that are able to be hooked on the user's ears. The support parts 221 and 222 may include the first support part 221 for the left ear and/or the second support part 222 for the right ear.

According to various embodiments, the first hinge part 240-1 may connect the first support part 221 and the body part 223 such that the first support part 221 is rotatable or pivotable with respect to the body part 223. The second hinge part 240-2. may connect the second support part 222 and the body part 223 such that the second support part 222 is rotatable or pivotable with respect to the body part 223. According to another embodiment, the first and second hinge parts 240-1 and 240-2 of the electronic device 200 may be omitted. For example, the body part 223 and the support parts 221 and 222 may be directly connected to each other with the support parts 221 and 222 unable to rotate or pivot relative to the body part 223.

According to various embodiments, the body part 223 may include at least one transparent member (e.g., the first transparent member 220 and the second transparent member 230), at least one display module (e.g., a first display module 214-1 and a second display module 214-2), at least one camera module (e.g., a foreground imaging camera module 213, an eye tracking camera module (e.g., a first eye tracking camera module 212-1 and a second eye tracking camera module 212-2), and a recognition camera module (e.g., a first recognition camera module 211-1 and a second recognition camera module 211-1)), and at least one microphone (e.g., a first microphone 241-1 and a second microphone 241-2).

In a case of the electronic device 200 described with reference to FIG. 2A, light generated from the first and second display modules 214-1 and 214-2 may be projected on the first and second transparent members 220 and 230 to display information. For example, light generated from the first display module 214-1 may be projected on the first transparent member 220, and light generated from the second display module 214-2 may be projected on the second transparent member 230. Light enabling display of a virtual item (e.g., object) is projected on the first and second transparent members 220 and 230 at least partially made of a transparent material, whereby the user pray recognize reality overlapping with the virtual item (e.g., object). In this case, the display module 160 described with reference to FIG. 1 may be understood as including the first and second display modules 214-1 and 214-2 and the first and second transparent members 220 and 230 in the electronic device 200 illustrated in FIG. 2A. However, the electronic device 200 described in the disclosure is not limited to displaying information in the scheme described above. A display module which may be included in the electronic device 200 may be changed to a display module including a method of displaying information in various schemes. For example, when a display panel including light emitting elements made of a transparent material is embedded in each of the first and second transparent members 220 and 230, information may be displayed without a separate display module (e.g., the first display module 214-1 and the second display module 214-2). In this case, the display module 160 described with reference to FIG. 1 may indicate the first and second transparent members 220 and 230 and the display panels included in the first and second transparent members 220 and 230.

According to various embodiments, a virtual item (e.g., object) output from the first and second display modules 214-1 and 214-2 may include information related to an application program that, is executed in the electronic device 200, and/or information related to an external item positioned in an actual space recognized by the user through the first and second transparent members 220 and 230. The external item may include a thing existing in the actual space. The actual space recognized by the user through the first and second transparent members 220 and 230 will be called the user's field-of-view (FOV) region. For example, the electronic device 200 may identify an external item included in at least a part of a region determined as the user's field of view (FOV) in image information related to an actual space obtained via a camera module (e.g., the imaging camera module 213) of the electronic device 200. The electronic device 200 may output a virtual item (e.g., object) related to the identified external item via the first and second display modules 214-1 and 214-2.

According to various embodiments, the electronic device 200 may display a virtual item (e.g., object) related to an augmented reality service together based on image information related to an actual space obtained via the imaging camera module 213 of the electronic device 200. According to an embodiment, the electronic device 200 may display a virtual item (e.g., object) based on display modules (e.g., the first display module 214-1 corresponding to the left eye and/or the second display module 214-2 corresponding to the right eye) arranged to correspond to the user's eyes. According to an embodiment, the electronic device 200 may display a virtual item (e.g., object) based on pre-configured configuration information (e.g., resolution, frame rate, brightness, and/or display region).

According to various embodiments, the first and second transparent members 220 and 230 may include a condensing lens (not illustrated) and/or waveguides (e.g., a first waveguide 2201 and/or a second waveguide 230-1). For example, the first waveguide 220-1 may be partially positioned in the first transparent member 220, and the second waveguide, 230-1 may be partially positioned in the second transparent member 230. Light emitted from the first and second display modules 214-1 and 214-2 may enter one-side surfaces of the first and second transparent members 220 and 230. Light incident into one-side surfaces of the first and second transparent members 220 and 230 may be transferred to the user through the first and second waveguides 220-1 and 230-1 positioned in the first and second transparent members 220 and 230. The first and second waveguides 220-1 and 230-1 may be made of glass, plastic, or polymer, and may include a nano pattern disposed on one surface of the inside or outside thereof. For example, the nano pattern may include a grating structure having a polygonal or curved surface shape. According to an embodiment, the light incident into one-side surfaces of the first and second transparent members 220 and 230 may be transferred to the user by being propagated or reflected in the first and second waveguides 220-1 and 230-1 by the nano pattern. According to an embodiment, the first and second waveguides 220-1 and 230-1 may include at least one of at least one diffractive element (e.g., a diffractive optical element (DOE) or a holographic optical element (HOE)) or a reflective element (e.g., a reflective mirror). According to an embodiment, the first and second waveguides 2204 and 230-1 may use the at least one diffractive element or the reflective element to guide light emitted from the first and second display modules 214-1 and 214-2 to the user's eyes.

According to various embodiments, the electronic device 200 may include the imaging camera module 213 (e.g., RGB camera module) for capturing an image corresponding to the user's field of view (FOV) and/or measuring a distance from an item, the first and second eye tracking camera modules 212-1 and 212-2 for identifying the direction of a gaze of the user, and/or first and second recognition camera modules (gesture camera modules) 211-1 and 211-2 for recognizing a particular space. For example, the imaging camera module 213 may capture an image in the forward direction of the electronic device 200, and the first and second eye tracking camera modules 212-1 and 212-2 may capture an image in a direction opposite to the image capturing direction of the imaging camera module 213. For example, the first eye tracking camera module 212-1 may partially capture an image of the user's left eye and the second eye tracking camera module 212-2 may partially capture an image of the user's right eye. According to an embodiment, the imaging camera module 213 may include a camera module having high resolution, such as a high resolution (HR) camera module and/or a photo video (PV) camera module. According to an embodiment, the first and second eye tracking camera modules 212-1 and 212-2 may detect the user's pupils to track a gaze direction. The tracked gaze direction may be used to move the center of a virtual image including a virtual item (e.g., object) to correspond to the gaze direction. According to an embodiment, the first and second recognition camera modules 211-1 and 211-2 may detect a user gesture within a pre-configured distance (e.g., a particular space) and/or the particular space. Each of the first and second recognition camera modules 211-1 and 211-2 may include a camera module including a global shutter (GS). For example, the first and second recognition camera modules 211-1 and 211-2 may be GS camera modules capable of reducing a rolling shutter (RS) phenomenon, to detect and track fast hand motions and/or fine finger movements.

According to various embodiments, the electronic device 200 may use the at least one first and second recognition camera modules 211-1 and 211-2, the first and second eye tracking camera modules 212-1, 212-2, and the imaging camera module 213 to detect an eye corresponding to a fixating eye and/or assisting eye between the user's left eye and/or the user's right eye. For example, the electronic device 200 may detect an eye corresponding to a fixating eye and/or assisting eye based on the direction of the user's gaze for an external item or a virtual item (e.g., object).

The quantity and the position of the at least one camera module (e.g., the imaging camera module 213, the first and second eye tracking camera modules 212-1 and 212-2, and/or the first and second recognition camera modules 211-1 and 211-2) included in the electronic device 200 illustrated in FIG. 2A may not be limited. For example, the quantity and the position of the at least one camera module (e.g., the imaging camera module 213, the eye first and second tracking camera modules 212-1 and 212-2, and/or the first and second recognition camera modules 211-1 and 211-2) may vary according to a type (e.g., shape or size) of the electronic device 200.

According to various embodiments, the electronic device 200 may include at least one light emitting device (illumination LED) (e.g., a first light emitting device 242-1 and a second light emitting device 242-2) for improving the accuracy of the at least one camera module (e.g., the imaging camera module 213, the first and second eye tracking camera modules 212-1 and 212-2, and/or the first and second recognition camera modules 211-1 and 211-2). For example, the first light emitting device 242-1 may be disposed on a part corresponding to the user's left eye and the second light emitting device 242-2 may be disposed on a part corresponding to the user's right eye. In an embodiment, the first and second light emitting devices 242-1 and 242-2. may be used as an auxiliary means for improving accuracy when an image of the user's pupils is captured by the first and second eye tracking camera modules 212-1 and 212-2, and may include IR LEDs for generating light having infrared wavelength. in addition, the first and second light emitting devices 242-1 and 242-2 may be used as an auxiliary means when it is not easy to detect a subject to be image-captured due to a dark environment or introduction of mixture of various light sources and reflected light in a case where an image of the user's gesture is captured by the first and second recognition camera modules 211-1 and 211-2.

According to various embodiments, the electronic device 200 may include microphones (e.g., the first microphone 241-1 and the second microphone 241-2) for receiving the user's voice and surrounding sounds. For example, the first and second microphones 241-1 and 241-2 may be elements included in the audio module 170 shown in FIG. 1.

According to various embodiments, the first support part 221 and/or the second support part 222 may include printed circuit boards (PCBs) (e.g., a first printed circuit board 231-1 and a second printed circuit board 231-2), speakers (e.g., a first speaker 232-1 and a second speaker 232-2), and/or batteries e.g., a first battery 233-1 and a second battery 233-2).

According to various embodiments, the first and second speakers 232-1 and 232-2 may include the first speaker 232-1 for transferring an audio signal to the user's left ear and the second speaker 232-2 for transferring an audio signal to the user's right ear. The first and second speakers 232-1 and 232-2 may be elements included in the audio module 170 shown in FIG. 1.

According to various embodiments, the electronic device 200 may include the first and second batteries 233-1 and 233-2, and may supply power to the first and second printed circuit boards 231-1 and 231-2 via a power management module (e.g., the power management module 188 in FIG. 1). For example, the first and second batteries 233-1 and 233-2 may be electrically connected to the power management module (e.g., the power management module 188 in FIG. 1).

The electronic device 200 has been described as a device displaying augmented reality, but the electronic device 200 may be a device displaying virtual reality (VR). In this case, the first and second transparent members 220 and 230 may be made of an opaque material so that the user is unable to recognize an actual space through the first and second transparent members 220 and 230. In addition, the first and second transparent members 220 and 230 may function as the display module 160. For example, the first and second transparent members 220 and 230 may include display panels that display information.

According to various embodiments, the electronic device 200 may include at least one sensor (e.g., a wearing sensing sensor, a motion sensor, and a touch sensor, not illustrated) and a communication module (not illustrated). According to an embodiment, the at least one sensor may sense whether the electronic device 200 is worn on the user' body, and a posture in which same is worn. For example, the at least one sensor may include at least on e of a proximity sensor and a grip sensor. According to an embodiment, the at least one sensor may detect a posture variation caused by the user's movement. For example, the at least one sensor may include an acceleration sensor and a gyro sensor. The acceleration sensor may sense an acceleration for three axes, and the gyro sensor may sense an angular velocity based on three axes. According to an embodiment, the at least one sensor may detect a gesture such as the user's finger touch and swipe. The electronic device 200 may respond to touch data sensed by the at least one sensor to perform a control including at least one or a combination of two or more of music reproduction, stop, next music reproduction, and previous music reproduction. According to an embodiment, the communication module may be a module that wirelessly communicates with the outside. For example, the communication module may establish communication with another device and/or access point (AP) via, for example, at least one or a combination of two or more of an ultra-wideband (UWB) module, a Bluetooth (BT) network, a Bluetooth low energy (BLE) network, a wireless fidelity (Wi-Fi) network, an ANT+ network, a long-term evolution (LTE) network, a 5th generation (5G) network, and a narrowband Internet of Things (NB-IoT) network.

According to various embodiments, the UWB module may be positioned on a front surface part of the electronic device 200.

According to an embodiment, the UWB module may include at least one UWB antenna. For example, each of the UWB antennas may be disposed in a right-triangular shape, and the UWB antennas may be arranged to have similar distances with respect to each other. For example, based on each of the UWB antennas being disposed in a right-triangular shape, the foreground imaging camera module 213 may be disposed between the UWB antennas. According to an embodiment, the UWB module may be disposed around the first recognition camera module 211-1 and the second recognition camera module 211-2 positioned on the front surface part of the electronic device 200.

According to an embodiment, the electronic device 200 may obtain information (e.g., distance and direction) on a relative position from an external electronic device by means of the UWB module. For example, the electronic device 200 may activate at least some functions of the electronic device 200 in response to a relative distance from the external electronic device being smaller than a designated value.

According to an embodiment, the electronic device 200 may track the user's gaze direction via the first and second eye tracking camera modules 212-1 and 212-2, and select the external electronic device to be controlled based on the tracked gaze direction. According to an embodiment, the electronic device 200 may determine the user's gaze direction via the UWB module, and select the external electronic device to be controlled based on the determined gaze direction. The electronic device 200 may determine the user's gaze direction by using at least one of the UWB module and the first and second eye tracking camera modules 212-1 and 212-2.

According to an embodiment, the electronic device 200 may determine the type of the external electronic device based on an image of the external electronic device obtained via the foreground imaging camera module 213, and generate a control command corresponding to the type of the external electronic device.

According to an embodiment, the electronic device 200 may determine the user's action via the first and second recognition camera modules 211-1 and 211-2, and generate a control command based on the determined user's action.

With reference to FIG. 2A according to various embodiments, the wearable electronic device 200 has been described as a device displaying augmented reality or virtual reality by using a first glass member and a second glass member, but is not limited thereto. For example, the wearable electronic device 200 may include a video see-through (VST) device. In relation thereto, various embodiments will be described. below with reference to FIG. 2B and FIG. 2C.

Figure 2B:
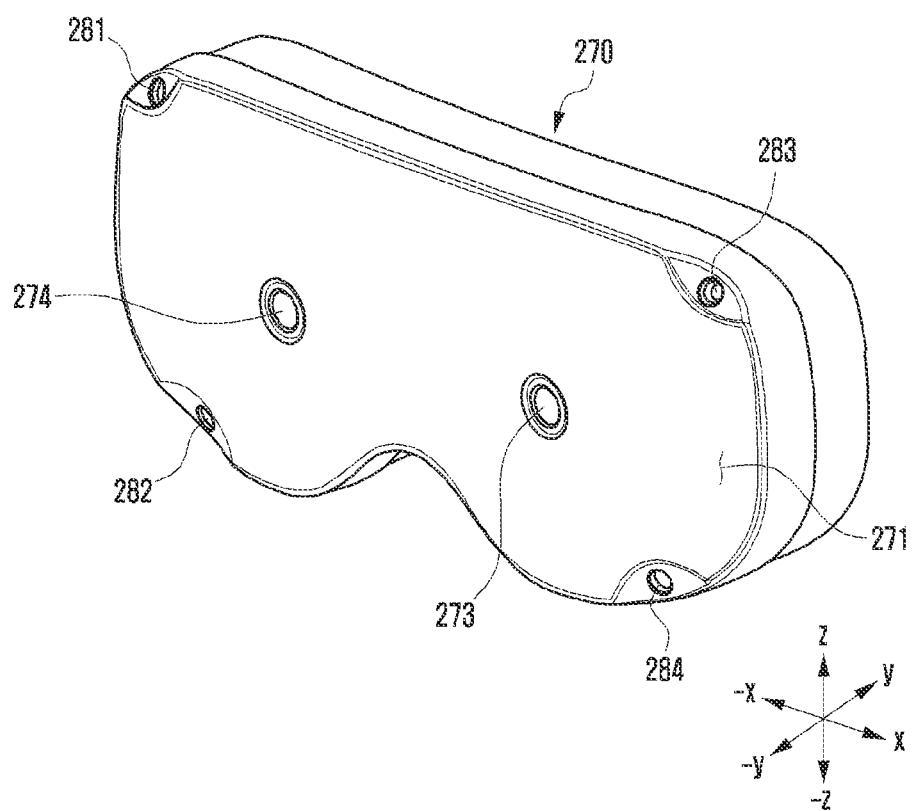
FIG. 2B and FIG. 2C are each perspective views briefly illustrating a front surface and a rear surface of a wearable electronic device according to an embodiment of the disclosure.
Figure 2C:
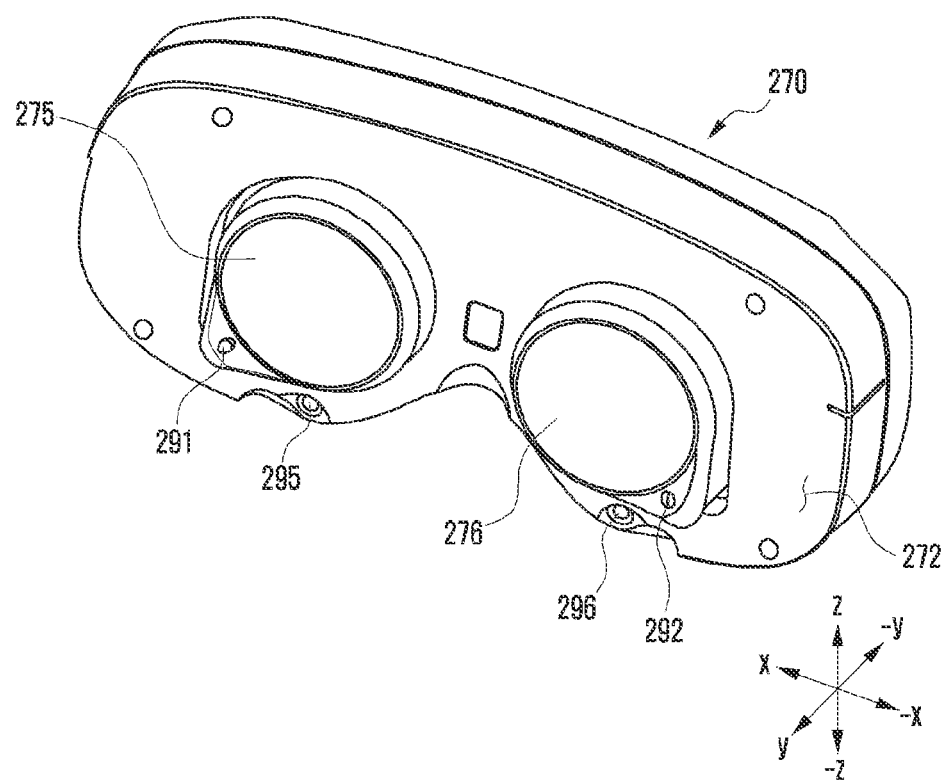

FIG. 2B and FIG. 2C are perspective views briefly illustrating a front surface and a rear surface of a wearable electronic device 270 according to an embodiment of the disclosure.

Referring to FIG. 2B and FIG. 2C, in the wearable electronic device 270, multiple cameras (e.g., a first camera 273 and a second camera 274) may be arranged to correspond to the forward direction e.g., -y direction, the direction in which the user stares) of the wearable electronic device 270. For example, the wearable electronic device 270 may include the first camera 273 corresponding to the user's left eye and the second camera 274 corresponding to the user's right eye. The wearable electronic device 270 may use the first camera 273 and the second camera 274 to capture an image of an external environment in the forward direction (e.g., -y direction) of the wearable electronic device 270. The wearable electronic device 270 may have a first surface 271 (e.g., front surface) (e.g., see FIG. 2B) exposed to an external environment, and a second surface 272 (e.g., rear surface) (e.g., see FIG. 2C) that is not exposed to the external environment and, when being worn, comes into close contact with the user's skin. For example, when the wearable electronic device 270 is worn on the user's face, the first surface 271 of the wearable electronic device 270 may be exposed to the external environment, and the second surface 272 of the wearable electronic device 270 may at least partially come into close contact with the user's face.

In an embodiment, at least one distance sensor 281, 282, 283, and/or 284 may be arranged on the first surface 271 of the wearable electronic device 270. For example, the at least one distance sensor 281, 282, 283, and/or 284 may measure a distance from at least one object disposed around the wearable electronic device 270. The at least one distance sensor 281, 282, 283, and/or 284 may include an infrared sensor, an ultrasonic sensor, and/or a light detection and ranging (LiDAR) sensor. The at least one distance sensor 281, 282, 283, and/or 284 may be implemented based on an infrared sensor, an ultrasonic sensor, and/or a LiDAR sensor.

With reference to FIG. 2B according to various embodiments, four distance sensors 281, 282, 283, and 284 have been illustrated as being arranged on the first surface 271 of the wearable electronic device 270, but are not limited thereto.

In an embodiment, in the wearable electronic device 270, multiple displays (e.g., a first display 275 and a second display 276) may be arranged to correspond to the rearward direction (e.g., +y direction, the direction opposite to the direction in which the user sees) of the wearable electronic device 270. For example, the first display 275 corresponding to the user's left eye and the second display 276 corresponding to the user's right eye may be arranged on the second surface 272 (e.g., rear surface) of the wearable electronic device 270. For example, when the wearable electronic device 270 is worn on the user's face, the first display 275 may be positioned to correspond to the user's left eye and the second display 276 may be positioned to correspond to the user's right eye.

In an embodiment, multiple eye tracking cameras (e.g., a first eye tracking camera 291 and a second eye tracking camera 292) may be at least partially arranged on the second surface 272 of the wearable electronic device 270. For example, the first and second eye tracking cameras 291 and 292 may track the movement of the user's pupils. The first eye tracking camera 291 may track the movement of the user's left eye, and the second eye tracking camera 292, may track the movement of the user's right eye. In an embodiment, the wearable electronic device 270 may identify the direction in which the user sees based on the movement of the pupils tracked using the first and second eye tracking cameras 291 and 292.

In an embodiment, multiple facial recognition cameras (e.g., a first facial recognition camera 295 and a second facial recognition camera 296) may be at least partially arranged on the second surface 272 of the wearable electronic device 270. For example, the first and second facial recognition cameras 295 and 296 may recognize the user's face in a situation where the wearable electronic device 270 is put on the user's face. in an embodiment, the wearable electronic device 270 may also determine whether the wearable electronic device 270 has been put on the user's face, by using the first and second facial recognition cameras 295 and 296.

Figure 2D:
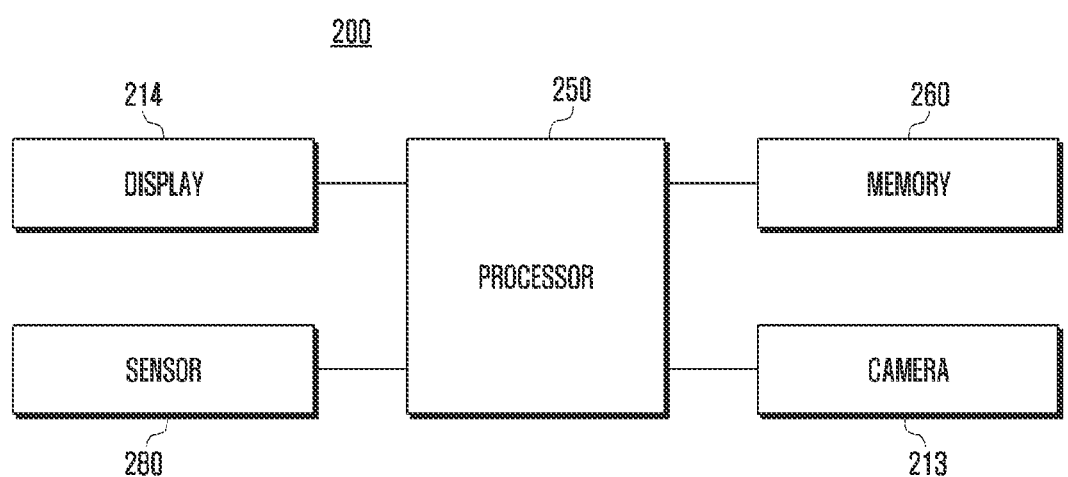
FIG. 2D is a block diagram of an electronic device according to various embodiments.

FIG. 2D is a block diagram of an electronic device according to various embodiments.

Referring to FIG. 2I), an electronic device 200 (e.g., the electronic device 101 in FIG. 1) may include a processor 250 (e.g., the processor 120 in FIG. 1), a camera 213 (e.g., the camera 180 in FIG. 1), a sensor 280 (e.g., the sensor 176 in FIG. 1), a display 214 (e.g., the display 160 in FIG. 1), and/or a memory 260 (e.g., the memory 130 in FIG. 1). The elements illustrated in FIG. 2D are some of elements included in the electronic device 200, and the electronic device 200 may include various other elements as illustrated in FIG. 1.

The camera 213 may capture an image of the foreground of the electronic device. For example, the camera 213 may be the foreground imaging camera module 213 in FIG. 2A.

According to an embodiment, the camera 213 may transfer a captured image of the foreground to the processor 250.

The sensor 280 may measure a relative distance between an external item and the electronic device. For example, the sensor 280 may include or be provided as an image distance sensor 280, an optical distance sensor 280, an ultrasonic distance sensor 280, or a radio distance sensor 280. Various other sensors 280 (e.g., a depth sensor 280) capable of measuring, distance or displacement may be included in the distance sensor 280.

In an embodiment, the sensor 280 may measure distance in stereo type. In an embodiment, the sensor 280 may combine two two-dimensional image sensors 280, and measure distance by using viewpoint mismatch between the pair of image sensors 280. For example, the stereo camera 213 may measure the depth of pixels in an image based on the image difference between cameras 213.

In an embodiment, the sensor 280 may measure distance in a time of flight (TOF) type process. The sensor 280 may measure distance by using the time taken for the light or radio wave output from the sensor 280 to be reflected by another object and be returned. In an embodiment, the sensor 280 may measure distance in a light amount measurement type process. The sensor 280 capable of measuring distance in light amount measurement type may measure distance based on the light amount entering into the sensor 280. The sensor 280 may determine that the smaller the light amount received by the sensor 280, the longer the distance, and the larger the light amount received by the sensor 280, the shorter the distance.

In an embodiment, the sensor 280 may measure distance in a method (structured pattern) of analyzing a light pattern marked by irradiating a particular object. In such cases, the sensor 280 may measure the distance between two points in a light pattern marked on a particular object. The sensor 280 may determine that the narrower the gap between the two points, the longer the distance between the sensor 280 and the particular object, and the wider the gap between the two points, the shorter the distance between the sensor 280 and the particular object. The sensor 280 may measure distance in various other methods.

The display 214 may display a screen generated by the processor 250. For example, the display 214 may include the first and second display modules 214-1 and 214-2 in FIG. 2B.

According to an embodiment, the display 214 may display an image captured by the camera 213 and an object generated by the processor 250.

According to an embodiment, the display 214 may project light related to an object generated by the processor 250 on the first and second transparent members 220 and 230, thereby displaying information. For example, the display 214 projects light enabling display of a virtual item (e.g., objection the first and second transparent members 220 and 230 at least partially made of a transparent material, whereby the user may recognize reality overlapping with the virtual item (e.g., object).

The processor 250 may analyze a space and place an object.

According to various embodiments, the object may include an item occupying a part of the space and/or a context not occupying the space like sound. For example, the object may include an icon related to execution of a designated application, an icon for providing information, and/or a reproduced sound source. The object mentioned in the disclosure may include all elements such as image, voice, and motion which are available in virtual reality, and may not be to this embodiment.

The processor 250 according to an embodiment may analyze a first space. For example, the processor 250 may analyze the first space based on an image of the first space, which is captured the camera 213, and a relative distance from an item existing in the first space to the camera 213, which is measured by the sensor 280, and obtain information related to the first space.

For example, the information related to the first space may include the number of a plane included in the first space, the direction, position, rotation angle, and/or size value of the plane relative to the electronic device.

According to an embodiment, the processor 250 may analyze a configuration of an object placed by the user, to obtain information related to the configuration of the object.

For example, information related to the object may include the position of the object relative to the electronic device, information (e.g., the number of a plane) on a plane on which the object depends, a position, rotation, a size value relative to the plane on which the object depends, and/or relevant application information.

According to an embodiment, the processor 250 may store a configuration of an object placed in a space in the memory 260.

According to an embodiment, the processor 250 may store information of the first space and information related to a configuration of an object placed by the user in the memory 260.

For example, the processor 250 may store, in the memory 260, with the name "first configuration", the number of a plane included in the first space, the direction, position, rotation angle, and/or size value of the plane relative to the electronic device, and the position of the object relative to the electronic device, information (e.g., the number of a plane) on a plane on which the object depends, a position, rotation, a size value relative to the plane on which the object depends, and/or relevant application information.

The processor 250 according to an embodiment analyze a second space. For example, the processor 250 may analyze the second space based on an image of the second space, which is captured by the camera 213, and a relative distance from an item existing in the second space to the camera 213, which is measured by the sensor 280, and obtain information related to the second space.

For example, the information related to the second space may include the number of a plane included in the second space, the direction, position, rotation angle, and/or size value of the plane relative to the electronic device.

According to an embodiment, the processor 250 may relocate a stored configuration of an object based on information of the analyzed second space.

According to an embodiment, the processor 250 may compare the first space with the second space.

For example, the processor 250 may compare information of at least one plane included in the first space with information of at least one plane included in the second space.

According to an embodiment, the processor 250 may adjust a configuration of an object corresponding to the first configuration and place the object based on a result of comparison between the first space and the second space.

For example, in response to a determination that the quantity, the direction, and the scale of planes included in the first space matches those of the second space within a designated range, the processor 250 may adjust the position and size of the object of the first configuration and place the object accordingly.

According to an embodiment, the processor 250 may display a relocated object on the display 214.

According to an embodiment, the processor 250 may relocate and adjust objects of the first configuration to be suitable for the second space, and display the objects on the display 214 in the second space.

The processor 250 according to an embodiment may be included in the electronic device 200 or an external electronic device physically separated from the electronic device 200 to control the electronic device 200, and/or may be included in an external electronic device physically connected to the electronic device 200 to control the electronic device 200.

The memory 260 may temporarily or non--temporarily store information related to a space and/or information related to an object.

With the configuration described above, augmented reality headgear is provided and includes lenses, which are disposable in front of eyes of a user, a memory configured to store instructions, and a processor. Wherein the instructions, when executed by the processor, cause the augmented reality headgear is to analyze a first space that is viewable by the user through the lenses, store information of the first space and information related to a configuration of a virtual object displayed, on the lenses, to appear in the first space, analyze a second space that is viewable by the user through the lenses, and display, on the lenses, the virtual object to appear in the second space in accordance with the configuration of the object and based on information derived from first and second space analyses. The lenses can be goggle or glasses lenses, although it is to be understood that additional types of lenses are possible.

The information derived from the first space analysis includes information of at least one plane included in the first space and the information derived from the second space analysis includes information of at least one plane included in the second space. The instructions further cause the augmented. reality headgear to compare the information of the at least one plane included in the first space and the information of the at least one plane included in the second space and to display the virtual object to appear in the second space based on a comparison result. The comparison result can, for example, define a ratio between corresponding parameters of the at least one plane included in the first space and the at least one plane included in the second space. In these or other cases, the instructions further cause the augmented reality headgear to adjust a size of the object in the display of the object to appear in the second space in correspondence with the ratio.

FIG. 3 is a flowchart illustrating a method in which the processor 250 according to various embodiments analyzes a space and places an object.

According to an embodiment, a user may place an object in a first space and input a command of storing an object placement configuration.

According to various embodiments, the processor 250 may analyze a first space in operation 310.

According to an embodiment, the processor 250 may analyze the first space based on an image of the first space, which is captured by the camera 213, and a relative distance from an item existing in the first space to the camera 213, which is measured by the sensor 280, and obtain information related to the first space.

For example, the information related to the first space may include the number of a plane included in the first space, the direction, position, rotation angle, and/or size value of the plane relative to the electronic device.

According to various embodiments, the processor 250 may, in operation 320, store information of the analyzed first space and a configuration of an object placed by the user in the first space.

According to an embodiment, the processor 250 may identify whether an object exists in the first space in response to the user's command.

For example, the processor 250 may display a notification pop-up and terminate execution in response to an absence of an object in the first space.

For example, the processor 250 may analyze the configuration of the object placed by the user in response to existence of an object in the first space.

According to an embodiment, the processor 250 may analyze the configuration of the object placed by the user to obtain information related to the configuration of the object.

For example, information related to the object may include the position of the object relative to the electronic device, information (e.g., the number of a plane) on a plane on which the object depends, a position, rotation, a size value relative to the plane on which the object depends, and/or relevant application information.

According to an embodiment, the processor 250 may store the configuration of the object placed in the first space in the memory 260.

According to an embodiment, the processor 250 may store the information of the first space and the information related to the configuration of the object placed by the user in the memory 260.

For example, the processor 250 may store, in the memory 260, with the name "first configuration", the number of a plane included in the first space, the direction, position, rotation angle, and/or size value of the plane relative to the electronic device, and the position of the object relative to the electronic device, information (e.g., the number of a plane) on a plane on which the object depends, a position, rotation, a size value relative to the plane on which the object depends, and/or relevant application information.

According to various embodiments, the processor 250 may analyze a second space in operation 330.

According to an embodiment, while wearing the electronic device, the user may input a command of retrieving the first configuration stored in the memory 260. For example, the user may input a gesture of selecting a designated icon (e.g., a first configuration icon) related to the command of retrieving the first configuration after inputting a gesture of selecting a designated icon (e.g., an application list) displayed on the display 214.

According to an embodiment, the processor 250 may analyze the second space based on an image of the second space, which is captured by the camera 213, and a relative distance from an item existing in the second space to the camera 213, which is measured by the sensor 280, and obtain information related to the second space.

For example, the information related to the second space may include the number of a plane included in the second space, the direction, position, rotation angle, and/or size value of the plane relative to the electronic device.

According to various embodiments, the processor 250 may, in operation 340, relocate the stored configuration of the object based on information of the analyzed second space.

According to an embodiment, the processor 250 may compare the first space with the second space.

For example, the processor 250 may compare information of at least one plane included in the first space with information of at least one plane included in the second space.

According to an embodiment, the processor 250 may adjust the configuration of the object corresponding to the first configuration and place the object based on a result of comparison between the first space and the second space.

For example, in response to a determination that the quantity, the direction, and the scale of planes included in the first space matches those of the second space within a designated range, the processor 250 may adjust the position and size of the object of the first configuration and place the object.

According to various embodiments, the processor 250 may display a relocated object on the display 214 in operation 350.

According to an embodiment, the processor 250 may relocate and adjust objects of the first configuration to be suitable for the second space, and display the objects on the display 214 in the second space.

According to an embodiment, the processor 250 may relocate the objects based on the user's additional placement input.

According to an embodiment, the user may make an input to relocate the objects of the second space placed by the processor 250 by means of a movement gesture.

Figure 4:
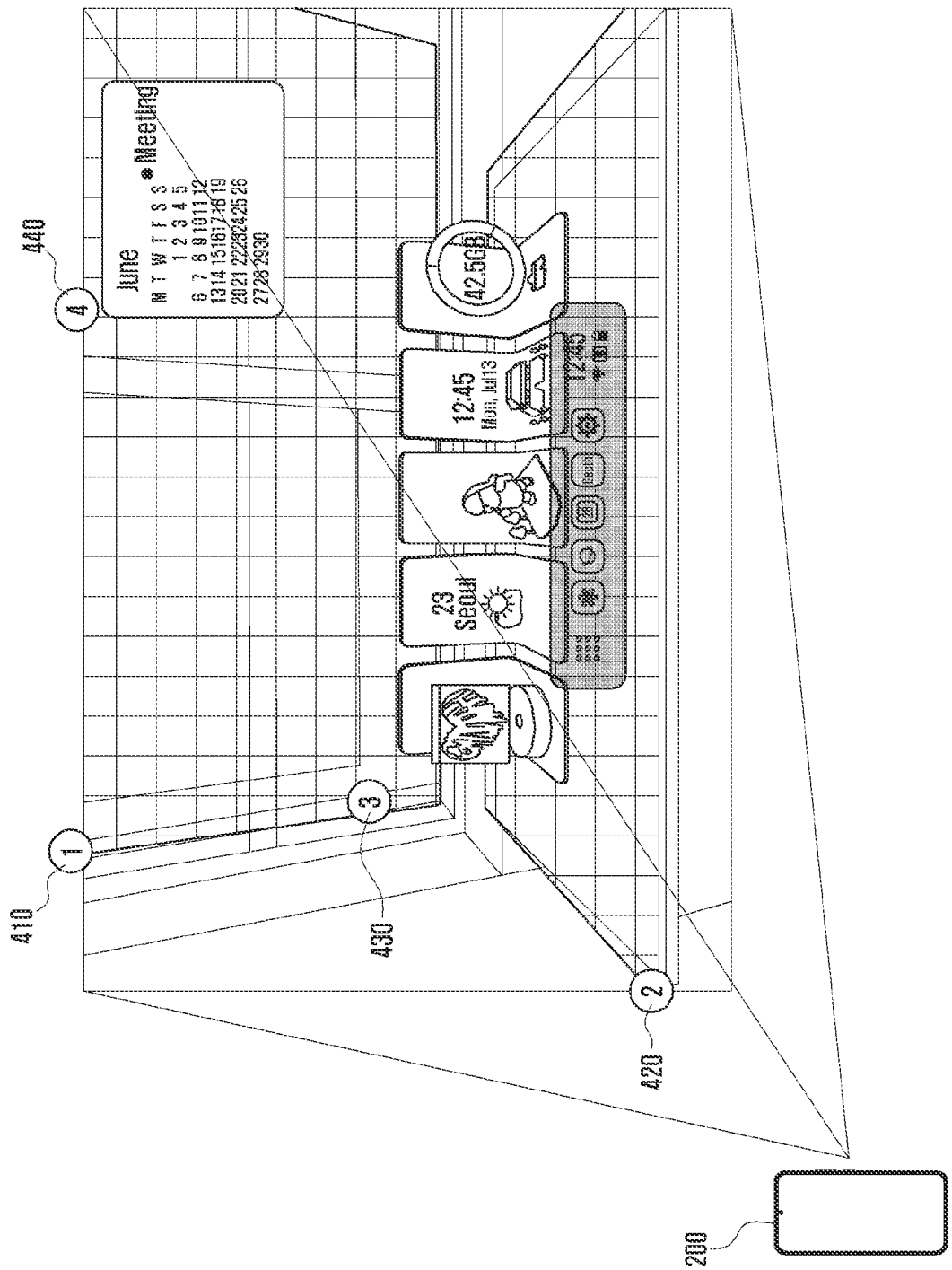
FIG. 4 is a diagram illustrating an example in which an electronic device according to various embodiments analyzes a space and analyzes an object placed in the space.

FIG. 4 is a diagram illustrating an example in which the electronic device 200 according to various embodiments analyzes a space and analyzes an object placed. in the space.

According to various embodiments, the processor 250 may analyze a space and store information related to the space in the memory 260.

According to an embodiment, the processor 250 may analyze a space, based on an image of the space, which is captured by the camera 213, and a relative distance from an item existing in the space to the camera 213, which is measured by the sensor 280, and obtain information related to the space.

According to an embodiment, the information related to the space may include the number of a plane included in the space, the direction, position, rotation angle, and/or size value of the plane relative to the electronic device 200.

According to an embodiment, the information related to the space may include the number of a plane included in the space, the absolute direction, position, rotation angle, and/or size value of the plane based on the earth coordinate system.

According to various embodiments, in FIG. 4, a first space may include a first plane 410 and a second plane 420.

According to an embodiment, information related to the space may include information related to the first plane 410 and information related to the second plane 420.

For example, the information related to the first plane may include plane #1 410 (the number of the plane), a front direction (a reference direction of the electronic device 200), x=0.2, y=0.5, z=1.5 (a reference position of the electronic device 200), and a horizontal length of 2 and a vertical length of 2 (the size of the plane).

For example, the information related to the second plane may include plane #2 420 (the number of the plane), a bottom direction (a reference direction of the electronic device 200), x=0, y=-0,2, z=0.8 (a reference position of the electronic device 200), and a horizontal length of 1.1 and a vertical length of 0.5 (the size of the plane).

According to an embodiment, the processor 250 may analyze a configuration of an object and store information related to the configuration of the object.

According to an embodiment, information related to the object may include the position of the object relative to the electronic device 200, information (e.g., the number of a plane) on a plane on which the object depends, a position, rotation, a size value relative to the plane on which the object depends, and/or relevant application information.

According to an embodiment, the information related to the object may include information (e.g., the number of a plane) on a plane on which the object depends, the absolute position, rotation, size value of the object based on the earth coordinate system, and/or relevant application information.

According to various embodiments, in FIG. 4, the first space may include a first object 430 and a second object 440.

According to an embodiment, information related to the object may include information related to the first object 430 and information related to the second object 440.

For example, the information related to the first object 430 may include x=−0.2, y=0.2, z=0.8 (a reference position of the electronic device 200), plane #2 420 (the number of the plane on which the object depends), x=−0.2, y=0.15, z=0 (the position of the object relative to the plane on which the object depends), x=0, y=0, z=0 (a rotation value relative to the plane on which the object depends), and/or x=0.2, y=0.2, z=0.2 (a size relative to the plane on which the object depends).

For example, the information related to the second object 440 may include x=0.1, y=0.5, z=1.5 (a reference position of the electronic device 200), plane #1 410 (the number of the plane on which the object depends), x=−0.1, y=0, z=0 (the position of the object relative to the plane on which the object depends), x=0, y=0, z=0 (a rotation value relative to the plane on which the object depends), and/or x=0.2, y=0.2, z=0.2 (a size relative to the plane on which the object depends).

Figure 5A:
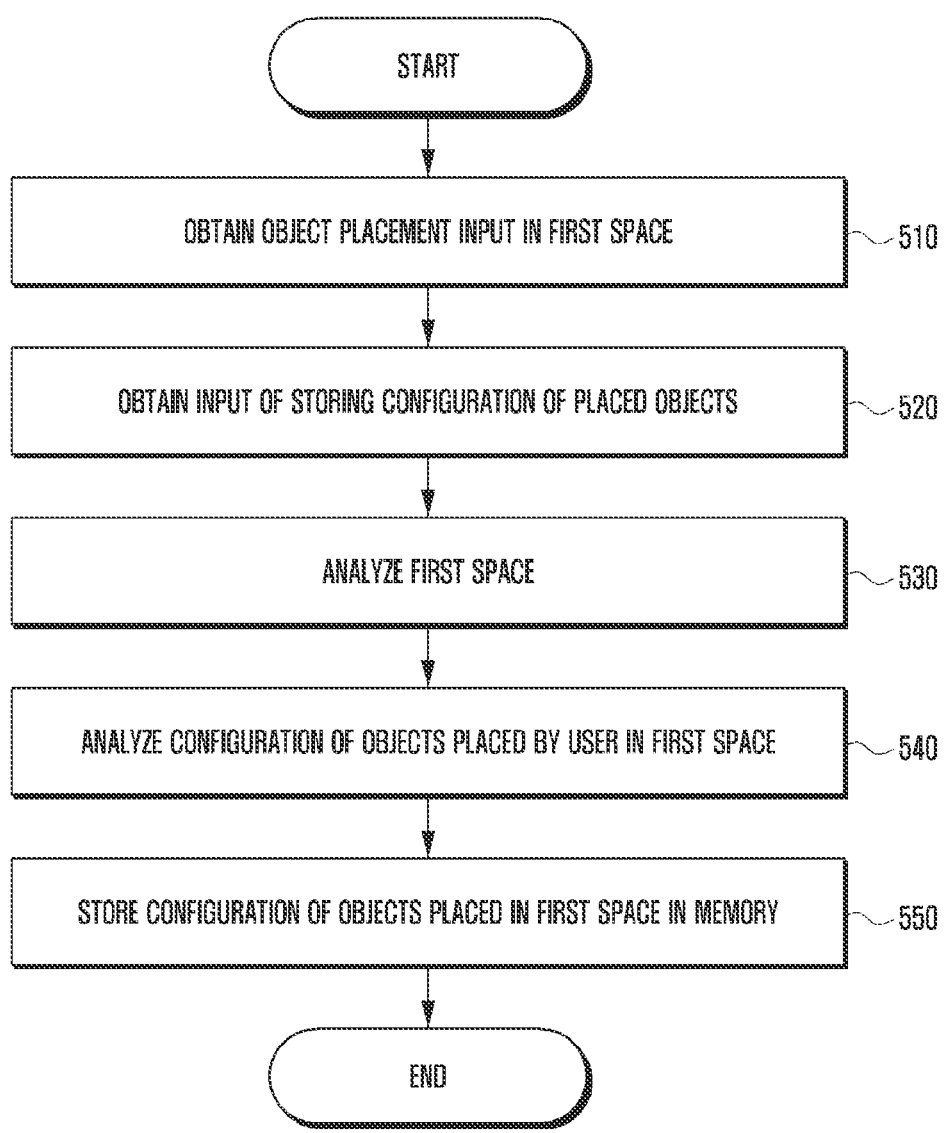
FIG. 5A is a flowchart illustrating a method in which an electronic device according to various embodiments stores a configuration of objects placed by a user in a first space.

FIG. 5A is a flowchart illustrating a method in which an electronic device (e.g., the electronic device 200 in FIG. 2D) according to various embodiments stores a configuration of objects placed by a user in a first space.

FIG. 5B to FIG. 5F are diagrams illustrating illustrative screens of respective operations shown in FIG. 5A.

The flowchart of FIG. 5A and the embodiments of FIG. 5B to FIG. 5F according to various embodiments may be embodiments corresponding to operation 310 and operation 320 in FIG. 3.

According to various embodiments, the processor 250 may obtain an input of object placement in a first space in operation 510.

According to an embodiment, a user may place objects displayed on the display 214 wearing the electronic device 200.

For example, the user may make an input to place objects by using a movement gesture.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

Figure 5B:
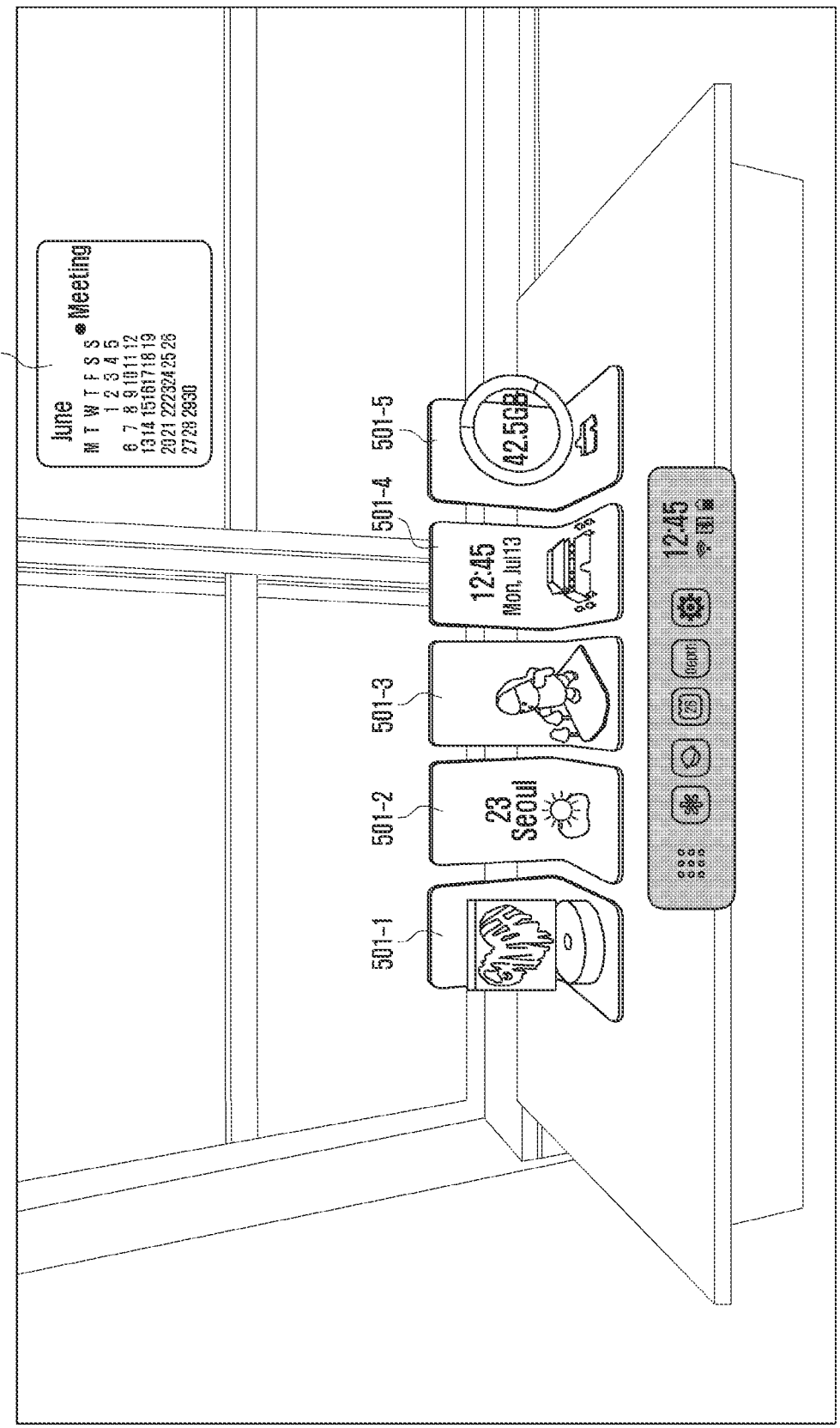

FIG. 5B is a diagram illustrating a screen including placement of objects 501-1, 501-2, 501-3, 501-4, 501-5, and 501-6 in a first space displayed on display 214 according to an embodiment.

A user may place the objects 501-1, 501-2, 501-3, 501-4, 501-5, and 501-6 displayed on the display 214 by using a gesture in the first space as illustrated in FIG. 5B.

According to various embodiments, the processor 250 may obtain an input of storing a configuration of placed objects in operation 520.

According to an embodiment, the user may input a command of storing an object placement configuration in the electronic device 200 while wearing the electronic device 200.

For example, the user may input a gesture of selecting a designated icon (e.g., a "+" button) related to the command of storing the object placement configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 5C:
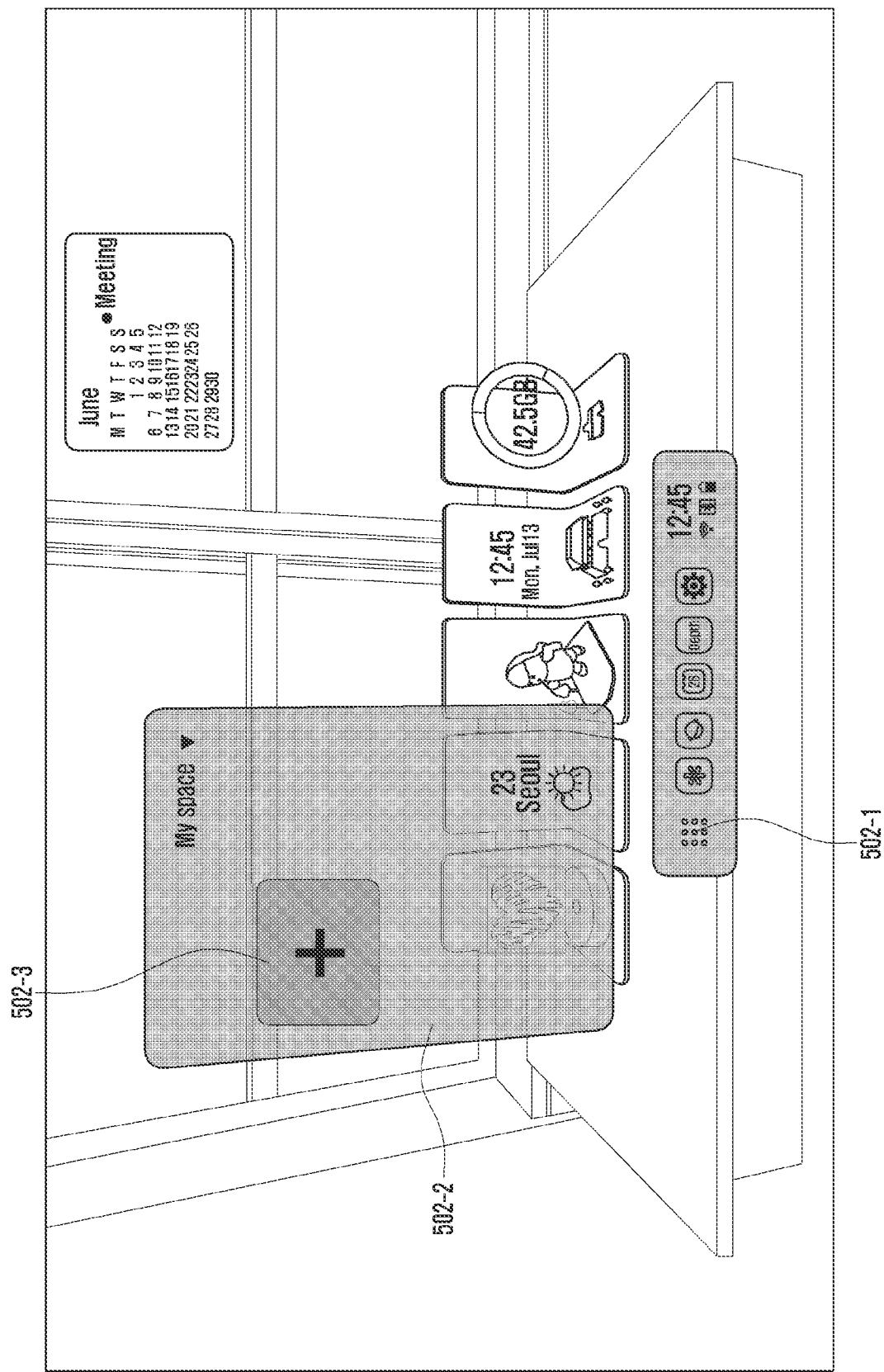

FIG. 5C is a diagram illustrating a screen including an icon for storing an object placement configuration displayed on the display 214 according to an embodiment.

The user may input a gesture of selecting a menu icon 502-1 as illustrated in FIG. 5C and then input a gesture of selecting a store icon 502-3 in a menu list 502-2, thereby inputting a command of storing an object placement configuration in the electronic device 200.

According to various embodiments, the processor 250 may analyze the first space in operation 530.

According to an embodiment, the processor 250 may analyze the first space based on an image of the first space, which is captured by the camera 213, and a relative distance from an item existing in the first space to the camera 213, which is measured by the sensor 280, and obtain information related to the first space.

For example, the information related to the first space may include the number of a plane included in the first space, the direction, position, rotation angle, and/or size value of the plane relative to the electronic device 200.

Figure 5D:
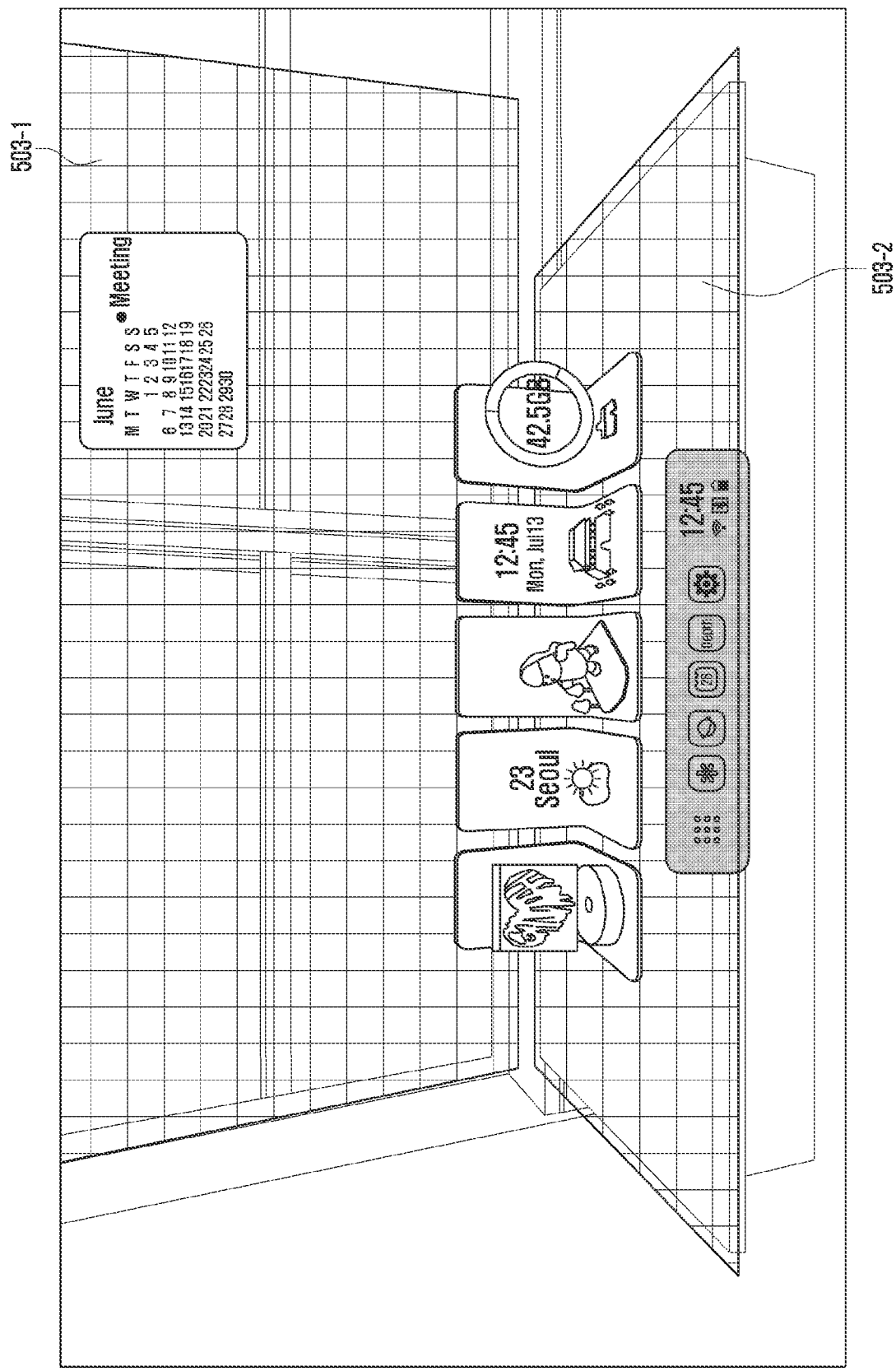

FIG. 5D is a diagram illustrating an example of a screen in which the processor 250 analyzes the first space, the image of which is captured by the camera 213 according to an embodiment.

According to an embodiment, the electronic device 200 may analyze a first plane 503-1 and a second plane 503-2 included in the first space as illustrated in FIG. 5D.

For example, the processor 250 may analyze the first space to obtain the number of each of the first plane 503-1 and/or the second plane 503-2 included in the first space, a direction, position, rotation angle, and/or size value relative to the electronic device 200.

According to various embodiments, the processor 250 may, in operation 540, analyze the configuration of the objects placed by the user in the first space.

According to an embodiment, the processor 250 may identify whether an object exists in the first space, in response to the user's command.

For example, the processor 250 may display a notification pop-up and terminate an execution thereof in response to an absence of an object in the first space.

For example, the processor 250 may analyze the configuration of the object placed by the user in response to existence of art object in the first space.

According to an embodiment, the processor 250 may analyze the configuration of the objects placed by the user, to obtain information related to the configuration of the objects.

For example, information related to the object may include the position of the object relative to the electronic device 200, information (e.g., the number of a plane) on a plane on which the object depends, a position, rotation, a size value relative to the plane on which the object depends, and/or relevant application information.

FIG. 5E is a diagram illustrating an example of a screen in which the processor 250 analyzes the configuration of the objects placed by the user according to an embodiment.

According to an embodiment, the electronic device 200 may analyze the configuration of the objects 501-1, 501-2, 501-3, 501-4, 501-5, and 501-6 placed by the user to obtain information related to the configuration of the objects, as illustrated in FIG. 5E.

According to various embodiments, the processor 250 may, in operation 550, store the configuration of the objects placed in the first space in the memory 260.

According to an embodiment, the processor 250 may store the information of the first space and the information related to the configuration of the objects placed by the user in the memory 260.

For example, the processor 250 may store, in the memory 260 as, for example, the name of a "first configuration", the number of a plane included in the first space, the direction, position, rotation angle, and/or size value of the plane relative to the electronic device 200, and the position of the object relative to the electronic device 200, information the number of a plane) on a plane on which the object depends, a position, rotation, a size value relative to the plane on which the object depends, and/or relevant application information.

Figure 5F:
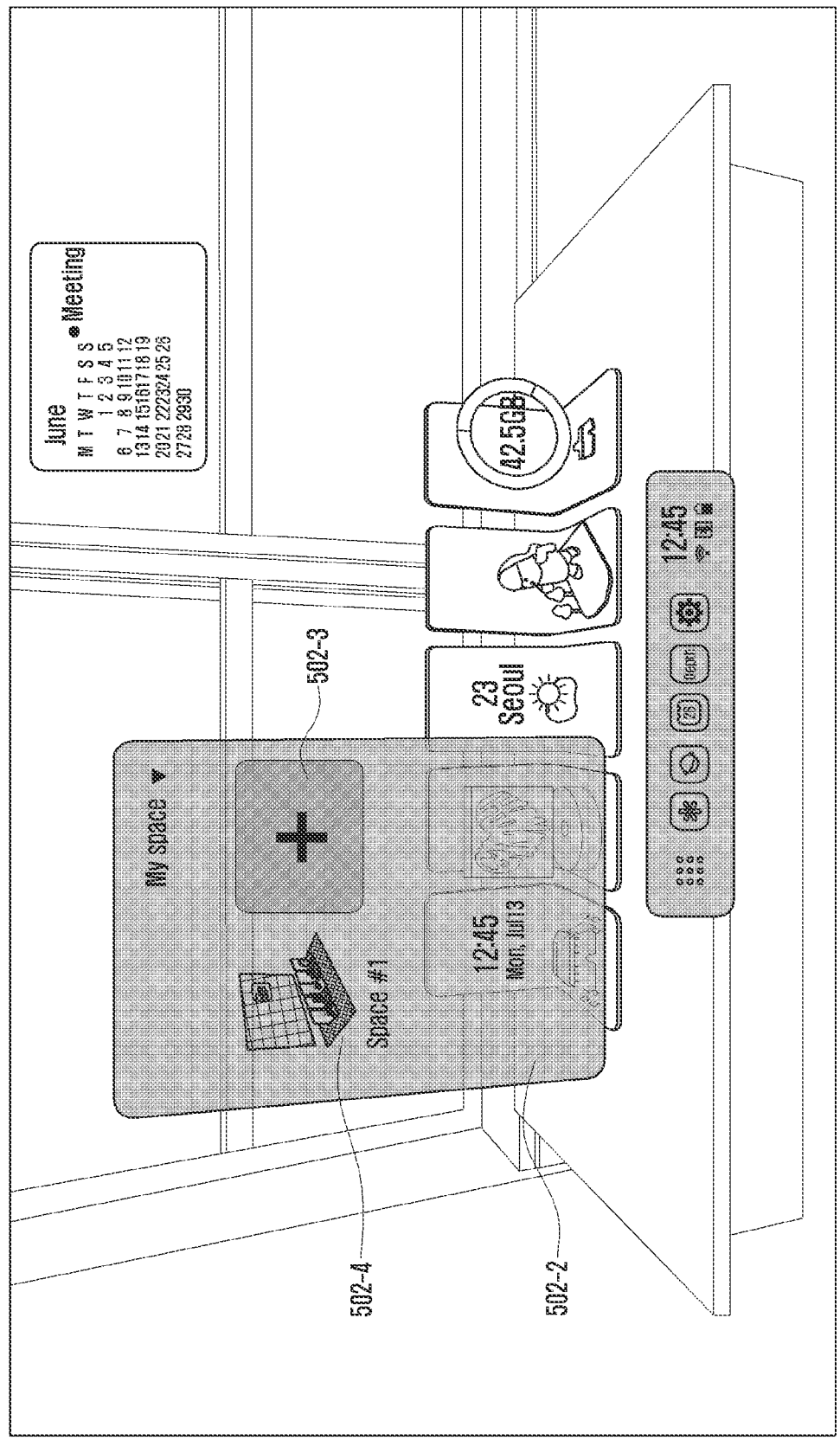

FIG. 5F is a diagram illustrating an example of a screen after the processor 250 stores the configuration of the objects placed in the first space according to an embodiment.

According to an embodiment, the processor 250 may store the first configuration (e.g., space #1) that is the configuration of the objects placed in the first space, and then display an icon 502-4 related to the first configuration in the menu list 502-2, as illustrated in FIG. 5F.

Figure 6:
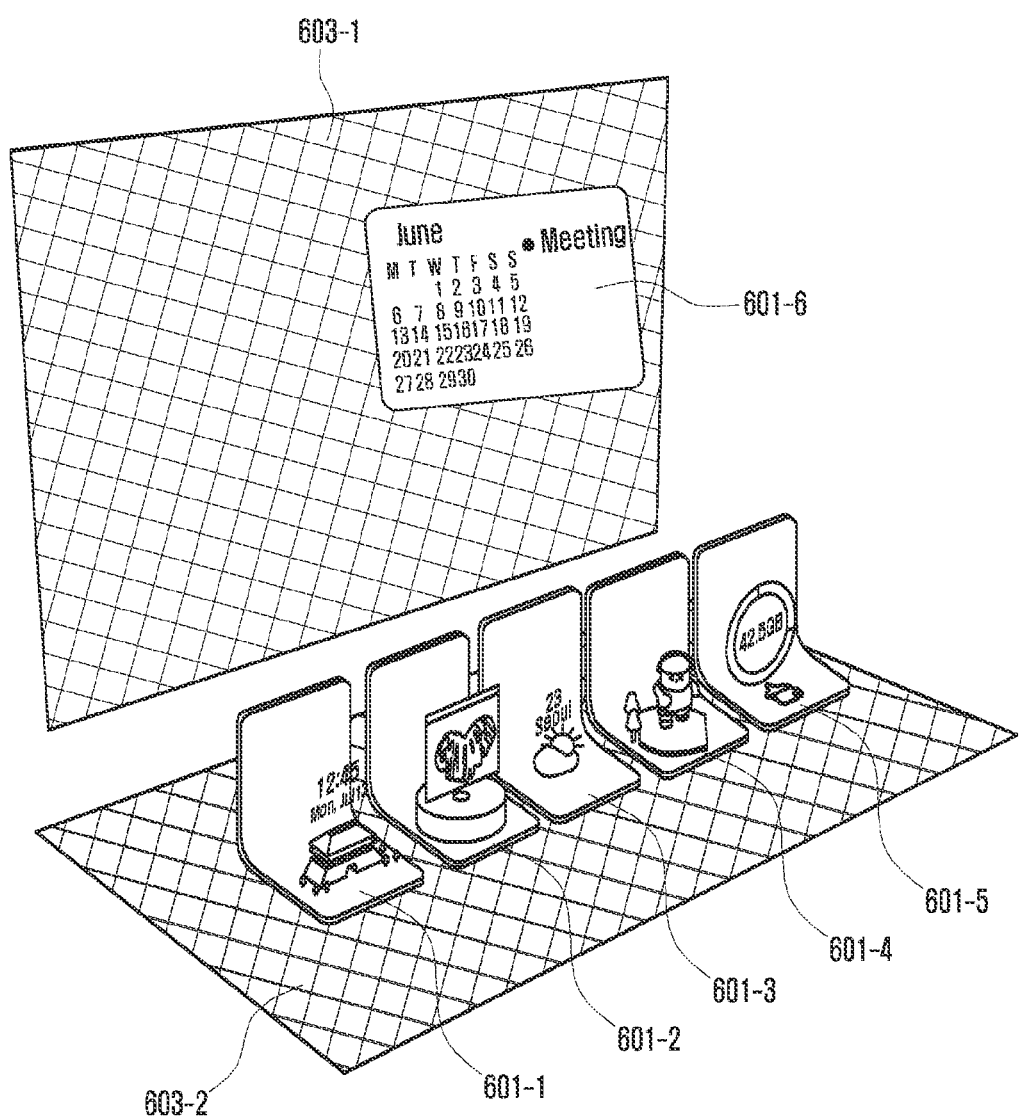
FIG. 6 is a diagram illustrating an example of a first configuration stored in a memory by an electronic device according to various embodiments.

FIG. 6 is a diagram illustrating an example of a first configuration stored in the memory 260 by an electronic device the electronic device 200 in FIG. 2D) according to various embodiments.

According to various embodiments, information stored as the first configuration may include information related to a space and information related to an object.

Referring to FIG. 6, a first configuration may include a first plane 603-1 and a second plane 603-2 corresponding to a first space, and objects 601-1, 601-2, 601-3, 601-4, 601-5, and 601-6 placed in the first space.

According to an embodiment, information stored as the first configuration may include the number of each of the first plane 603-1 and the second plane 603-2 included in the first space, the direction, position, rotation angle, and/or size value of the planes relative to the electronic device 200, and the position of the objects 601-1, 601-2, 601-3, 601-4, 601-5, and 601-6 relative to the electronic device 200, information (e.g., the number of a plane) on a plane on which the object depends, a position, rotation, a size value relative to the plane on which the object depends, and/or relevant application information.

Figure 7A:
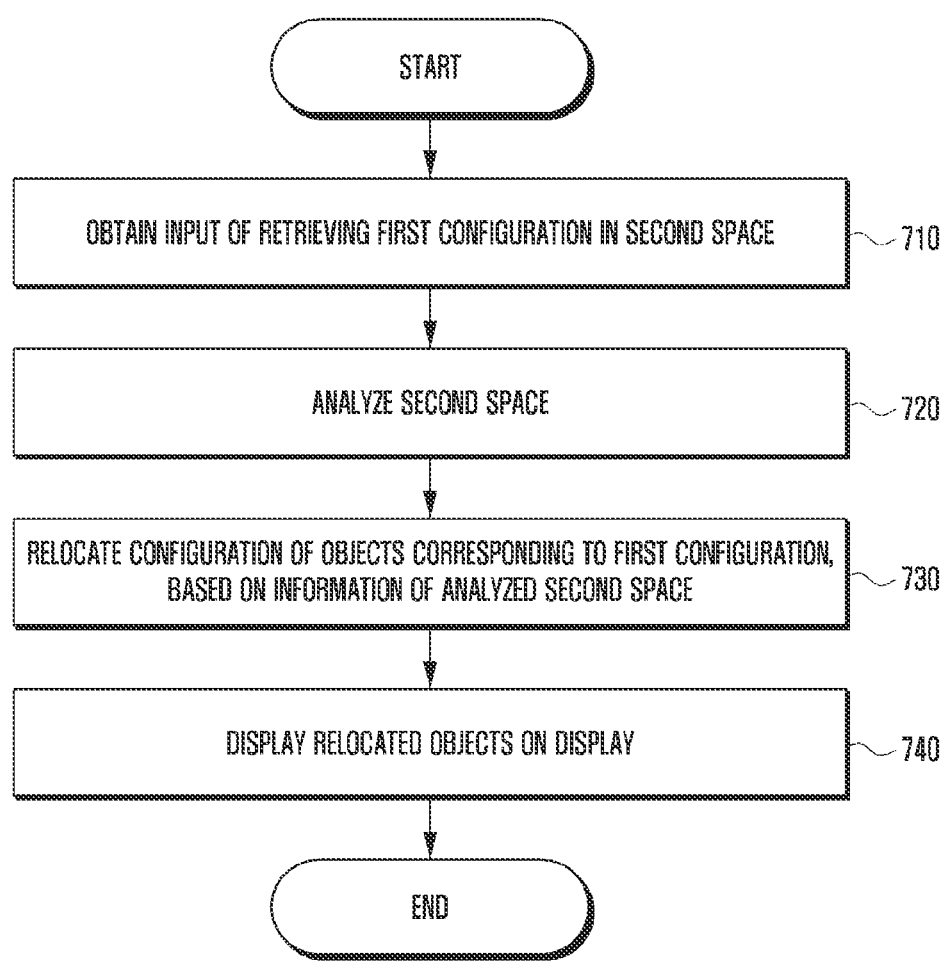
FIG. 7A is a flowchart illustrating a method in which an electronic device according to various embodiments retrieves a stored object configuration in a second space and displays same.

FIG. 7A is a flowchart illustrating a method in which an electronic device (e.g., the electronic device 200 in FIG. 2D) according to various embodiments retrieves a stored object configuration in a second space and displays same.

FIG. 7B to FIG. 7F are diagrams illustrating examples of respective operations shown in FIG. 7A.

The flowchart of FIG. 7A and the embodiments of FIG. 7B to FIG. 7F according to various embodiments may be embodiments corresponding to operation 330 to operation 350 in FIG. 3.

In the embodiments of FIG. 7B to FIG. 7F, a second space may be a space which has a quantity and directions of planes identical to those of a first space, and has plane sizes matching those of the first space within a designated range.

According to various embodiments, the processor 250 may obtain an input of retrieving a first configuration in a second space in operation 710.

According to an embodiment, while wearing the electronic device 200, a user may input a command of retrieving the first configuration stored in the memory 260.

For example, the user may input a gesture of selecting a designated icon (e.g., a first configuration icon) related to the command of retrieving the first configuration after inputting a gesture of selecting a designated icon an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 7B:
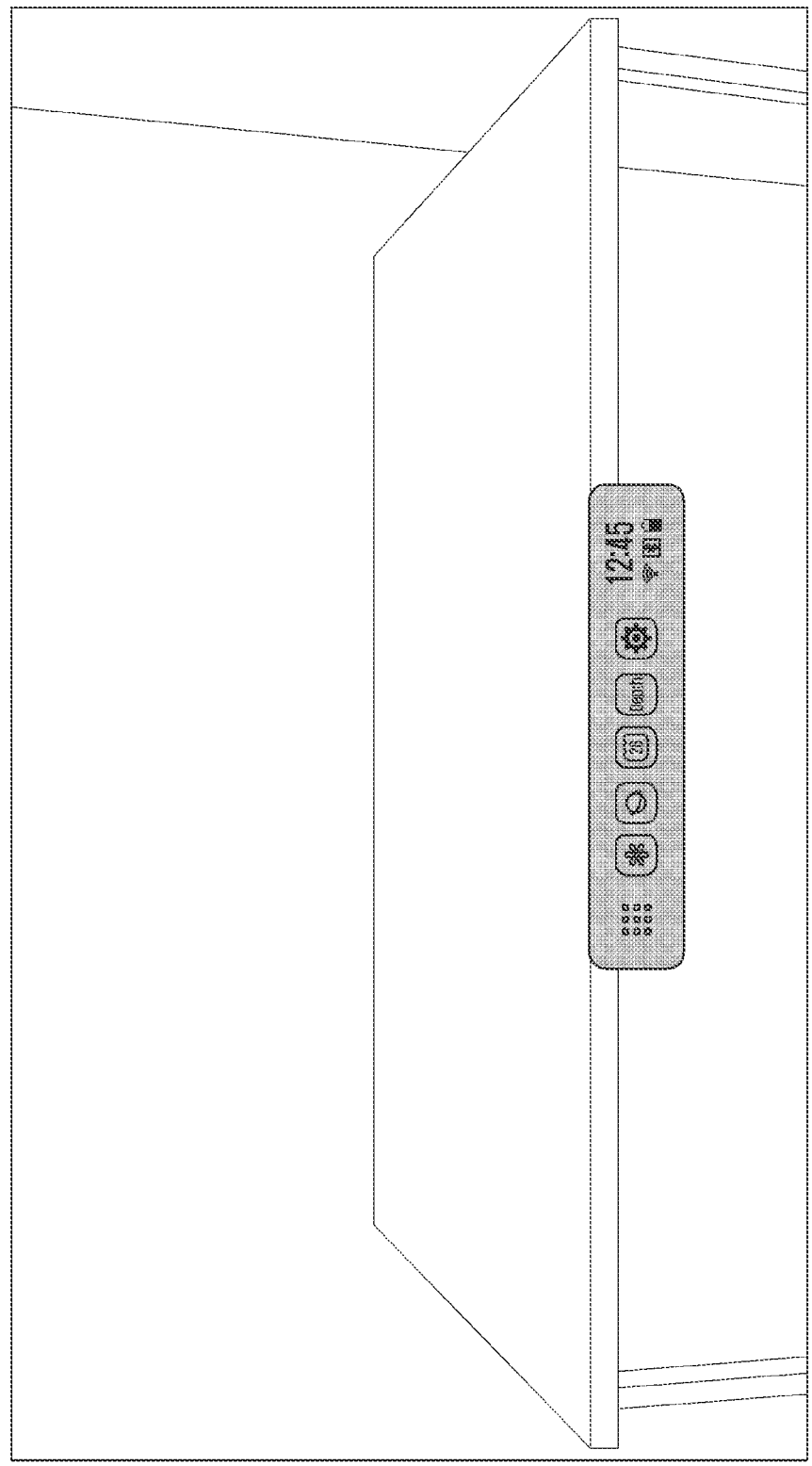

FIG. 7B may be an example of a screen displayed on the display 214 in the second space according to an embodiment.

FIG. 7C is a diagram illustrating a screen including a designated icon (e.g., a first configuration icon) related to a command of retrieving an object placement configuration according to an embodiment The user may input a gesture of selecting a menu icon 702-1 as illustrated in FIG. 7C and then input a gesture of selecting a first configuration icon 702-3 in a menu list 702-2, thereby inputting a command of retrieving an object placement configuration in the electronic device 200.

According to various embodiments, the processor 250 may analyze the second space in operation 720.

According to an embodiment, the processor 250 may analyze the second space based on an image of the second space, which is captured by the camera 213, and a relative distance from an item existing in the second space to the camera 213, which is measured by the sensor 280, and obtain information related to the second space.

For example, the information related to the second space may include the number of a plane included in the second space, the direction, position, rotation angle, and/or size value of the plane relative to the electronic device 200.

FIG. 7D is a diagram illustrating an example of a screen in which the processor 250 analyzes the second space, the image of which is captured by the camera 213 according to an embodiment.

According to an embodiment, the electronic device 200 may analyze a first plane 703-1 and a second plane 703-2 existing in the second space, as illustrated in FIG. 7D.

For example, the processor 250 may analyze the second space to obtain the number of each of the first plane 703-1 and/or the second plane 703-2 included in the second space, a direction, position, rotation angle, and/or size value relative to the electronic device 200.

According to various embodiments, the processor 250 may, in operation 730, relocate a configuration of objects corresponding to the first configuration based on information of the analyzed second space.

According to an embodiment, the processor 250 may compare the first space with the second space.

For example, the processor 250 may compare information of at least one plane included in the first space with information of at least one plane included in the second space.

According to an embodiment, the processor 250 may adjust the configuration of the objects corresponding to the first configuration and place the objects based on a result of comparison between the first space and the second space.

For example, in response to a determination that the quantity, the direction, and the scale of planes included in the first space matches those of the second space within a designated range, the processor 250 may adjust the sizes of the objects of the first configuration and place the objects.

FIG. 7E is a diagram illustrating an example of a screen in which the processor 250 may adjust the size of the object 601-6 depending on the first plane and place the object to correspond to the first plane 703-1 of the second space according to the size ratio between the first plane 703-1 of the second space and the first plane 603-1 of the first space.

For example, the processor may adjust the sizes of the objects 601-1, 601-2, 601-3, 601-4, and 601-5 depending on the first plane and place the objects to correspond to the second plane 703-2 of the second space according to the size ratio between the second plane 703-2 of the second space and the second plane 603-2 of the first space.

According to various embodiments, the processor 250 may display relocated objects on the display 214 in operation 740.

Figure 7F:
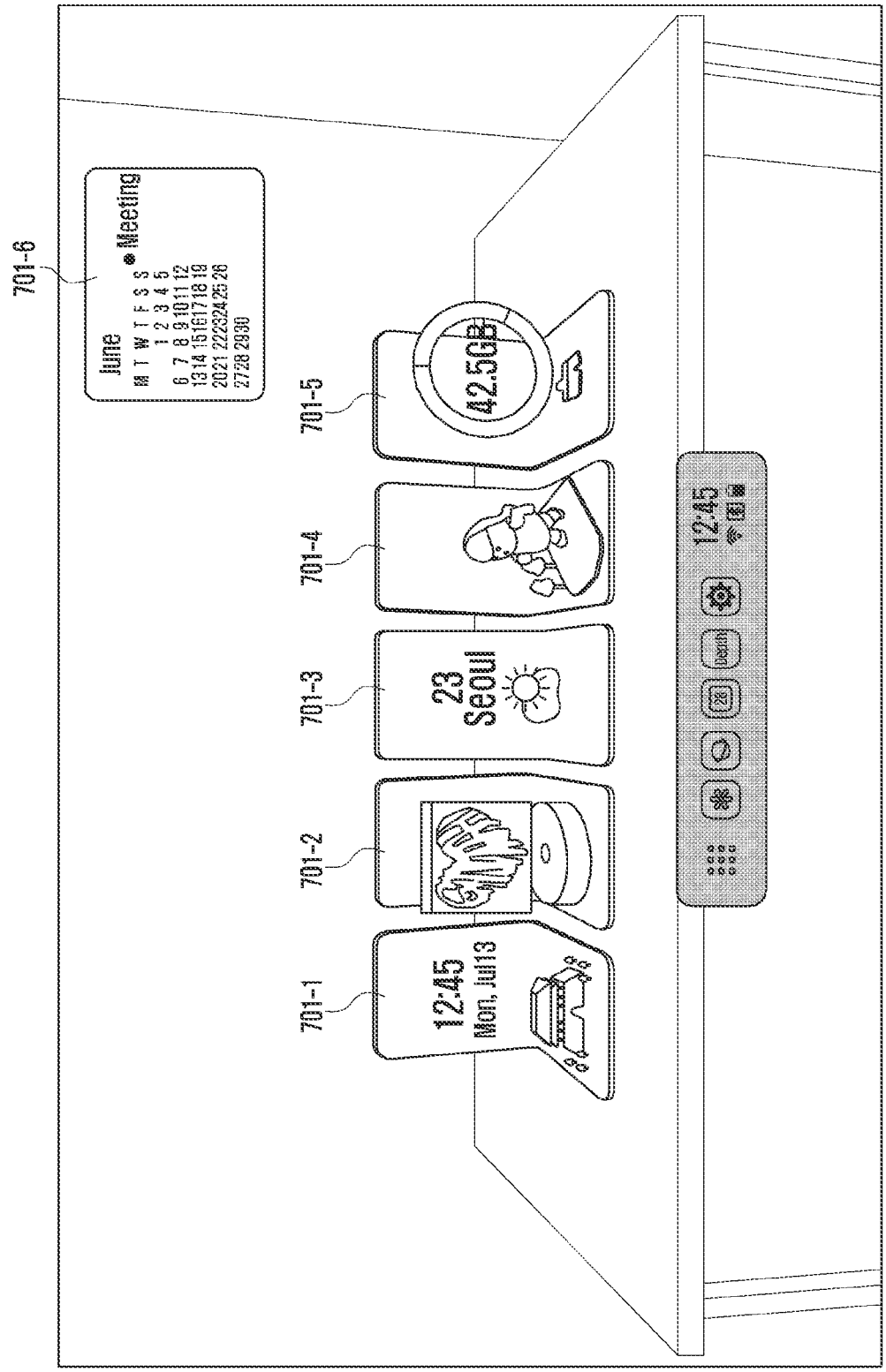

FIG. 7F is a diagram illustrating a screen including relocated objects 701-1, 701-2, 701-3, 701-4, 701-5, and 701-6 displayed on the display 214 according to an embodiment.

According to an embodiment, the processor 250 may relocate and adjust the objects 601-1, 601-2, 601-3, 601-4, 601-5, and 601-6 of the first configuration to be suitable for the second space, and display the objects 701-1, 701-2, 701-3, 701-4, 701-5, and 701-6 on the display 214 in the second space.

According to various embodiments, the processor 250 may relocate the objects based on the user's additional placement input.

According to an embodiment, the user may make an input to relocate the objects 701-1, 701-2, 701-3, 701-4, 701-5, and 701-6 of the second space placed by the processor 250, by means of a movement gesture.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

Figure 8A:
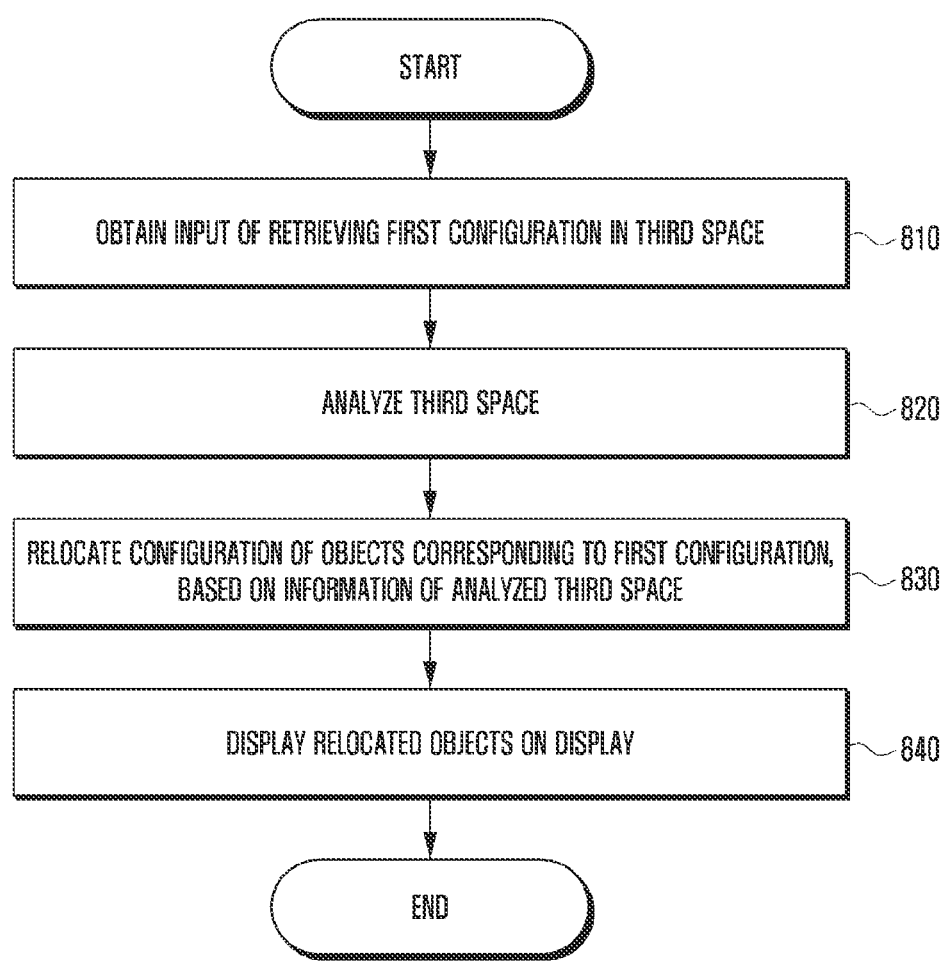
FIG. 8A is a flowchart illustrating a method in which an electronic device according to various embodiments retrieves a stored object configuration in a third space and displays same.

FIG. 8A is a flowchart illustrating a method in which an electronic device (e.g., the electronic device 200 in FIG. 2D)

according to various embodiments retrieves a stored object configuration in a third space and displays same.

FIG. 8B to FIG. 8F are diagrams illustrating examples of respective operations shown in FIG. 8A.

The flowchart of FIG. 8A and the embodiments of FIG. 8B to FIG. 8F according to various embodiments may be embodiments corresponding to operation 330 to operation 350 in FIG. 3.

In the embodiments of FIG. 8B to FIG. 8F, a third space may be a space which has a quantity and directions of planes identical to those of a first space, and has plane sizes that does not match those of the first space by a designated range or greater.

According to various embodiments, the processor 250 may obtain an input of retrieving a first configuration in a third space in operation 810.

According to an embodiment, while wearing the electronic device 200, a user may input a command of retrieving the first configuration stored in the memory 260.

For example, the user may input a gesture of selecting a designated icon (e.g., a first configuration icon) related to the command of retrieving the first configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 8B:
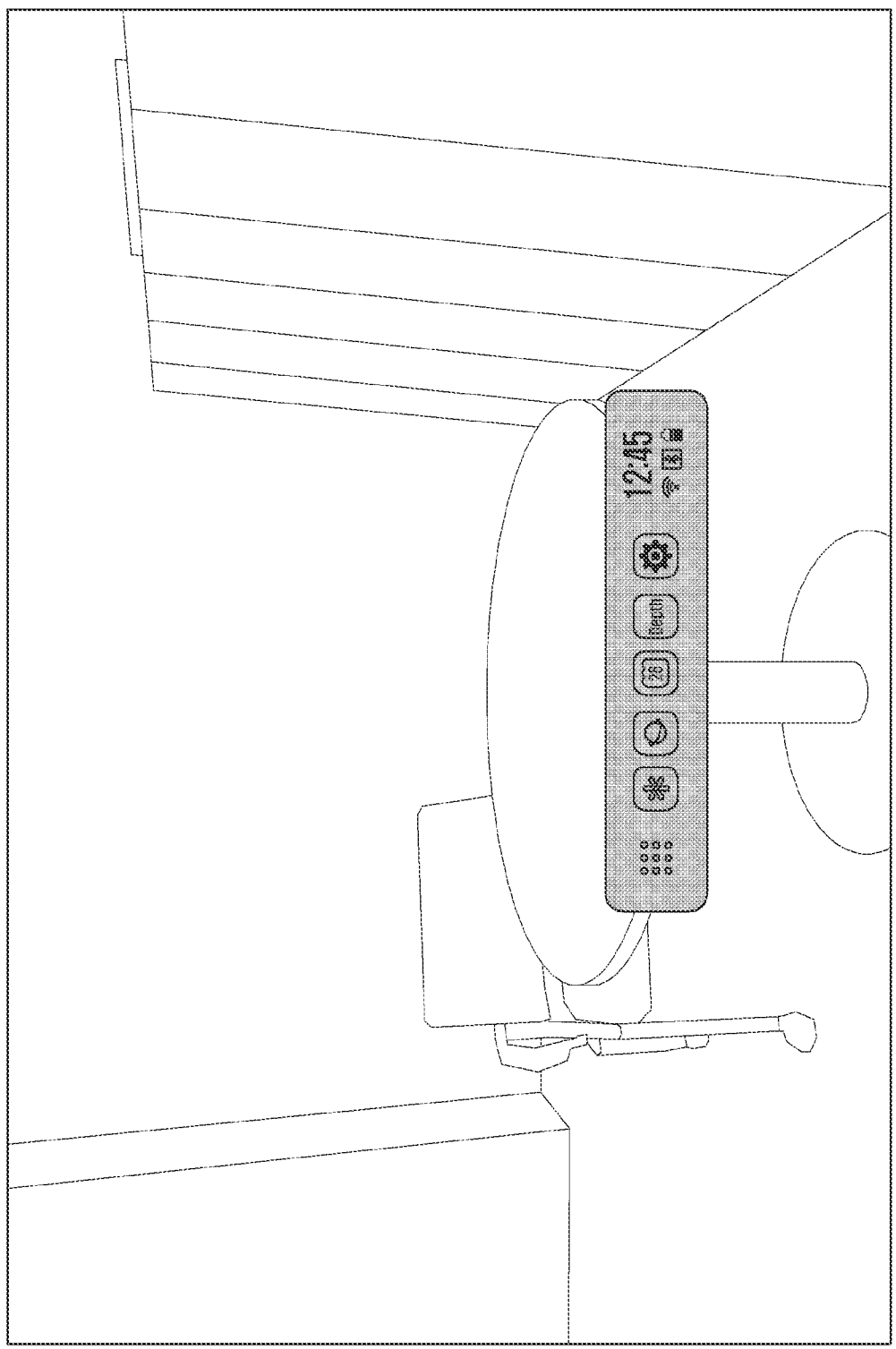

FIG. 8B may be an example of a screen displayed on the display 214 in the third space according to an embodiment.

FIG. 8C is a diagram illustrating a screen including a designated icon (e.g., a first configuration icon) related to a command of retrieving an object placement configuration according to an embodiment.

The user may input a gesture of selecting a menu icon 802-1 as illustrated in FIG. 8C and then input a gesture of selecting a first configuration icon 802-3 in a menu list 802-2, thereby inputting a command of retrieving an object placement configuration in the electronic device 200.

According to various embodiments, the processor 250 may analyze the third space in operation 820.

According to an embodiment, the processor 250 may analyze the third space based on an image of the third space, which is captured by the camera 213, and a relative distance from an item existing in the third space to the camera 213, which is measured by the sensor 280, and obtain information related to the third space, For example, the information related to the third space may include the number of a plane included in the third space, the direction, position, rotation angle, and/or size value of the plane relative to the electronic device 200.

FIG. 8D is a diagram illustrating an example of a screen in which the processor 250 analyzes the third space, the image of which is captured by the camera 213 according to an embodiment.

According to an embodiment, the electronic device 200 may analyze a first plane 803-1 and a second plane 803-2 existing in the third space, as illustrated in FIG. 8D.

For example, the processor 250 may analyze the third space to obtain the number of each of the first plane 803-1 and/or the second plane 803-2 included in the third space, a direction, position, rotation angle, and/ or size value relative to the electronic device 200.

According to various embodiments, the processor 250 may, in operation 830, relocate a configuration of objects corresponding to the first configuration based on information of the analyzed third space.

According to an embodiment, the processor 250 may compare the first space with the third space.

For example, the processor 250 may compare information of at least one plane included in the first space with information of at least one plane included in the third space.

According to an embodiment, the processor 250 may adjust the configuration of the objects corresponding to the first configuration and place the objects based on a result of comparison between the first space and the third space.

For example, in response to a determination that the quantity and the directions of planes included in the first space matches those of the third space within a designated range and plane sizes do not match within a designated range, the processor 250 may adjust the positions and sizes of the objects of the first configuration and place the objects.

Figure 8E:
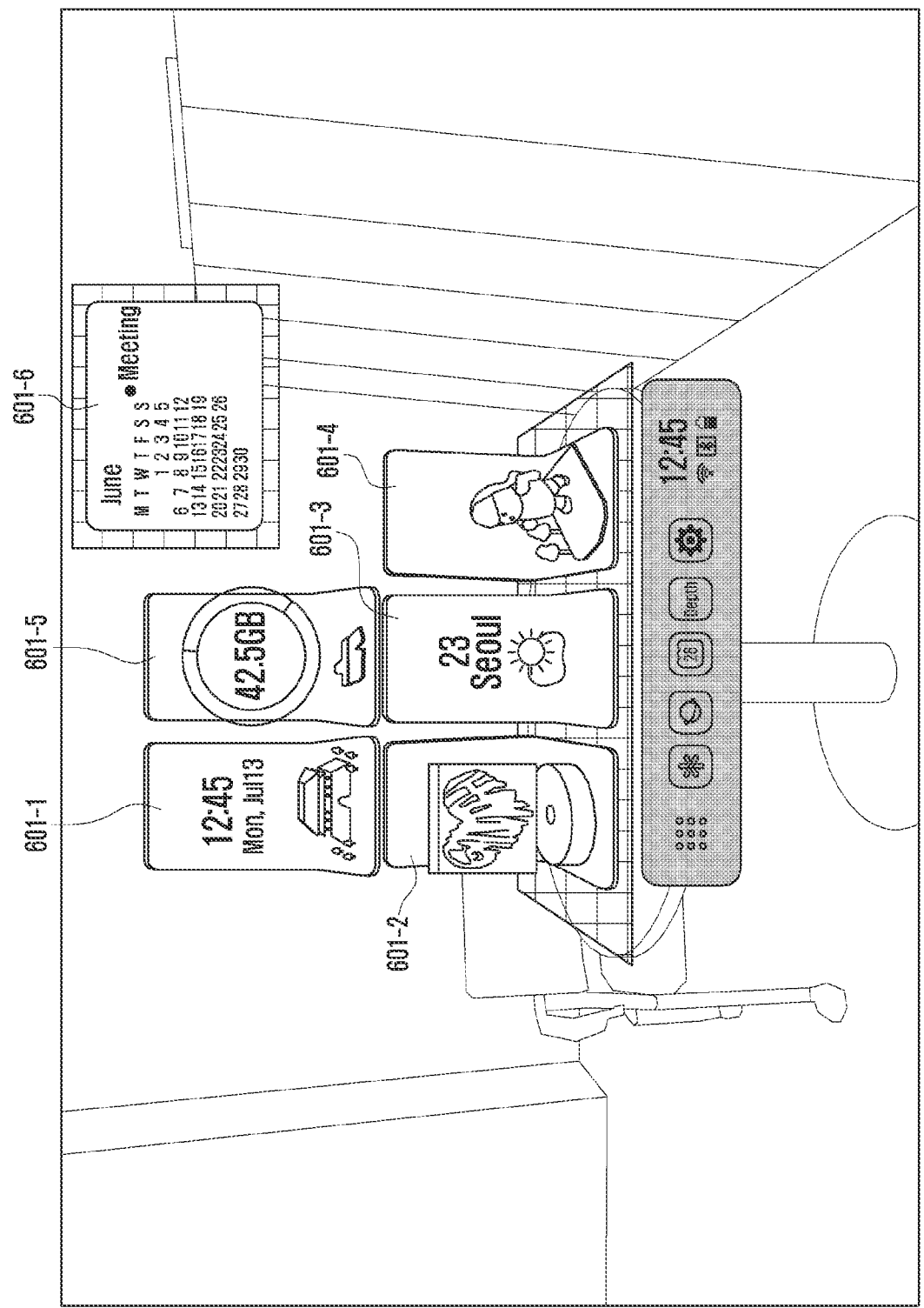

FIG. 8E is a diagram illustrating an example of a screen in which the objects of the first configuration are relocated to he suitable for the third space according to an embodiment.

For example, the processor may adjust the position and size of the object 601-6 depending on the first plane and place the object to correspond to the first plane 803-1 of the third space according to the size ratio between the first plane 803-1 of the third space and the first plane 603-1 of the first space.

For example, the processor may adjust the configuration and position of the objects 601-1, 601-2, 601-3, 601-4, and 601-5 depending on the second plane and place the objects to correspond to the second plane 803-2 of the third space in response to mismatch between the size of the second plane 803-2 of the third space and the size of the second plane 603-2 of the first space within a designated range.

For example, in the first configuration, the objects 601-1, 601-2, 601-3, 601-4, and 601-5 are arranged on the second plane 603-2 of the first space in one row and five columns. However, in response to mismatch between the size of the second plane 803-2 of the third space and the size of the second plane 603-2 of the first space within a designated range, the objects 601-1, 601-2, 601-3, 601-4, and 601-5 may be arranged in two rows and three columns. The moved objects 601-1 and 601-5 may be determined according to a designated rule (e.g., an object related to an application that the user uses a designated number of times or more).

According to various embodiments, the processor 250 may display relocated objects on the display 214 in operation 840.

Figure 8F:
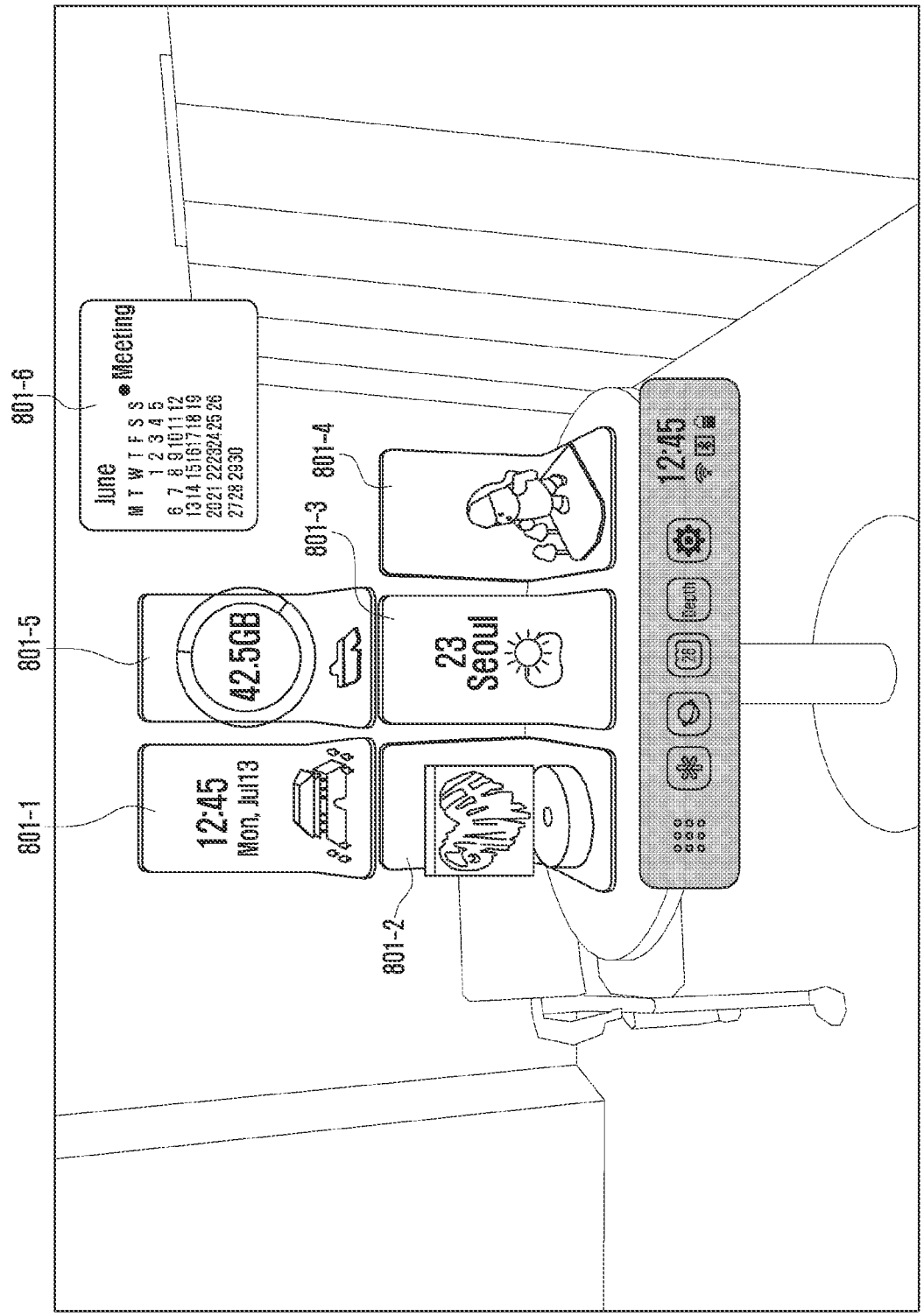

FIG. 8F is a diagram illustrating a screen including relocated objects 801-1, 801-2, 801-3, 801-4, 801-5, and 801-6 displayed on the display 214 according to an embodiment.

According to an embodiment, the processor 250 may relocate and adjust the objects 601-1, 601-2, 601-3, 601-4, 601-5, and 601-6 of the first configuration to be suitable for the third space, and display the objects 801-1, 801-2, 801-3, 801-4, 801-5, and 801-6 on the display 214 in the third space.

According to various embodiments, the processor 250 may relocate the objects based on the user's additional placement input.

According to an embodiment, the user may make an input to relocate the objects 801-1, 801-2, 801-3, 801-4, 801-5, and 801-6 of the third space placed by the processor 250, by means of a movement gesture.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

Figure 9A:
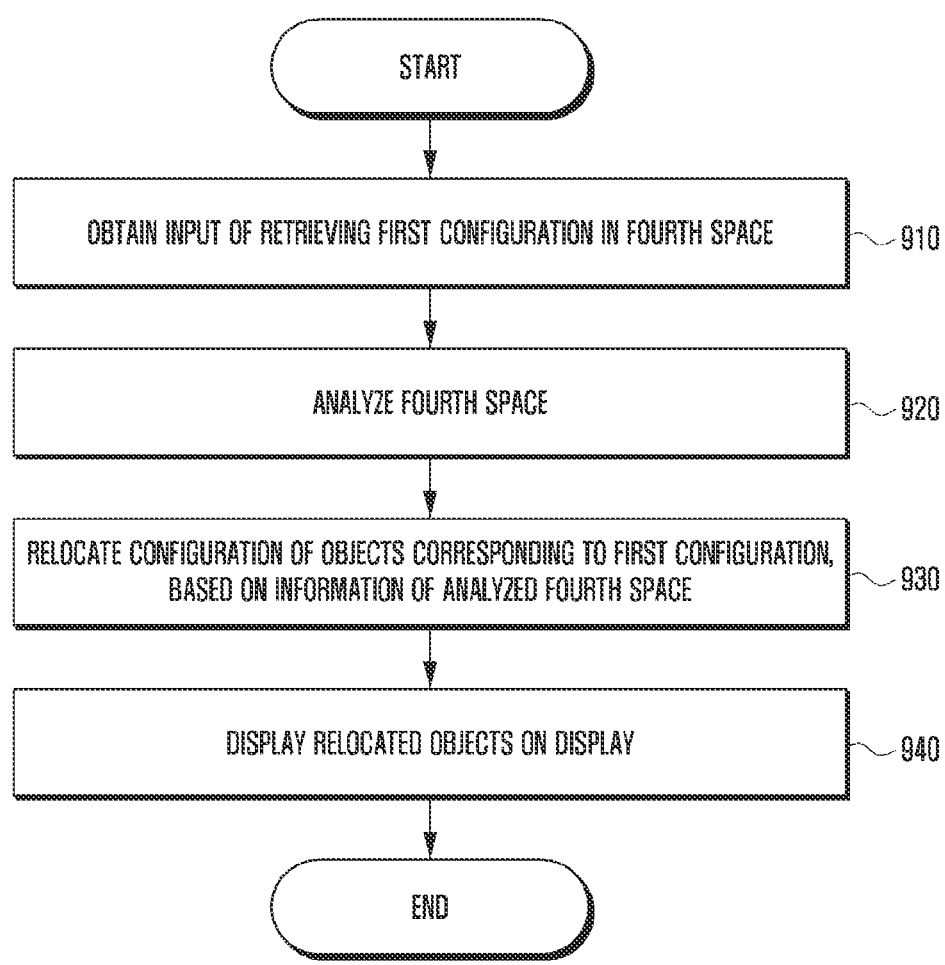
FIG. 9A is a flowchart illustrating a method in which an electronic device according to various embodiments retrieves a stored object configuration in a fourth space and displays same.

FIG. 9A is a flowchart illustrating a method in which an electronic device (e.g., the electronic device 200 in FIG. 2D) according to various embodiments retrieves a stored object configuration in a fourth space and displays same.

FIG. 9B to FIG. 9F are diagrams illustrating examples of respective operations shown in. FIG. 9A.

The flowchart of FIG. 9A and the embodiments of FIG. 9B to FIG. 9F according to various embodiments may be embodiments corresponding to operation 330 to operation 350 in FIG. 3.

In the embodiments of FIG. 9B to FIG. 9F, a fourth space may be a space which has the quantity of planes not identical to that of planes included in a first space.

According to various embodiments, the processor 250 may obtain an input of retrieving a first configuration in a fourth space in operation 910.

According to an embodiment, while wearing the electronic device 200, a user may input a command of retrieving the first configuration stored in the memory 260.

For example, the user may input a gesture of selecting a designated icon (e.g., a first configuration icon) related to the command of retrieving the first configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 9B:
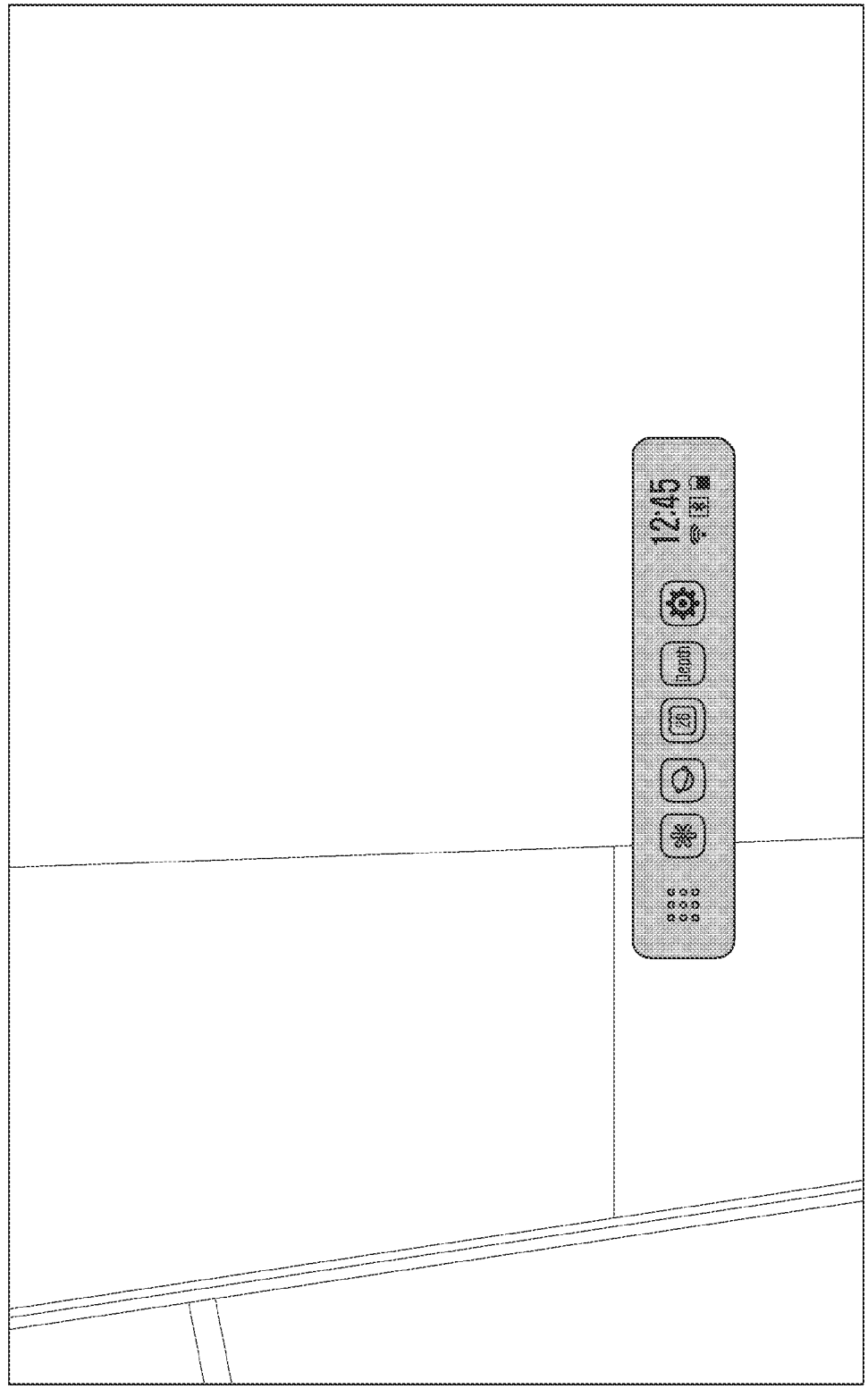
FIG. 9B to FIG. 9F are diagrams illustrating examples of respective operations shown in FIG. 9A.

FIG. 9B may be an example of a screen displayed on the display 214 in the fourth space according to an embodiment.

Figure 9C:
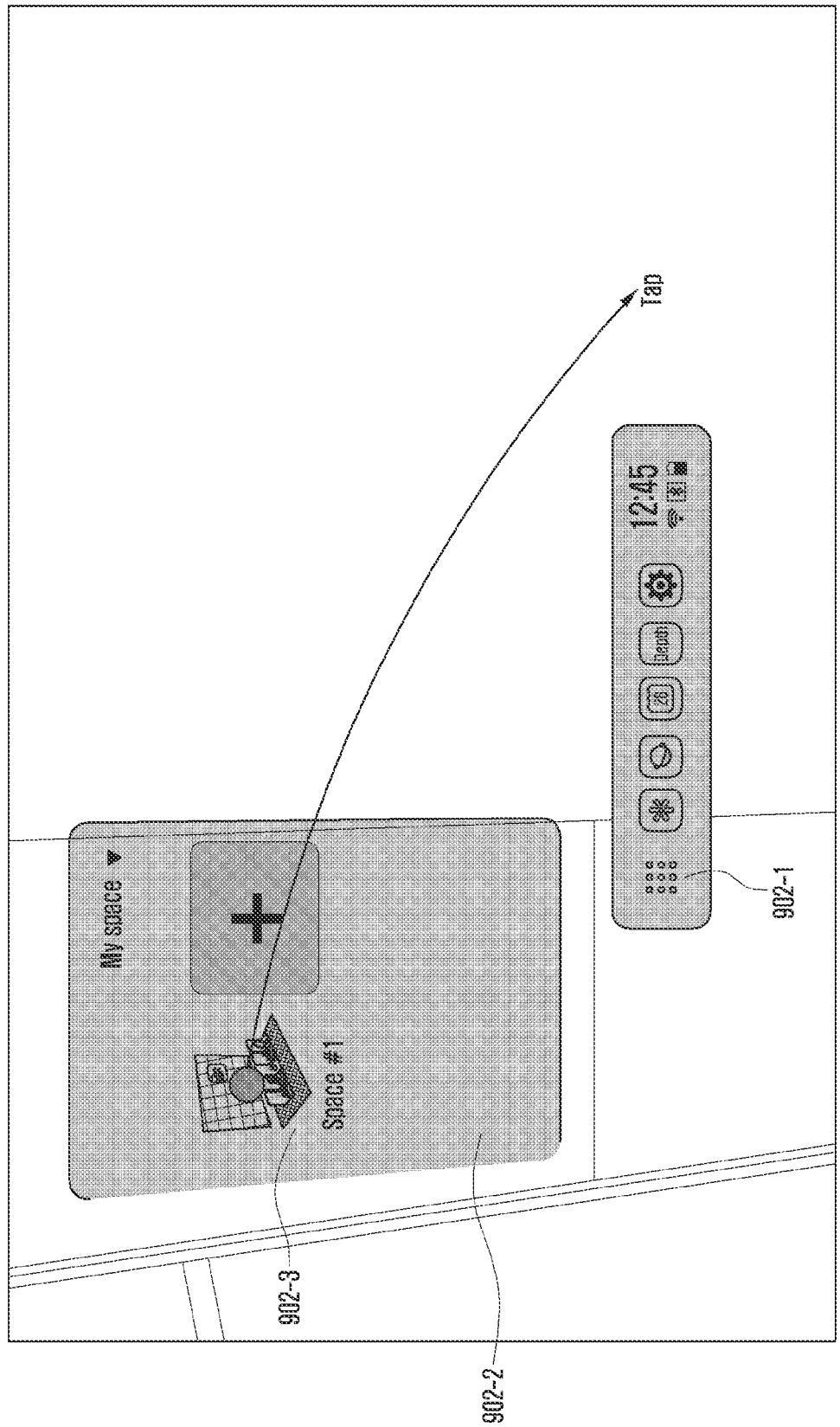

FIG. 9C is a diagram illustrating a screen including a designated icon (e.g., a first configuration icon) related to a command of retrieving an object placement configuration according to an embodiment.

The user may input a gesture of selecting a menu icon 902-1 as illustrated in FIG. 9C and then input a gesture of selecting a first configuration icon 902-3 in a menu list 902-2, thereby inputting a command of retrieving an object placement configuration in the electronic device 200.

According to various embodiments, the processor 250 may analyze the fourth space in operation 920.

According to an embodiment, the processor 250 may analyze the fourth space based on an image of the fourth space, which is captured by the camera 213, and a relative distance from an item existing in the fourth space to the camera 213, which is measured by the sensor 280, and obtain information related to the fourth space.

For example, the information related to the fourth space may include the number of a plane included in the fourth space, the direction, position, rotation angle, and/or size value of the plane relative to the electronic device 200.

Figure 9D:
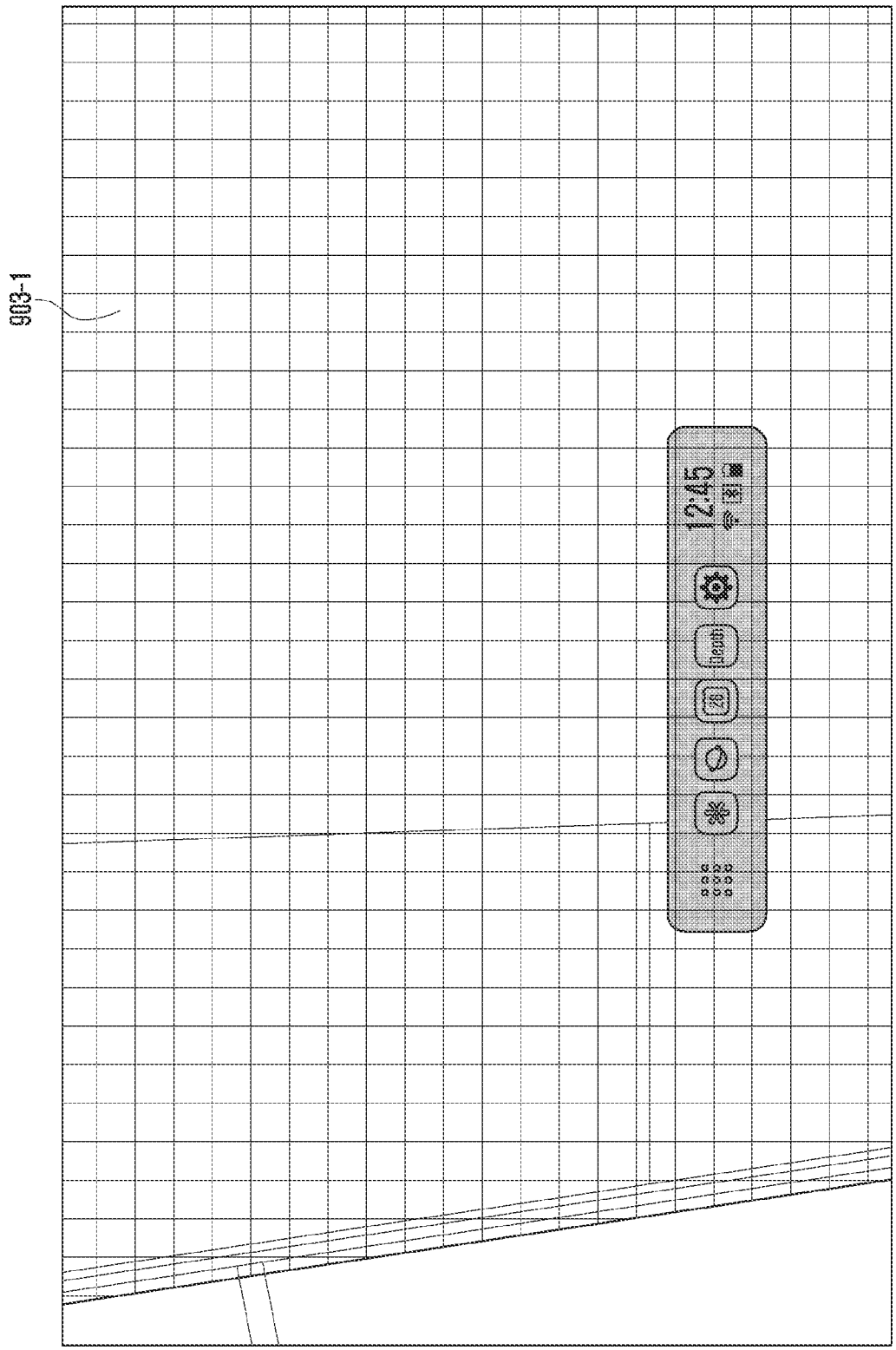

FIG. 9D is a diagram illustrating an example of a screen in which the processor 250 analyzes the fourth space, the image of which is captured by the camera 213 according to an embodiment.

According to an embodiment, the electronic device 200 may analyze a first plane 903-1 existing in the fourth space, as illustrated in FIG. 9D.

For example, the processor 250 may analyze the fourth space to obtain the number of the first plane 903-1 included in the fourth space, a direction, position, rotation angle, and/or size value relative to the electronic device 200.

According to various embodiments, the processor 250 may, in operation 930, relocate a configuration of objects corresponding to the first configuration based on information of the analyzed fourth space.

According to an embodiment, the processor 250 may compare the first space with the fourth space.

For example, the processor 250 may compare information of at least one plane included in the first space with information of at least one plane included in the fourth space.

According to an embodiment, the processor 250 may adjust the configuration of the objects corresponding to the first configuration and place the objects based on a result of comparison between the first space and the fourth space.

For example, in response to mismatch between the quantity of planes included in the first space and that of the fourth space, the processor 250 may adjust the positions and sizes of the objects of the first configuration and place the objects.

Figure 9E:
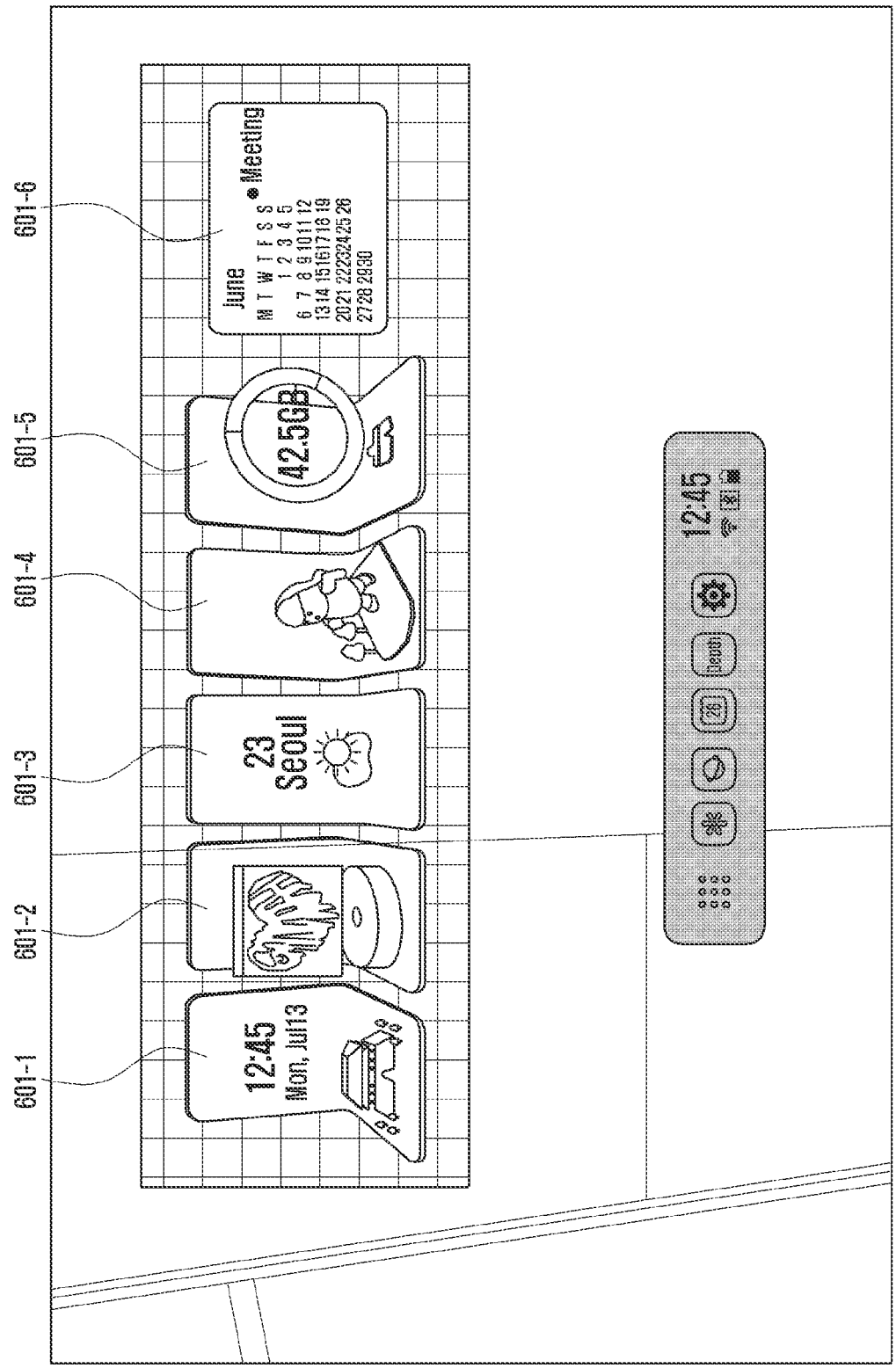

FIG. 9E is a diagram illustrating an example of a screen in which the objects of the first configuration are relocated to be suitable for the fourth space according to an embodiment.

For example, the processor may adjust the position and size of the object 601-6 depending on the first plane and place the object to correspond to the first plane 903-1 of the fourth space according to the size ratio between the first plane 903-1 of the fourth space and the first plane 603-1 of the first space.

For example, the processor may place the objects 601-1, 601-2, 601-3, 601-4, and 601-5 depending on the second plane in response to absence of the second plane in the fourth space such that the configuration and positions thereof depend on the first plane 903-1 of the fourth space.

For example, in the first configuration, the objects 601-1, 601-2, 601-3, 601-4, and 601-5 are arranged on the second plane 603-2 of the first space in one row and five columns. However, in response to absence of the second plane in the fourth space, the objects 601-1, 601-2, 601-3, 601-4, and 601-5 may be arranged on the first plane 903-1 of the fourth space.

For example, the processor may place the objects 601-1, 601-2, 601-3, 601-4, and 601-5 depending on the second plane in response to absence of the second plane in the fourth space such that the configuration and positions thereof correspond to a floating type.

According to various embodiments, the processor 250 may display relocated objects on the display 214 in operation 940.

Figure 9F:
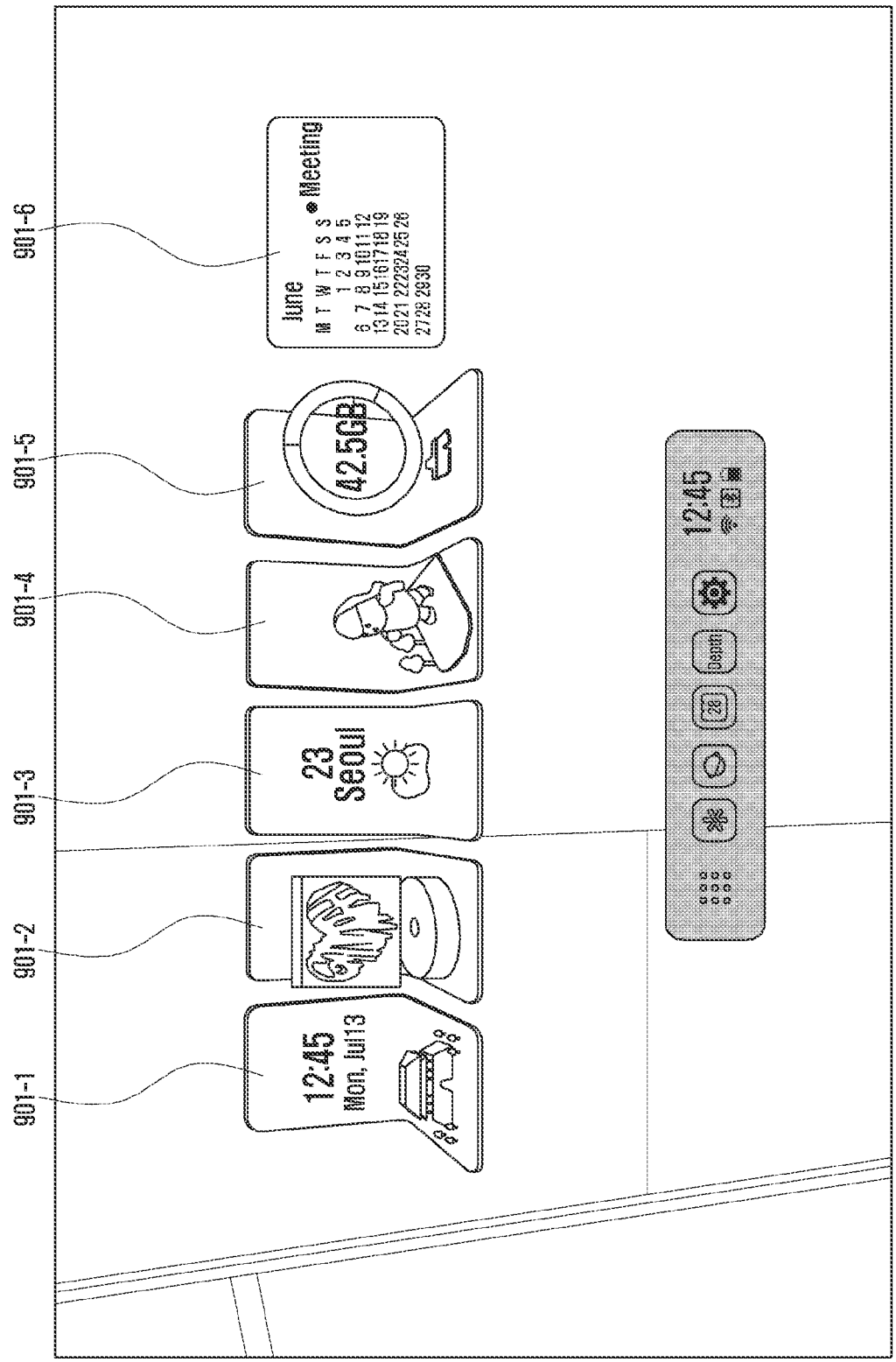

FIG. 9F is a diagram illustrating a screen including relocated objects 901-1, 901-2, 901-3, 901-4, 901-5, and 901-6 displayed on the display 214 according to an embodiment.

According to an embodiment, the processor 250 may relocate and adjust the objects 601-1, 601-2, 601-3, 601-4, 601-5, and 601-6 of the first configuration to be suitable for the fourth space, and display the objects 901-1, 901-2, 901-3, 901-4, 901-5, and 901-6 on the display 214 in the fourth space, According to various embodiments, the processor 250 relocate the objects based on the user's additional placement input.

According to an embodiment, the user may make an input to relocate the objects 901-1, 901-2, 901-3, 901-4, 901-5, and 901-6 of the fourth space placed by the processor 250, by means of a movement gesture.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

Figure 10A:
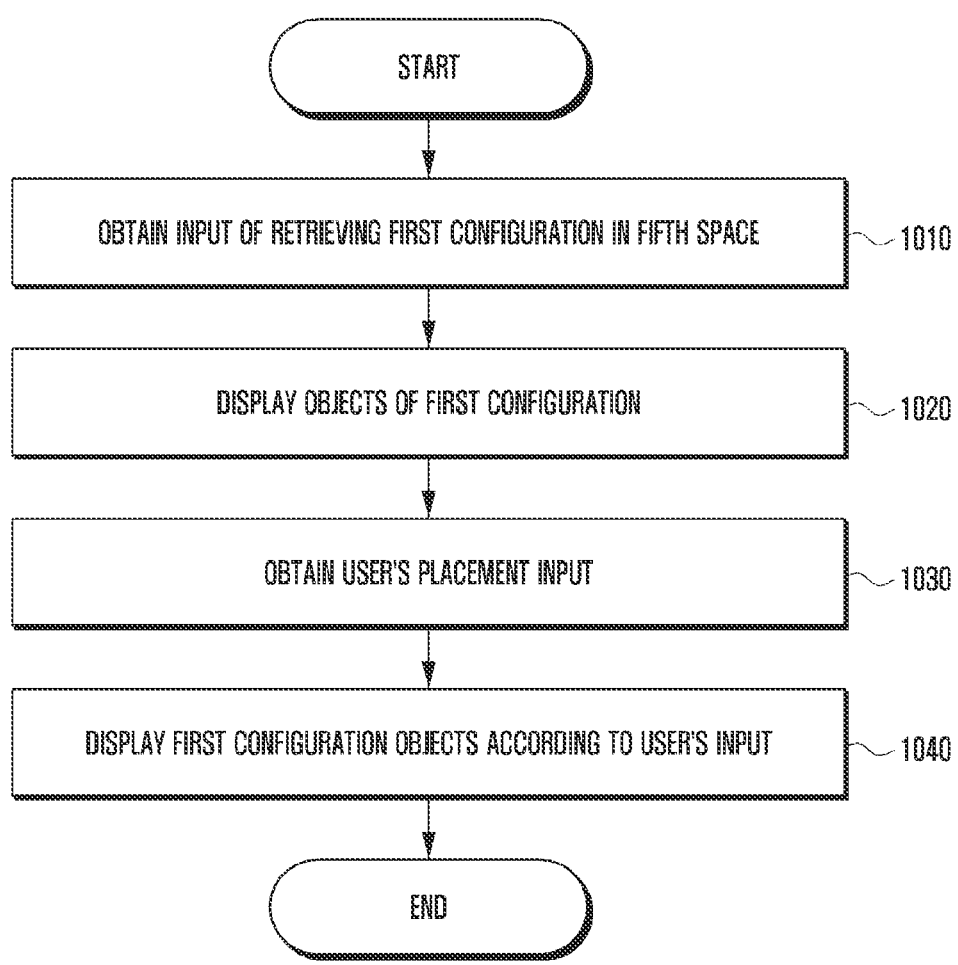
FIG. 10A is a flowchart illustrating a method in which an electronic device according to various embodiments retrieves a stored object configuration in a fifth space and displays same.

FIG. 10A is a flowchart illustrating a method in which an electronic device (e.g., the electronic device 200 in FIG. 2D) according to various embodiments retrieves a stored object configuration in a fifth space and displays same.

FIG. 10B to FIG. 10F are diagrams illustrating examples of respective operations shown in FIG. 10A.

The flowchart of FIG. 10A and the embodiments of FIG. 10B to FIG. 10F according to various embodiments may be embodiments corresponding to operation 330 to operation 350 in FIG. 3.

According to various embodiments, the processor 250 may obtain an input of retrieving a first configuration in a fifth space without change in operation 1010.

According to an embodiment, while wearing the electronic device 200, a user may input a command of retrieving the first configuration stored in the memory 260.

For example, the user may input a gesture of selecting a designated icon (e.g., a first configuration icon) related to the command of retrieving the first configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 10B:
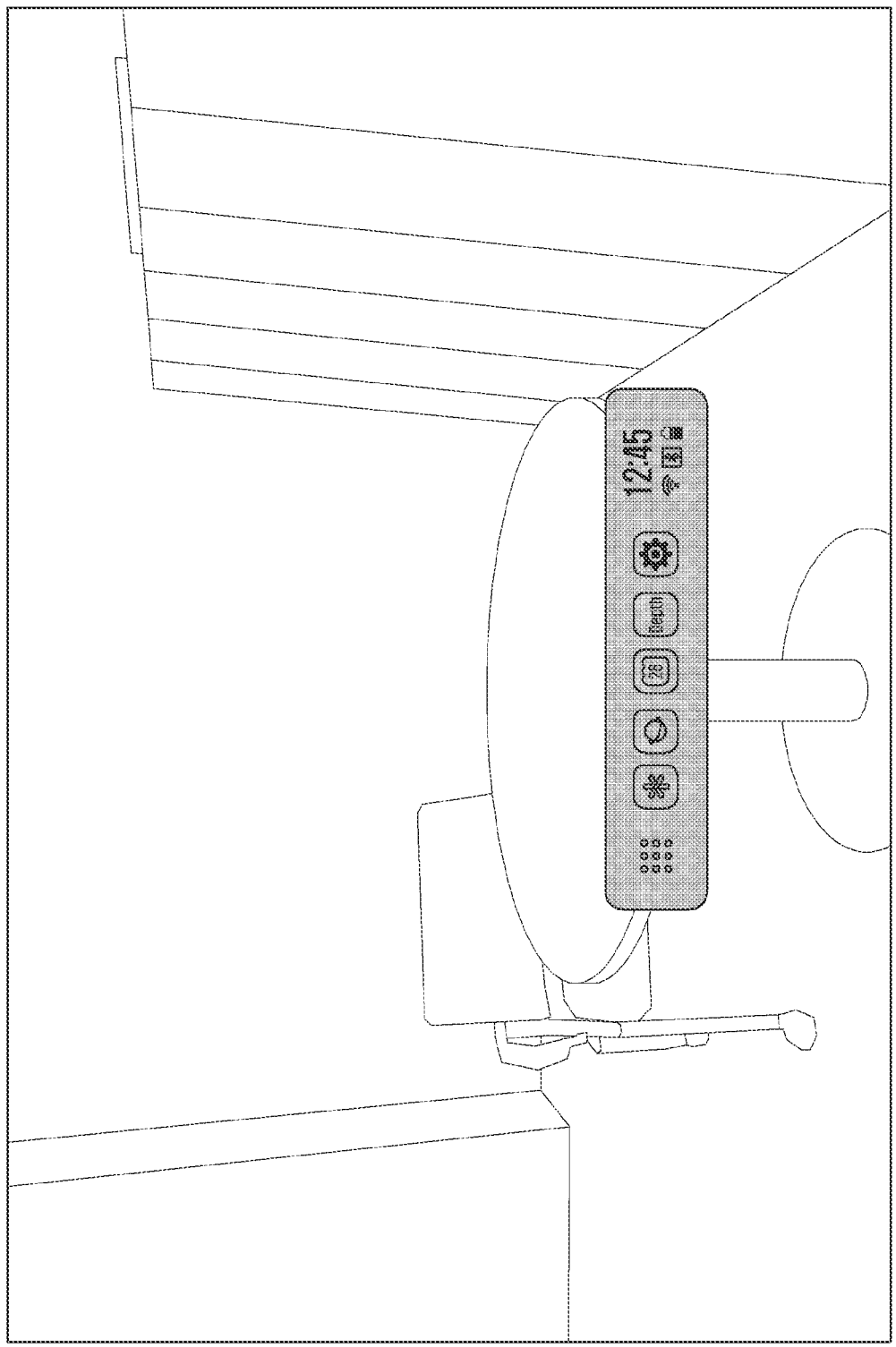
FIG. 10B to FIG. 10F are diagrams illustrating examples of respective operations shown in FIG. 10A.

FIG. 10B may be an example of a screen displayed on the display 214 in the fifth space according to an embodiment.

Figure 10C:
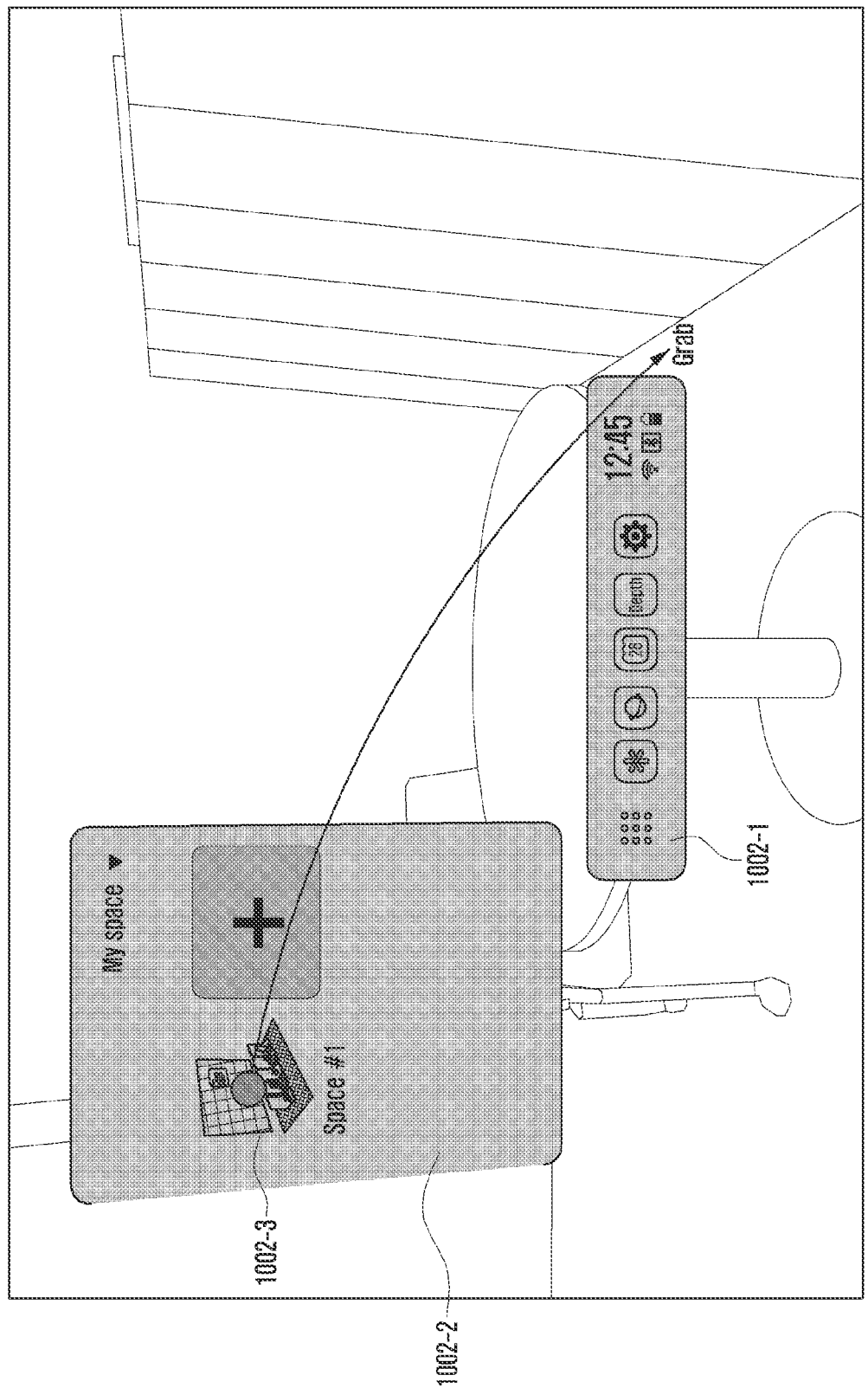

FIG. 10C is a diagram illustrating a screen including a designated icon (e.g., a first configuration icon) related to a command of retrieving an object placement configuration according to an embodiment.

The user may input a gesture of selecting a menu icon 1002-1 as illustrated in FIG. 10C and then input a movement gesture on a first configuration icon 1002-3 in a menu list 1002-2, thereby inputting a command of retrieving an object placement configuration of the first configuration in the electronic device 200 without change.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

According to various embodiments, the processor 250 may display an object group of the first configuration on the display 214 in operation 1020.

Figure 10D:
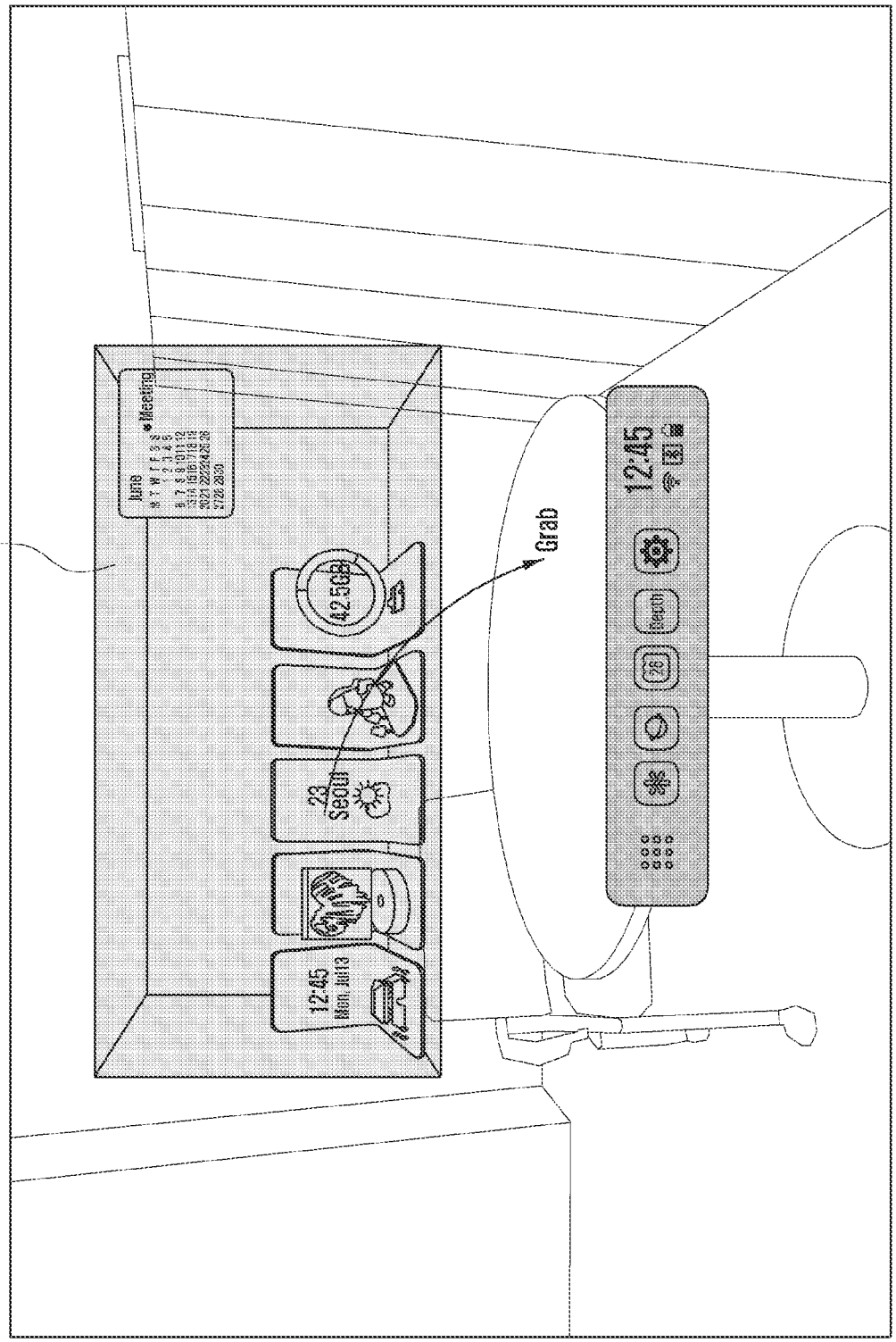

FIG. 10D is a diagram illustrating a screen including an object group 601 of the first configuration displayed on the display 214 according to an embodiment.

According to an embodiment, the processor 250 may display the object group 601 of the first configuration on the display 214 in response to a command (e.g., a movement gesture on the first configuration icon) of retrieving a placement configuration corresponding to the object group 601 of the first configuration without change.

According to an embodiment, the processor 250 may display the object group 601 of the first configuration on the display 214 together with a virtual plane in response to a command (e.g., a movement gesture on the first configuration icon) of retrieving a placement configuration corresponding to the object group 601 of the first configuration without change.

According to various embodiments, the processor 250 may obtain the user's placement input in operation 1030.

Figure 10E:
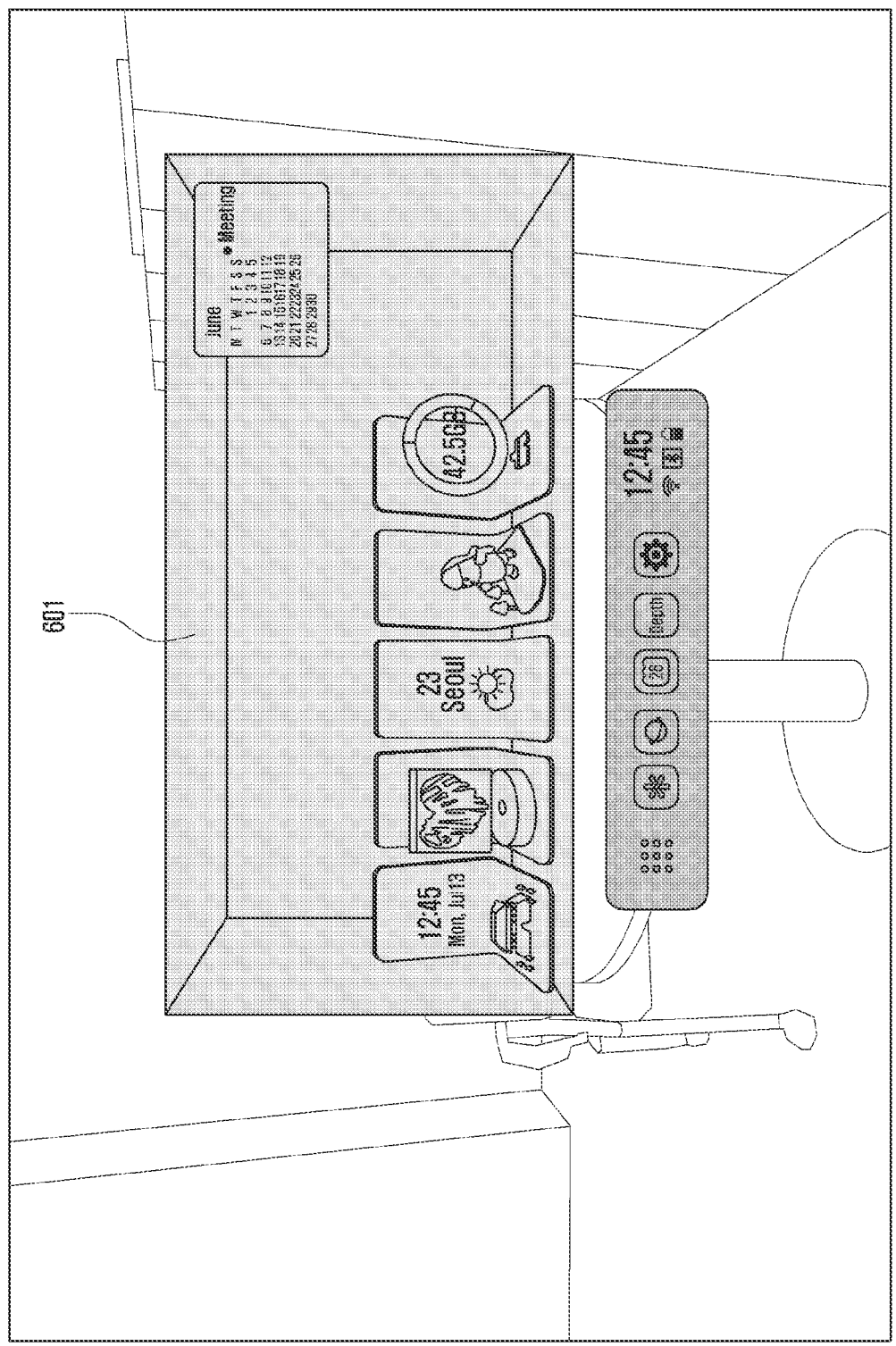

FIG. 10E is a diagram illustrating a screen in which the user has moved the position of the first object group 601 and has changed the size thereof according to an embodiment.

According to an embodiment, the user may make an input to change the position of the object group 601 of the first configuration by means of a movement gesture.

For example, the movement gesture may include an operation of holding the object group 601 displayed on the display 214 with a hand in a space corresponding to the position of the object group 601 and opening the hand at a target position to be moved. The movement gesture is not limited to the above operation, and may include gestures of various embodiments that the electronic device 200 is able to recognize.

According to an embodiment, the user may make an input to change the size of the object group 601 of the first configuration by means of a size change gesture.

For example, the size change gesture may include an operation of zooming in or out the object group 601 displayed on the display 214 in a space corresponding to the position of the object group 601. The size change gesture is not limited to the above operation, and may include gestures of various embodiments that the electronic device 200 is able to recognize.

According to various embodiments, the processor 250 may display first configuration objects in response to the user's placement input in operation 1040.

Figure 10F:
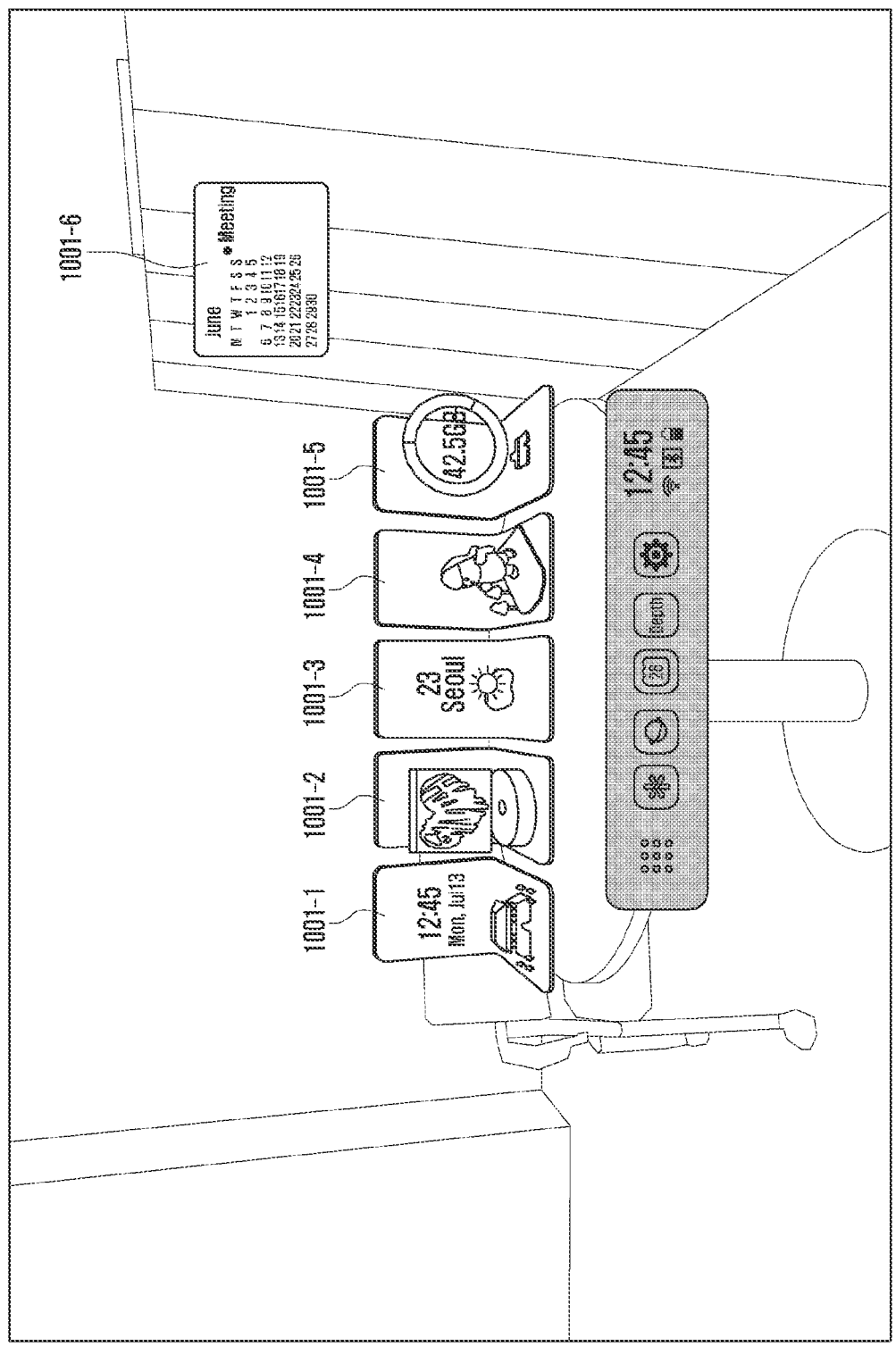

FIG. 10F is a diagram illustrating a screen including objects 1001-1, 1001-2, 1001-3, 1001-4, 1001-5, and 1001-6 obtained after relocating, by the user, the first object group 601 displayed on the display 214 according to an embodiment.

According to an embodiment, the processor 250 may display, on the display 214 in the fifth space, the objects 1001-1, 1001-2, 1001-3, 1001-4, 1001-5, and 1001-6 obtained by moving the position of the object group 601 of the first configuration and changing the size thereof by the user.

Figure 11A:
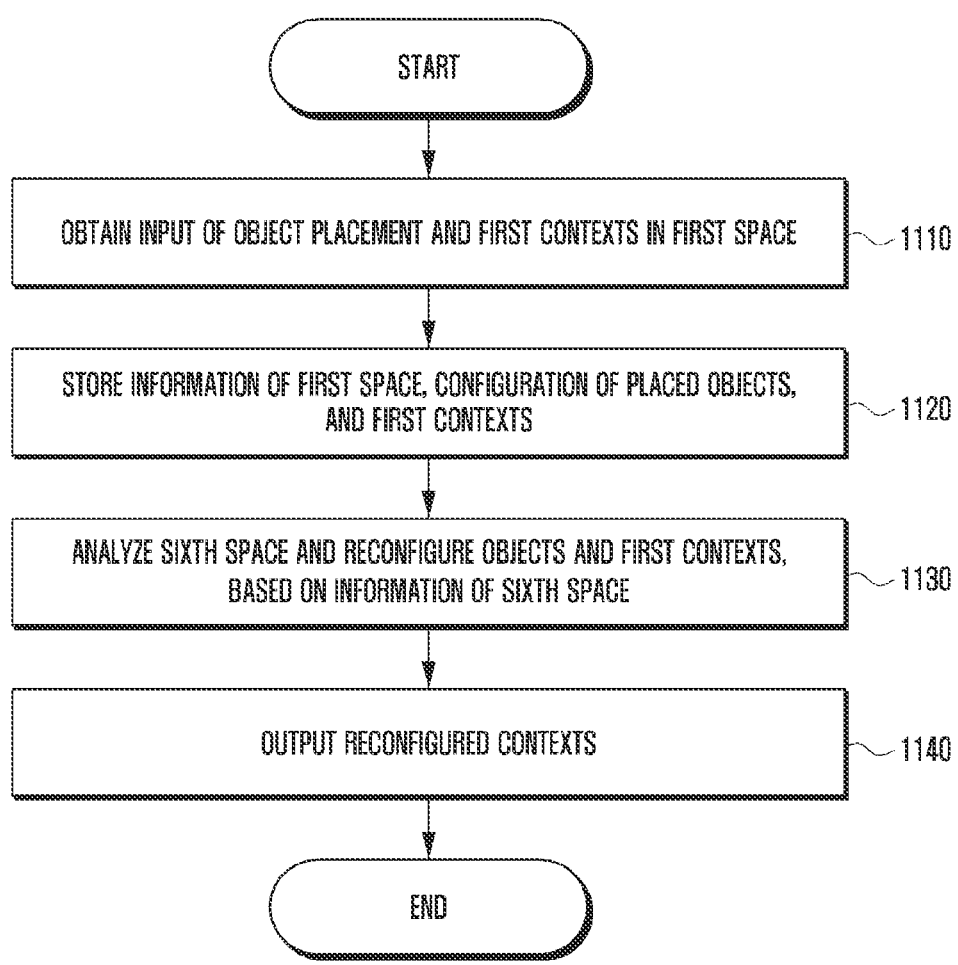
FIG. 11A is a flowchart illustrating a method in which an electronic device according to various embodiments outputs a reconfigured content in a sixth space.

FIG. 11A is a flowchart illustrating a method in which an electronic device (e.g., the electronic device 200 in FIG. 2D) according to various embodiments outputs a reconfigured content in a sixth space.

FIG. 11B to FIG. 11E are diagrams illustrating illustrative screens of respective operations shown in FIG. 11A.

The flowchart of FIG. 11A and the embodiments of FIG. 11B to FIG. 11E according to various embodiments may be embodiments corresponding to operation 310 to operation 350 in FIG. 3.

According to various embodiments, the processor 250 may obtain an input of object placement and first contexts in a first space in operation 1110.

According to an embodiment, a user may place objects displayed on the display 214 while wearing the electronic device 200.

For example, the user may make an input to place objects by using a movement gesture.

For example, the movement gesture may include an operation of holding an object displayed on the display 214 with a hand in a space corresponding to the position of the object and opening the hand at a target position to be moved. The movement gesture is not limited to the above operation, and may include gestures of various embodiments that the electronic device 200 is able to recognize.

Figure 11B:
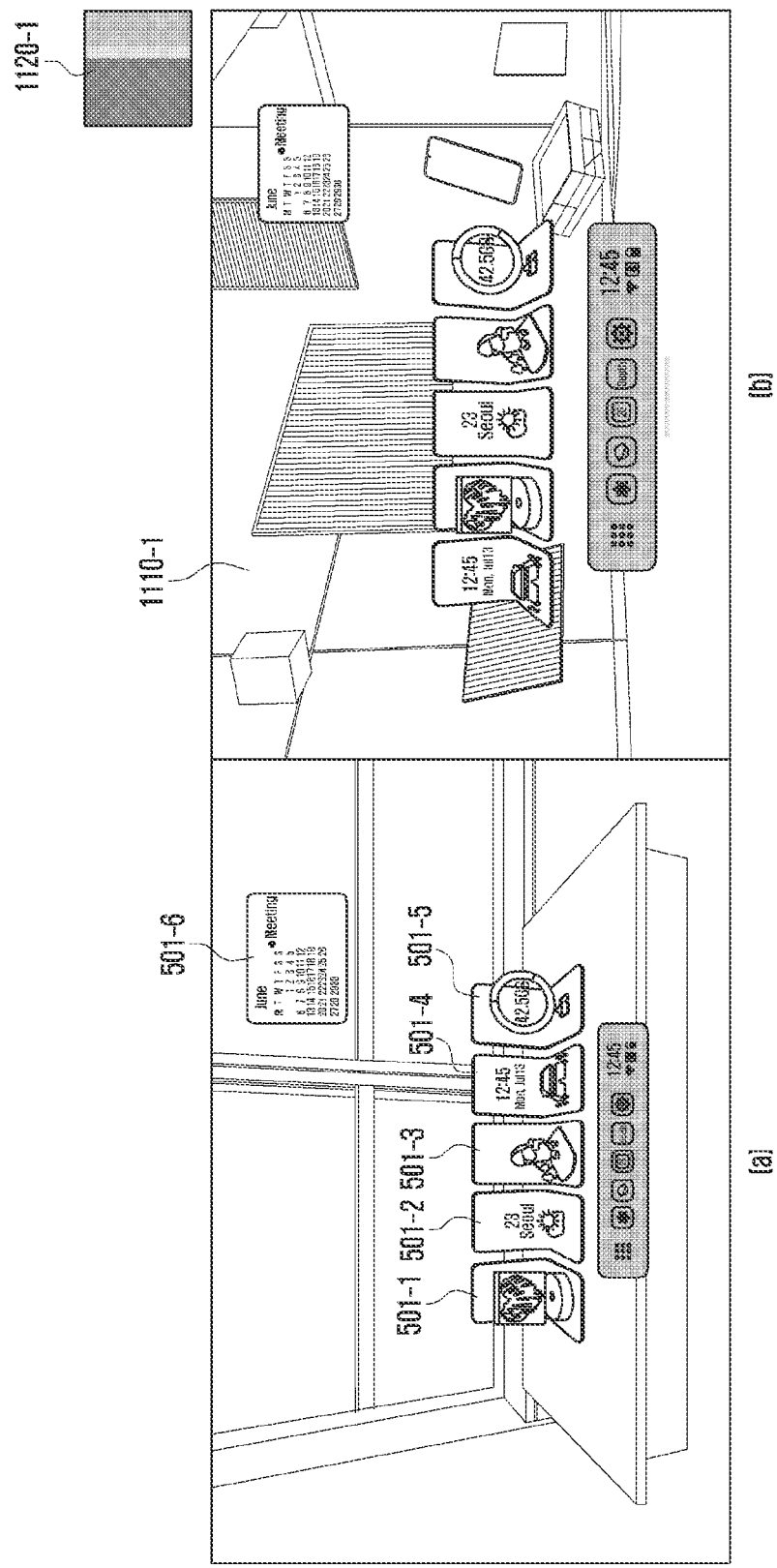
FIG. 11B to FIG. 11E are diagrams illustrating illustrative screens of respective operations shown in FIG. 11A.

Figure (a) of FIG. 11B is a diagram illustrating a screen including placement of objects 501-1, 501-2, 501-3, 501-4, 501-5, and 501-6 in the first space displayed on the display 214 according to an embodiment.

The user may place the objects 501-1, 501-2, 501-3, 501-4, 501-5, and 501-6 displayed on the display 214 by using a gesture in the first space as illustrated in figure (a) of FIG. 11B.

According to an embodiment, a user may configure contexts output from the electronic device 200 while wearing the electronic device 200.

For example, the context may include various types of visual, auditory, and/or tactile environments, such as a background effect (e.g., wallpaper), a background sound, and/or a vibration pattern, configured by the electronic device 200, which may be output from the display 214, an audio module (e.g., the sound output module 155 in FIG. 1), and/or a haptic module (e.g., the haptic module 179 in FIG. 1) of the electronic device 200 in the first space.

For example, the user may make an input to configure contexts by using a selection gesture.

For example, the selection gesture may include an operation of selecting a visualized context displayed on the display 214 with a hand in a space corresponding to the position of the visualized context. The selection gesture is not limited to the above operation, and may include gestures of various embodiments that the electronic device 200 is able to recognize.

Figure (b) of FIG. 11B is a diagram illustrating a screen including visualized contexts 1110-1 and 1120-1 output from the electronic device 200 according to an embodiment.

The user may configure the contexts 1110-1 and 1120-1 output from the electronic device 200 by using a gesture in the first space as illustrated in figure (b) of FIG. 11B.

According to an embodiment, the processor 250 may, in operation 1120, store information of the first space, a configuration of placed objects, and the first contexts.

According to an embodiment, information related to the first context may be included in the information of the first space.

According to an embodiment, the processor 250 may obtain an input of storing the configuration of the placed objects and the contexts.

According to an embodiment, the user may input a command of storing an object placement configuration in the electronic device 200 while wearing the electronic device.

For example, the user may input a gesture of selecting a designated icon related to the command of storing the object placement configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 11C:
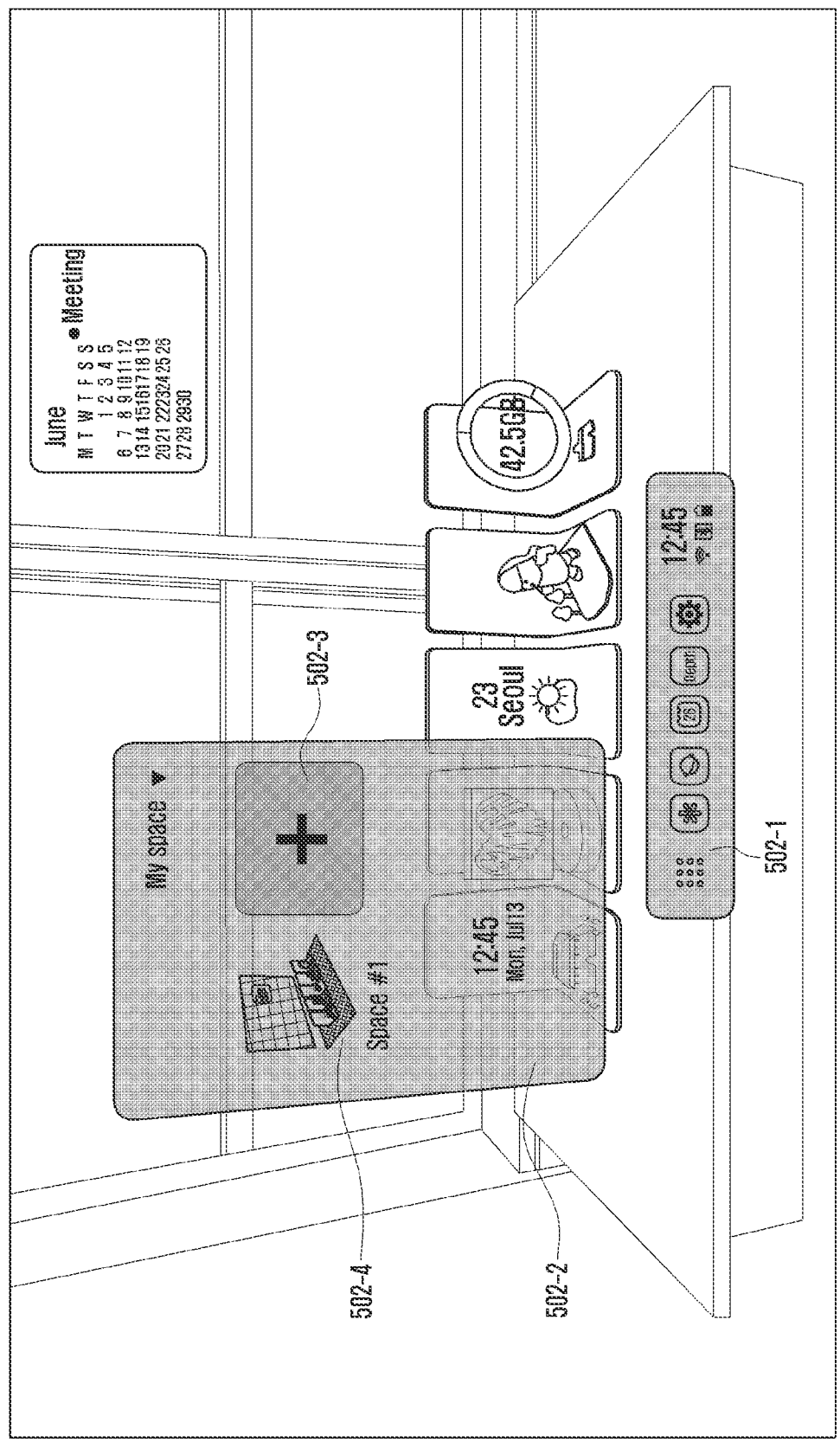

FIG. 11C is a diagram illustrating a screen including an icon for storing an object placement and context configuration displayed on the display 214 according to an embodiment.

The user may input a gesture of selecting a menu icon 502-1 as illustrated in FIG. 11C and then input a gesture of selecting a store icon 502-3 in a menu list 502-2, thereby inputting a command of storing an object placement configuration in the electronic device 200.

According to an embodiment, the processor 250 may analyze the first space based on an image of the first space, which is captured by the camera 213, and a relative distance from an item existing in the first space to the camera 213, which is measured by the sensor 280, and obtain information related to the first space.

For example, the information related to the first space may include the number of a plane included in the first space, the direction, position, rotation angle, and/or size value of the plane relative to the electronic device 200.

According to an embodiment, the processor 250 may store the configuration of the objects and the first contexts placed in the first space in the memory 260.

For example, the processor 250 may store, in the memory 260 as the name of a "first configuration", the number of a plane included in the first space, the direction, position, rotation angle, anchor size of the plane relative to the electronic device 200, the position of the object relative to the electronic device 200, information (e.g., the number of a plane) on a plane on which the object depends, a position, rotation, a size value relative to the plane on which the object depends, and/or relevant application information, and background effect information, background sound information and/or haptic vibration pattern information.

According to various embodiments, the processor 250 may, in operation 1130, analyze a sixth space and reconfigure the objects and the first contexts based on information of the sixth space.

According to an embodiment, the processor 250 may obtain an input of retrieving a first configuration in the sixth space.

According to an embodiment, while wearing the electronic device 200, the user may input a command of retrieving the first configuration stored in the memory 260.

For example, the user may input a gesture of selecting a designated icon (e.g., a first configuration icon) related to the command of retrieving the first configuration after inputting a gesture of selecting a designated icon (e.g., an application list) displayed on the display 214.

For example, the gesture of selecting the icon may include an operation of selecting the icon with a hand at a position in a space corresponding to the position of the icon. The gesture of selecting the icon is not limited to the above operation, and may include gestures of various embodiments that the electronic device 200 is able to recognize.

Figure 11D:
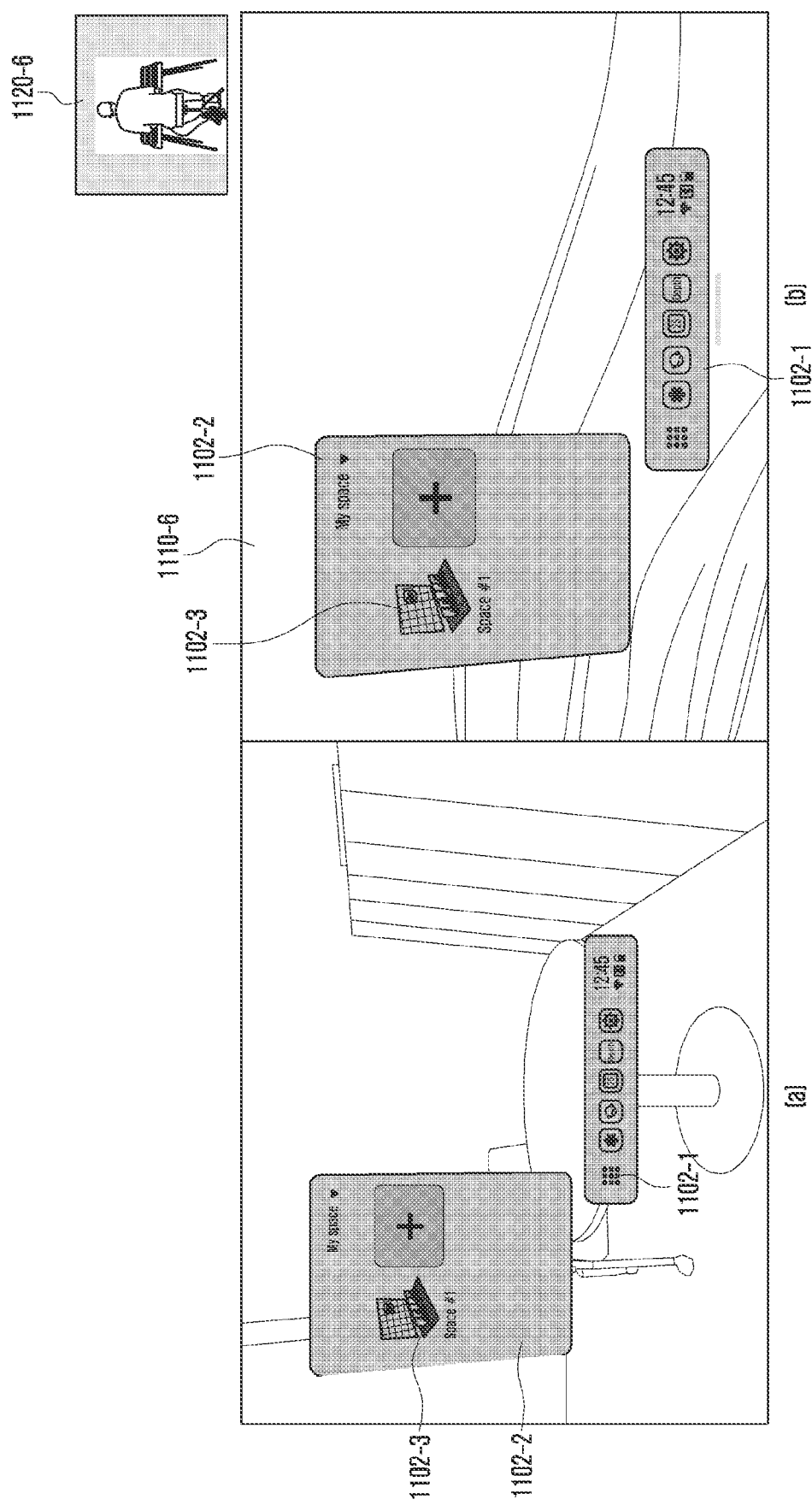

FIG. 11D may be an example of a screen displayed on the display 214 in the sixth space according to an embodiment.

Figure (a) of FIG. 11D is a diagram illustrating a screen including a designated icon (e.g., a first configuration icon) related to a command of retrieving an object placement and context configuration according to an embodiment.

The user may input a gesture of selecting a menu icon 1102-1 as illustrated in figure (a) of FIG. 11D and then input a gesture of selecting a first configuration icon 1102-3 in a menu list 1102-2, thereby inputting a command of retrieving an object placement and context configuration in the electronic device 200.

Figure (b) of FIG. 11D is a diagram obtained by visualizing a context configuration applied to the sixth space according to an embodiment. As illustrated in figure (h) of FIG. 11D, a sixth wallpaper 1110-6 and/or a sixth background music 1120-6 may have been applied to the sixth space.

According to various embodiments, the processor 250 may analyze the sixth space.

According to an embodiment, the processor 250 may analyze the sixth space based on an image of the sixth space, which is captured by the camera 213, and a relative distance from an item existing in the sixth space to the camera 213, which is measured by the sensor 280, and obtain information related to the sixth space.

For example, the information related to the sixth space may include the number of a plane included in the sixth space, the direction, position, rotation angle, and/or size value of the plane relative to the electronic device 200.

According to an embodiment, the processor 250 may reconfigure the objects and the first contexts of the first configuration based on the information of the analyzed sixth space.

According to an embodiment, the processor 250 may compare the first space with the sixth space.

For example, the processor 250 may compare information of at least one plane included in the first space with information of at least one plane included in the sixth space.

According to an embodiment, the processor :250 may adjust the configuration of the objects corresponding to the first configuration and place the objects, and reconfigure the first contexts based on a result of comparison between the first space and the sixth space.

According to various embodiments, the processor may output reconfigured contexts in operation 1140.

Figure 11E:
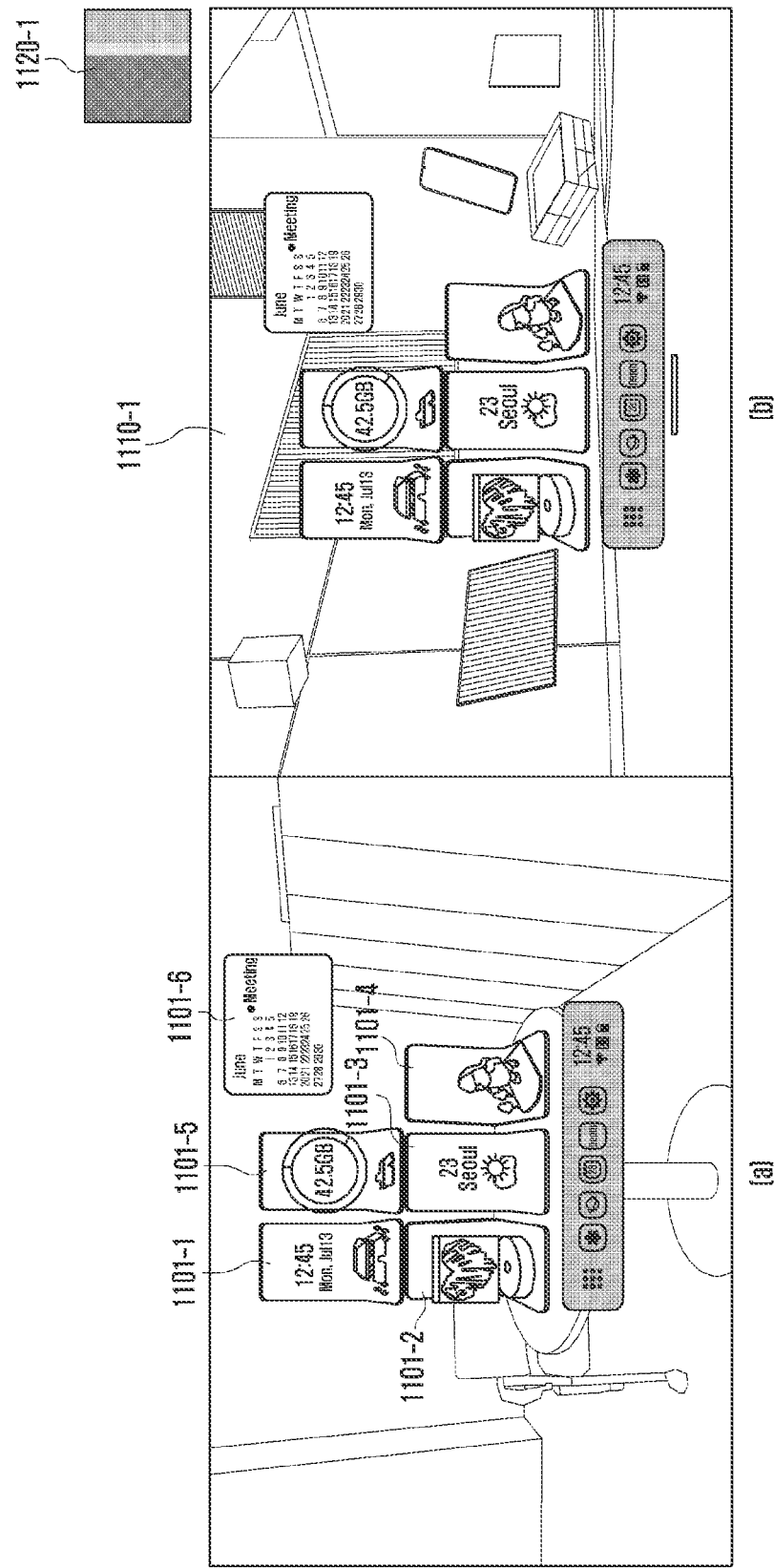

FIG. 11E is a diagram illustrating a screen including relocated objects 1101-1, 1101-2, 1101-3, 1101-4, 1101-5, and 1101-6 displayed on the display 214 and a visualized configuration 1110-1 and 1120-1 of the first contexts output from the electronic device 200 according to an embodiment.

The processor 250 may relocate and adjust, as illustrated in figure (a) of FIG. 11E, the objects 501-1, 501-2, 501-3, 501-4, 501-5, 501-6 of the first configuration to be suitable for the sixth space, and display the objects 1101-1, 1101-2, 1101-3, 1101-4, 1101-5, and 1101-6 on the display 214 in the sixth space.

The processor 250 may apply and output the first contexts 1110-1 and 1120-1 to the sixth space as illustrated in figure (b) of FIG. 11E. For example, the processor 250 may identically apply the first contexts 1110-1 and 1120-1 stored as the first configuration to the sixth space.

Figure 12:
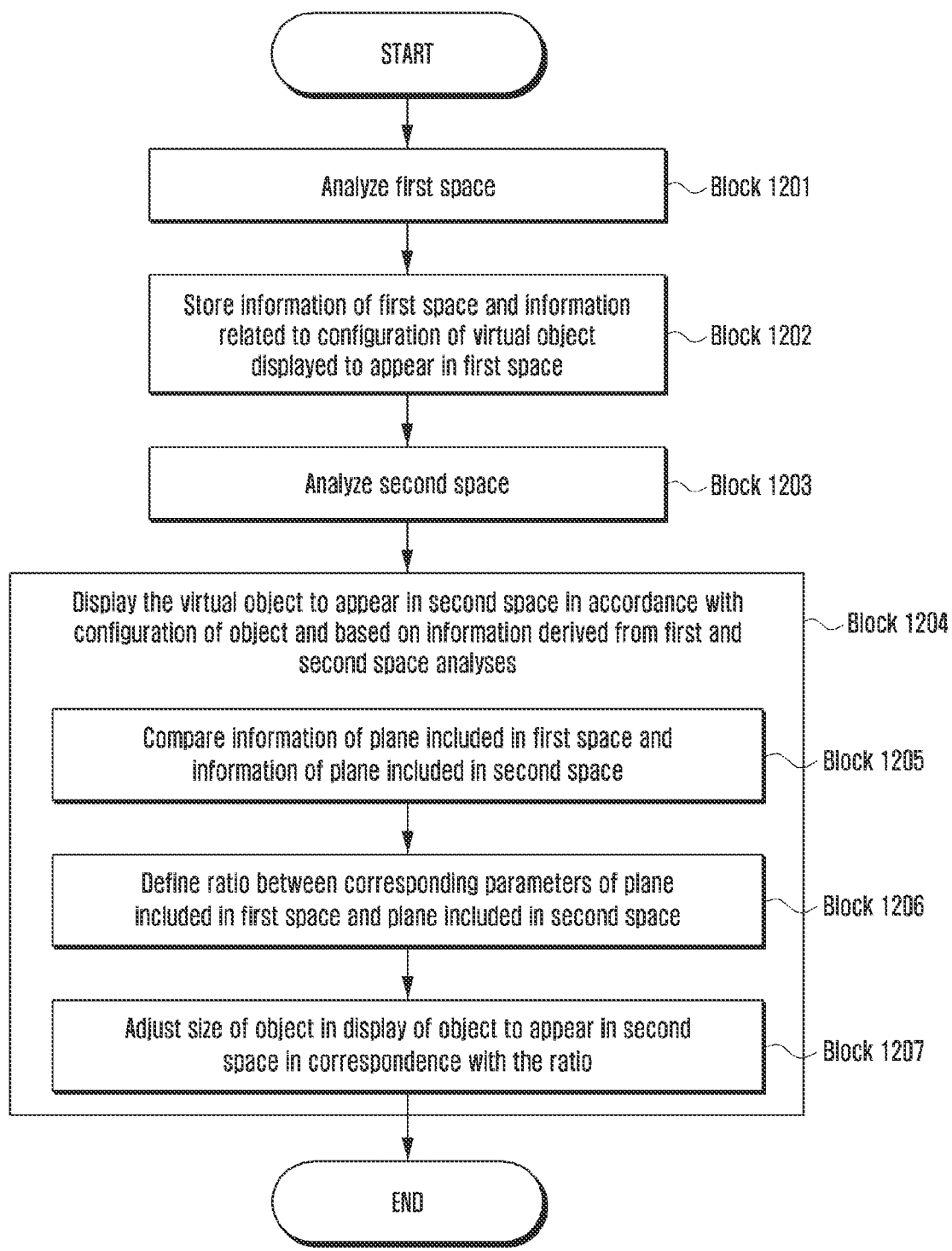
FIG. 12 is a flow diagram illustration an operation of a processor of augmented reality headgear according to various embodiments.

FIG. 12 is a flow diagram illustration an operation of a processor of augmented reality headgear according to various embodiments.

With reference to FIG. 12., augmented reality headgear is provided and includes lenses, which are disposable in front of eyes of a user, a memory configured to store instructions, and a processor. Wherein the instructions, when executed by the processor, cause the augmented reality headgear is configured to analyze a first space that is viewable by the user through the lenses (block 1201), store information of the first space and information related to a configuration of a virtual object displayed, on the lenses, to appear in the first space (block 1202), analyze a second space that is viewable by the user through the lenses (block 1203), and display, on the lenses, the virtual object to appear in the second space in accordance with the configuration of the object and based on information derived from first and second space analyses (block 1204). The lenses can be goggle or glasses lenses, although it is to be understood that additional types of lenses are possible.

The information derived from the first space analysis includes information of at least one plane included in the first space and the information derived from the second space analysis includes information of at least one plane included in the second space. The instructions further cause the augmented reality headgear to compare the information of the at least one plane included in the first space and the information of the at least one plane included in the second space (block 1205) and to display the virtual object to appear in the second space based on a comparison result. The comparison result can, for example, define a ratio between corresponding parameters of the at least one plan included in the first space and the at least one plane included in the second space (block 1206). In these or other cases, the instructions further cause the augmented reality headgear to adjust a size of the object in the display of the object to appear in the second space in correspondence with the ratio (block 1207).

An electronic device according to various embodiments may include a display, a sensor configured to detect a distance from an actual item in a space, a camera configured to capture an image of a foreground, a memory configured to store instructions, and a processor, wherein the instructions, when executed by the processor, cause the electronic device to analyze a first space using the camera and the sensor, store, in the memory, information of the first space and information related to a configuration of an object placed by a user in the first space, analyze a second space using the camera and the sensor, relocate the configuration of the object based on information of the analyzed second space, and display the object having been relocated on the display.

In the electronic device according to various embodiments, the information of the first space may include at least one of information of a plane included in the first space, a direction, a position, a rotation angle, a size value of the plane relative to the electronic device, a background sound, and a background effect, and the information of the second space tray include a number of a plane included in the second space, a direction, a position, a rotation angle, and/or a size value of the plane relative to the electronic device.

In the electronic device according to various embodiments, the information related to the configuration of the object may include a position of the object relative to the electronic device, information on a plane on which the object depends, a position, rotation, a size value relative to the plane on which the object depends, and/or relevant application information.

In the electronic device according to various embodiments, the instructions further cause the electronic device may relocate the configuration of the object, based on a result of comparison between information of at least one plane included in the first space and information of at least one plane included in the second space.

In the electronic device according to various embodiments, in response to a determination that a quantity and directions of the planes included in the first space match those of the planes included in the second space, and plane sizes of the first space match those of the second space within a designated range, the instructions further cause the electronic device may adjust a size of the object and place the object to correspond to a ratio between a size of a plane on which the object is placed in the first space and a size of a plane of the second space corresponding to the plane on which the object is placed in the first space.

In the electronic device according to various embodiments, in response to a determination that a quantity and directions of the planes included in the first space match those of the planes included in the second space, and plane sizes of the first space do not match those of the second space by a designated range or greater, the instructions further cause the electronic device may adjust a position and a size of the object and place the object so as to include the object in a size of a plane of the second space corresponding to a plane on which the object is placed in the first space.

In the electronic device according to various embodiments, in response to a determination that a quantity of the planes included in the first space does not match that of the planes included in the second space, the instructions further cause the electronic device may adjust a position and a size of the object and place the object based on a characteristic of a plane of the second space corresponding to a plane on which the object is placed in the first space.

In the electronic device according to various embodiments, the instructions further cause the electronic device may, in response to a determination an input of placing an object and an input of storing a configuration of the placed object, which are made by the user in the first space, analyze the first space by using the camera and the sensor, and in response to an input of retrieving the stored configuration of the object, which is made by the user in the second space, analyze the second space by using the camera and the sensor.

In the electronic device according to various embodiments, in response to a determination that the input of retrieving the stored configuration of the object is an input of retrieving the stored configuration of the object without change, the instructions further cause the electronic device may not analyze the second space and display the stored configuration of the object on the display without change.

In the electronic device according to various embodiments, the input of placing the object, which is made by the user, may include a gesture input made by the user in a space corresponding to the object displayed on the display.

An operation method of an electronic device according to various embodiments may include analyzing a first space using a camera and a sensor, storing, in a memory, information of the first space and information related to a configuration of an object placed by a user in the first space, analyzing a second space using the camera and the sensor, relocating the configuration of the object based on information of the analyzed second space, and displaying the object having been relocated on a display.

In the operation method of the electronic device according to various embodiments, the information of the first space may include at least one of information of a plane included in the first space, a direction, a position, a rotation angle, a size value of the plane relative to the electronic device, a background sound, and a background effect, and the information of the second space may include a number of a plane included in the second space, a direction, a position, a rotation angle, and/or a size value of the plane relative to the electronic device.

In the operation method of the electronic device according to various embodiments, the information related to the configuration of the object may include a position of the object relative to the electronic device, information on a plane on which the object depends, a position, rotation, a size value relative to the plane on which the object depends, and/or relevant application information.

In the operation method of the electronic. device according to various embodiments, the configuration of the object may be relocated based on a result of comparison between information of at least one plane included in the first space and information of at least one plane included in the second space.

The operation method of the electronic device according to various embodiments may include, in response to a determination that a quantity and directions of the planes included in the first space match those of the planes included in the second space, and plane sizes of the first space match those of the second space within a designated range, adjusting a size of the object and placing the object to correspond to a ratio between a size of a plane on which the object is placed in the first space and a size of a plane of the second space corresponding to the plane on which the object is placed in the first space.

The operation method of the electronic device according to various embodiments may include, in response to a determination that a quantity and directions of the planes included in the first space match those of the planes included in the second space, and plane sizes of the first space do not match those of the second. space by a designated range or greater, adjusting a position and a size of the object and placing the object so as to include the object in a size of a plane of the second space corresponding to a plane on which the object is placed in the first space.

The operation method of the electronic device according to various embodiments may include, in response to a determination that a quantity of the planers included in the first space does not match that of the planes included in the second space, adjusting a position and a size of the object and placing the object based on a characteristic of a plane of the second space corresponding to a plane on which the object is placed in the first space.

The operation method of the electronic device according to various embodiments may include, in response to a determination an input of placing an object and an input of storing a configuration of the placed object, which are made by the user in the first space, analyzing the first space by using the camera and the sensor, and in response to an input of retrieving the stored configuration of the object, which is made by the user in the second space, analyzing the second space by using the camera and the sensor.

The operation method of the electronic device according to various embodiments may include, in response to a determination that the input of retrieving the stored configuration of the object is an input of retrieving the stored configuration of the object without change, not analyzing the second space and displaying the stored configuration of the object on the display without change.

In the operation method of the electronic device according to various embodiments, the input of placing the object, which is made by the user, may include a gesture input made by the user in a space corresponding to the object displayed on the display.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should he appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wearable electronic device comprising:
a display;
a sensor configured to detect a distance from an actual item in a space;
a camera configured to capture an image of a foreground;
a memory configured to store instructions; and
a processor,
wherein the instructions, when executed by the processor, cause the wearable electronic device to:
identify a space where the wearable electronic device is located from the captured image using the camera;
when the identified space is a first space, analyze the first space using the camera and the sensor; and
store information of the first space and information related to a configuration of an object placed by the user in the first space, and
determine whether the space is changed to a second space from the first space based on the captured image;
when the space is changed to the second space, analyze the second space using the camera and the sensor;
relocate the configuration of the object based on information of the analyzed second space in the second space; and
display the object having been relocated in the second space on the display.

2. The wearable electronic device of claim 1, wherein the information of the first space comprises at least one of information of a plane included in the first space, a direction, a position, a rotation angle, a size value of the plane relative to the wearable electronic device, a background sound, and a background effect, and
wherein the information of the second space comprises a number of a plane included in the second space, a direction, a position, a rotation angle, and/or a size value of the plane relative to the wearable electronic device.

3. The wearable electronic device of claim 1, wherein the information related to the configuration of the object comprises a position of the object relative to the wearable electronic device, information on a plane on which the object depends, a position, rotation, a size value relative to the plane on which the object depends, and/or relevant application information.

4. The wearable electronic device of claim 3, wherein the instructions further, when executed by the processor, cause the wearable electronic device to relocate the configuration of the object based on a result of comparison between information of at least one plane included in the first space and information of at least one plane included in the second space.

5. The wearable electronic device of claim 4, wherein the instructions further, when executed by the processor, cause the wearable electronic device to, in response to that a quantity and directions of the planes included in the first space match those of the planes included in the second space, and plane sizes of the first space match those of the second space within a designated range, adjust a size of the object and place the object to correspond to a ratio between a size of a plane on which the object is placed in the first space and a size of a plane of the second space corresponding to the plane on which the object is placed in the first space.

6. The wearable electronic device of claim 4, wherein the instructions further, when executed by the processor, cause the wearable electronic device to, in response to that a quantity and directions of the planes included in the first space match those of the planes included in the second space, and plane sizes of the first space do not match those of the second space by a designated range or greater, adjust a position and a size of the object and place the object so as to include the object in a size of a plane of the second space corresponding to a plane on which the object is placed in the first space.

7. The wearable electronic device of claim 4, wherein the instructions further, when executed by the processor, cause the wearable electronic device to, in response to that a quantity of the planes included in the first space does not match that of the planes included in the second space, adjust a position and a size of the object and place the object, based on a characteristic of a plane of the second space corresponding to a plane on which the object is placed in the first space.

8. The wearable electronic device of claim 1, wherein the instructions further, when executed by the processor, cause the wearable electronic device to:

analyze the first space using the camera and the sensor in response to an input of placing the object and an input of storing a configuration of a placement of the object, which are made by the user in the first space; and analyze the second space using the camera and the sensor in response to an input of retrieving the stored configuration of the object, which is made by the user in the second space.

9. A method of operating wearable electronic device, the method comprising:

identifying a space where the wearable electronic device is located from a captured image using a camera;

when the identified space is a first space, analyzing the first space using the camera and a sensor; and storing information of the first space and information related to a configuration of an object placed by the user in the first space, and determining whether the space is changed to a second space from the first space based on the captured image;

when the space is changed to the second space, analyzing the second space using the camera and the sensor;

relocating the configuration of the object based on information of the analyzed second space in the second space; and displaying the object having been relocated in the second space on a display.

10. The method of claim 9, wherein the information of the first space comprises at least one of information of a plane included in the first space, a direction, a position, a rotation angle, a size value of the plane relative to the wearable electronic device, a background sound, and a background effect, and wherein the information of the second space comprises a number of a plane included in the second space, a direction, a position, a rotation angle, and/or a size value of the plane relative to the wearable electronic device.

11. The method of claim 9, wherein the information related to the configuration of the object comprises a position of the object relative to the wearable electronic device, information on a plane on which the object depends, a position, rotation, a size value relative to the plane on which the object depends, and/or relevant application information.

12. The method of claim 11, wherein the configuration of the object is relocated based on a result of comparison between information of at least one plane included in the first space and information of at least one plane included in the second space.

13. The method of claim 12, comprising, in response to that a quantity and directions of the planes included in the first space match those of the planes included in the second space, and plane sizes of the first space match those of the second space within a designated range, adjusting a size of the object and placing the object to correspond to a ratio between a size of a plane on which the object is placed in the first space and a size of a plane of the second space corresponding to the plane on which the object is placed in the first space.

14. The method of claim 12, comprising, in response to that a quantity and directions of the planes included in the first space match those of the planes included in the second space, and plane sizes of the first space do not match those of the second space by a designated range or greater, adjusting a position and a size of the object and placing the object so as to include the object in a size of a plane of the second space corresponding to a plane on which the object is placed in the first space.

15. The method of claim 12, comprising, in response to that a quantity of the planes included in the first space does not match that of the planes included in the second space, adjusting a position and a size of the object and placing the object, based on a characteristic of a plane of the second space corresponding to a plane on which the object is placed in the first space.

16. The method of claim 9, comprising:

analyzing the first space using the camera and the sensor in response to an input of placing an object and an input of storing a configuration of a placement of the object, which are made by the user in the first space; and analyzing the second space using the camera and the sensor in response to an input of retrieving the stored configuration of the object, which is made by the user in the second space.

17. An augmented reality headgear, comprising:

lenses, which are disposable in front of eyes of a user;

a camera configured to capture an image of a foreground;

memory configured to store instructions; and a processor, wherein the instructions, when executed by the processor, cause the augmented reality headgear to:

identify a space where the augmented reality headgear is located from the captured image using the camera;

when the identified space is a first space, analyze the first space that is viewable by the user through the lenses;

store information of the first space and information related to a configuration of a virtual object displayed, on the lenses, to appear in the first space;

determine whether the space is changed to a second space from the first space based on the captured image;

when the space is changed to the second space, analyze the second space that is viewable by the user through the lenses; and display, on the lenses, the virtual object to appear in the second space in accordance with the configuration of the object and based on information derived from first and second space analyses.

18. The augmented reality headgear of claim 17, wherein the lenses are goggle or glasses lenses.

19. The augmented reality headgear of claim 17, wherein:
the information derived from the first space analysis comprises information of at least one plane included in the first space, and
the information derived from the second space analysis comprises information of at least one plane included in the second space,
wherein the instructions, when executed by the processor, further cause the augmented reality headgear to:
compare the information of the at least one plane included in the first space and the information of the at least one plane included in the second space; and
display the virtual object to appear in the second space based on a comparison result.

20. The augmented reality headgear of claim 17, wherein:
the comparison result defines a ratio between corresponding parameters of the at least one plane included in the first space and the at least one plane included in the second space, and
wherein the instructions, when executed by the processor, further cause the augmented reality headgear to adjust a size of the object in the display of the object to appear in the second space in correspondence with the ratio.

* * * * *